US007539475B2

(12) United States Patent
Laroia et al.

(10) Patent No.: US 7,539,475 B2
(45) Date of Patent: May 26, 2009

(54) WIRELESS TERMINAL METHODS AND APPARATUS FOR DC TONE SPECIAL TREATMENT

(75) Inventors: Rajiv Laroia, Basking Ridge, NJ (US); Junyi Li, Bedminster, NJ (US); Hui Jin, Annandale, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 505 days.

(21) Appl. No.: 11/229,348

(22) Filed: Sep. 16, 2005

(65) Prior Publication Data
US 2007/0010226 A1 Jan. 11, 2007

Related U.S. Application Data

(60) Provisional application No. 60/697,898, filed on Jul. 8, 2005.

(51) Int. Cl.
H04B 1/10 (2006.01)
H04B 1/04 (2006.01)
H04B 17/00 (2006.01)

(52) U.S. Cl. ............... 455/296; 455/226.1; 455/222; 455/67.13; 455/114.2; 455/115.1; 370/317; 370/344

(58) Field of Classification Search ........... 455/296, 455/67.11, 67.13, 114.2, 115.1, 142, 220, 455/222, 226.1, 403, 501, 561, 570; 370/317, 370/319, 344
See application file for complete search history.

(56) References Cited
U.S. PATENT DOCUMENTS
5,990,734 A 11/1999 Wright et al.
(Continued)

FOREIGN PATENT DOCUMENTS
EP 1033853 9/2000
(Continued)

OTHER PUBLICATIONS
International Search Report with Written Opinion of the International Searching Authority, from International Application No. PCT/US2006/026675, dated Nov. 15, 2006, pp. 1-11.
(Continued)

Primary Examiner—Tony T Nguyen
(74) Attorney, Agent, or Firm—Michael P. Straub; James K O'Hare

(57) ABSTRACT

Special DC tone treatment in a wireless communications system, e.g., an OFDM system, is discussed. In the downlink, a wireless terminal receiver introduces self-interference at the DC tone from the RF/baseband conversion. A base station every so often does not transmit on the downlink DC tone while continuing to transmit on other downlink tones. Wireless terminals measure received signal on the downlink DC tone during the time of suspended DC tone transmission, estimate self-interference and apply a correction to other received downlink DC tones. In the uplink DC tone interference is a composite of the assigned wireless terminal transmitter's baseband/RF conversion self-interference and air link noise. During one symbol interval of an N symbol interval dwell, the uplink DC tone is reserved for a special modulation symbol, which is a predetermined function of the other N−1 modulation symbols. At the base station, its receiver receives a set of modulation symbols conveyed by the uplink DC tone for a dwell, calculates the average DC component and corrects the received N−1 modulation symbols.

31 Claims, 37 Drawing Sheets

U.S. PATENT DOCUMENTS

| | | |
|---|---|---|
| 6,131,016 A | 10/2000 | Greenstein et al. |
| 6,353,604 B2 | 3/2002 | Grimwood et al. |
| 7,257,089 B2 | 8/2007 | Metcalf et al. |
| 2003/0179776 A1 | 9/2003 | Sumasu et al. |
| 2005/0111525 A1 | 5/2005 | Bas et al. |
| 2006/0013327 A1 | 1/2006 | Sugar et al. |
| 2006/0269003 A1 | 11/2006 | Hammerschmidt et al. |

FOREIGN PATENT DOCUMENTS

| | | |
|---|---|---|
| EP | 1 450 506 A1 | 8/2004 |
| EP | 1 551 121 A1 | 7/2005 |

OTHER PUBLICATIONS

Dlugaszewki Z, et al. "Simple coarse frequency offset estimation schemes for ofdm burst transmission" Personal, Indoor and Mobile Radio Communications, 2002. The 13th IEEE International Symposium on Sep. 15-18, 200, Piscataway, NJ, USA, IEEE, vol. 2, Sep. 15, 2002, pp. 567-571, XP010614289.

Communication pursuant to Article 94(3) EPC.

International Preliminary Report of Patentability - PCT/US06/026675, IB Geneva Switzerland Jan. 10, 2008.

Written Opinion PCT/US06/026675 International Search Authority European Patent Office Jan. 8, 2008.

WIRELESS TERMINAL METHODS AND APPARATUS FOR DC TONE SPECIAL TREATMENT

RELATED APPLICATIONS

The present application claims the benefit of U.S. Provisional Patent Application Ser. No. 60/697,898, filed on Jul. 8, 2005, titled "METHODS AND APPARATUS FOR DC TONE SPECIAL TREATMENT", which is hereby expressly incorporated by reference.

FIELD OF THE INVENTION

The present invention relates to methods and apparatus for improving the communications for wireless communication devices using a DC tone.

BACKGROUND OF THE INVENTION

In many wireless communications systems such as a multiple access spread spectrum OFDM system, where the frequency band is subdivided into a set of tones, e.g., subcarriers, it is desired for the wireless terminal devices, e.g., mobiles, to convert directly, e.g., without an IF stage, from received RF to baseband in their receivers and directly from baseband to RF in their transmitters. As part of the conversion process, generally, some noise is introduced at the DC tone, e.g., self-interference. This noise is typically device dependent, generally a constant for a given device's receiver or transmitter, and may vary slowly, e.g., as a function of device temperature. This DC tone noise, if not compensated for, tends to degrade signaling performance. In some known applications, the DC tone is simply not used to convey information; however, such an approach wastes the air link resource.

One known approach to measuring and compensating for a mobile receiver's self-interference characteristics is to temporarily disconnect its input, perform test measurements, derive a compensation value from data collected during the suspension interval, and then use the compensation value as a correction. The testing interval can be at initialization and/or at subsequent intervals during operation. This approach has the disadvantage that it suspends the ability of the mobile to receive and process information on the complete set of downlink tones during the testing intervals thus increasing overhead and reducing throughput. This approach is particularly inefficient in embodiments where the complete set of downlink tones includes many additional tones in addition to the downlink DC tone. If the testing is limited to mobile initialization, then changes in the receiver due to thermal characteristics are not well compensated. On the other hand, periodic suspension of downlink signaling reception during operation is undesirable since it limits throughput capacity, may result in missed broadcast or assignment signals, introduces delays in paging, disrupts control loop signaling, and/or introduces disruptions in user data forwarding in communications sessions.

In the uplink, a base station is typically receiving uplink signals from a plurality of mobiles. At any one given time, one of the mobiles can use the uplink DC tone, and at different times, different mobiles may use the uplink DC tone. Each of the mobiles typically have different transmitter DC tone noise characteristics. In some embodiments, where a given mobile is assigned to use a set of uplink tones for a number of consecutive symbol time intervals, one approach to noise removal on the uplink is to include a predetermined fixed reference modulation signal conveyed by each tone of the set of allocated tones. For example, in an embodiment where a mobile is allocated a set of uplink tones to use for seven consecutive symbol intervals, the fourth symbol interval may be used to convey a fixed predetermined reference modulation symbol on each of the allocated uplink tones. The base station receives the reference modulation symbol for each tone, determines a difference from the expected value, and determines compensation values to use for the each tone. This approach has the disadvantage that it includes a relatively high amount of overhead for each of the uplink tones of the system, thereby reducing throughput significantly. This approach also does not take into account that the received DC tone has a different noise characteristic than the other tones of the system. In addition this approach does not take into account that the received measured modulation symbols may significantly change from one symbol interval to the next as a result of airlink interference variations. Using a single received reference symbol per tone for a set of consecutive symbol time intervals provides a poor correction value if the airlink interference happens to deviate from the average airlink interference during the single interval used to convey the reference modulation symbol. In addition the reference modulation symbol information, e.g., transmission power level used, needs to be controlled tightly by the wireless terminal, and known to the receiving base station.

In view of the above discussion, there is a need for improved methods and apparatus which provide means to measure and compensate for DC tone noise. Methods and apparatus that include special DC tone processing without interfering with the signaling on the other (non-DC tone) tones would be beneficial. Improved methods and apparatus that limit the amount of overhead used to achieve the DC tone noise characteristic compensation would be also beneficial. Methods and apparatus that provide for measuring of the DC tone characteristics during mobile operation, thus providing adjustments for thermal variations, without significantly disrupting in process communications sessions and/or control operations would also be useful. Methods and apparatus of measuring and compensating for uplink DC tone noise that are adapted to take into consideration: the variation in uplink DC tone assignment to different mobiles, the air link noise introduced, and the variation in air link noise from one symbol time to the next would be useful.

SUMMARY OF THE INVENTION

The present invention is directed to methods and apparatus for improving the communications for wireless communication devices using a DC tone.

Some embodiments and features of the invention are directed to wireless terminal methods and apparatus. The features and embodiments of the invention include the subject matter of the pending claims. Other features, embodiments and benefits of the invention are also discussed in the present application.

Some embodiments of the invention are directed to a method of operating a wireless terminal in a frequency division multiplexed system wherein signals are transmitted in a passband by a base station. One exemplary method includes receiving a passband signal and converting the received passband signal to a baseband signal. A DC tone exists in the baseband, the DC tone corresponding to a corresponding tone in the received passband signal, the baseband signal including additional baseband tones corresponding to additional passband tones. As part of the signal processing, the wireless terminal performs a signal measurement on the DC tone during a DC tone noise measurement period to generate a DC noise measurement value.

The method can further include recovering data during said DC noise measurement period from the additional baseband tones received during the noise measurement period. During a data transmission period, the wireless terminal may simultaneously receive data on the DC tone and the additional baseband tones. In such a case, the wireless terminal recovers data received on the DC tone during the data transmission period. The step of recovering data transmitted on said DC tone may include such operations as adjusting, during the data transmission period, a symbol value received on the DC tone as a function of the DC noise measurement value; and determining from the result of said adjustment a transmitted symbol value.

The noise measurement periods and data transmission periods may occur according to a predetermined downlink transmission schedule with the periods repeating over time according to the downlink transmission schedule. Accordingly, based on the downlink transmission schedule the wireless terminal can determine in which symbol transmission time periods a DC tone noise measurement should be performed and in which symbol transmission time periods data should be recovered from the DC tone. The number of symbol transmission time periods corresponding to DC noise measurement time periods will normally be considerably fewer, e.g., $\frac{1}{10}$ th or less, than the number of symbol transmission time periods during which information is recovered from the DC tone.

Various exemplary embodiments and features which are used in some but not necessarily all systems implemented in accordance with the invention will now be discussed briefly.

In the downlink, in some embodiments, a wireless terminal receiver introduces self-interference at the DC tone as part of the RF to baseband conversion process. The RF is sometimes referred to as the passband. The introduced self-interference is typically device dependent, generally a constant, and may vary slowly, e.g., as a function of temperature. In accordance with one feature of the present invention, a base station every so often, e.g., following a predetermined downlink timing sequence known to the base station and wireless terminals, does not transmit on the downlink DC tone, e.g., for a brief time interval which may be, e.g., of one or two symbols in duration. However, when transmission using the DC tone is suspended, downlink signaling continues on the other downlink tones. This approach is in contrast to known less efficient approaches where signaling reception is temporality suspended on all the tones by the wireless terminal to perform test measurements of the receiver. In accordance with the present invention, the wireless terminals measure the received signal on the downlink DC tone during the time of suspended transmission of the DC tone signal. The received signal can be characterized by the summation of receiver self-interference and other interference, e.g., air link random noise that should cancel out over time. Over time, an estimate of the self-interference characteristic of a wireless terminal's receiver with respect to the DC tone is obtained. Depending on the strength of the wireless terminal receiver's self-interference level, either a single measurement can be used to obtain a downlink DC tone correction value or multiple measurements can be used in a filter to obtain a downlink DC tone correction value. The wireless terminal applies the downlink DC tone correction value to other received downlink DC tones (e.g., the downlink DC tones received in the time interval of other symbols during which the DC tone is used for signal transmission), e.g., the received modulation symbols conveying data/information and/or reference symbols using the downlink DC tone. Depending upon the strength of the wireless terminal receivers' self-interference levels, the level of expected additive random noise, and an expected periodicity of the random noise, the frequency of downlink DC tone signal suspension for a given system can be set accordingly.

In the uplink, in some embodiments, the situation and approach used with respect to the uplink DC tone is different than the downlink case that was just described. In some embodiments, a wireless terminal converts a baseband signal to RF and transmits the signal to a base station. If the baseband signal includes the DC tone, the baseband to RF conversion introduces a DC tone self-interference wireless terminal transmitter noise characteristic to the signal. The wireless transmitter conversion DC tone noise characteristic is similar in nature to the wireless terminal receiver DC tone noise characteristic, being device dependent, relatively constant, and having a temperature dependency. In the uplink, a wireless terminal is typically assigned a set of tones to use for a dwell, a fixed number of consecutive symbol time intervals. From one dwell to the next, a different wireless terminal, with different transmitter uplink DC tone noise characteristics, may be assigned to use the uplink DC tone. In addition, the wireless terminal uplink signals are transmitted over the air where the transmitted signal is subject to additional corruption from air link interference. The base station receiver, in accordance with the present invention, estimates received uplink DC tone interference for each dwell independently, in accordance with features of the present invention. In accordance with one feature of the present invention, a wireless terminal, assigned to use the uplink DC tone for a dwell, conveys code data/information and/or reference modulation symbols on the DC tone for N−1 symbol intervals of a dwell. The dwell may, and in various embodiments does, include a total of N symbol intervals.

However, in some embodiments the dwell may include additional symbols, e.g., a training symbol interval, in addition to the N symbol intervals. In some such embodiments, N of the symbol intervals are used in accordance with the invention with N−1 of the symbols in the set of N symbols being used to communicate coded data and/or information.

In some but not necessarily all implementations, during one symbol interval of the dwell, the uplink DC tone is reserved for and used to convey a special modulation symbol, which is a function of the other N−1 modulation symbols. In accordance with a predetermined function known to both the base station and wireless terminal, the special modulation symbol is generated by the wireless terminal assigned to use the uplink DC tone for the dwell. In one embodiment including 7 OFDM symbols in a dwell, the $7^{th}$ modulation symbol using the uplink DC tone is the negative sum of the first six modulation symbols using the uplink DC tone. This embodiment of the present invention produces a zero average value for the modulation symbol of the uplink DC tone for each dwell. The other tones (non-DC uplink tones) of the dwell do not necessarily have any relationship between their modulation symbols. In a dwell of N symbols, the modulation symbols conveyed by the non-DC uplink tones during the N symbol time intervals and by the uplink DC tone during the N−1 symbol intervals can be from a set of modulation symbols used by the system for normal coding, e.g., QPSK, QAM16, QAM64, etc. and/or reference modulation signals. However, in accordance with one feature of the present invention, the special DC tone modulation symbol which is a function of the N−1 DC tone modulation symbols may be outside the set of normally used modulation symbols. At the base station, its receiver receives a set of modulation symbols conveyed by the uplink DC tone for a dwell; the base station knowing the relationship established between the set of modulation symbols by the wireless terminal transmitter based on the predetermined function used, calculates the DC component, and then removes the DC component from the received modulation symbols. For example, in the exemplary embodiment including seven symbols per dwell, where the special modulation symbol is the negative sum of other six modulation symbols, the base station received modulation symbols on the DC tone for a dwell are averaged, and the average value obtained is the uplink DC tone error estimation. Then, the estimated uplink DC tone error estimation value is removed from the first six modulation symbols of the dwell, and the processed received six modulation symbols are forwarded for normal decoding operations.

While various embodiments have been discussed in the summary above, it should be appreciated that not necessarily all embodiments include the same features and some of the features described above are not necessary but can be desirable in some embodiments. Numerous additional features, embodiments and benefits of the present invention are discussed in the detailed description which follows.

DETAILED DESCRIPTION OF THE INVENTION

Figure 1:
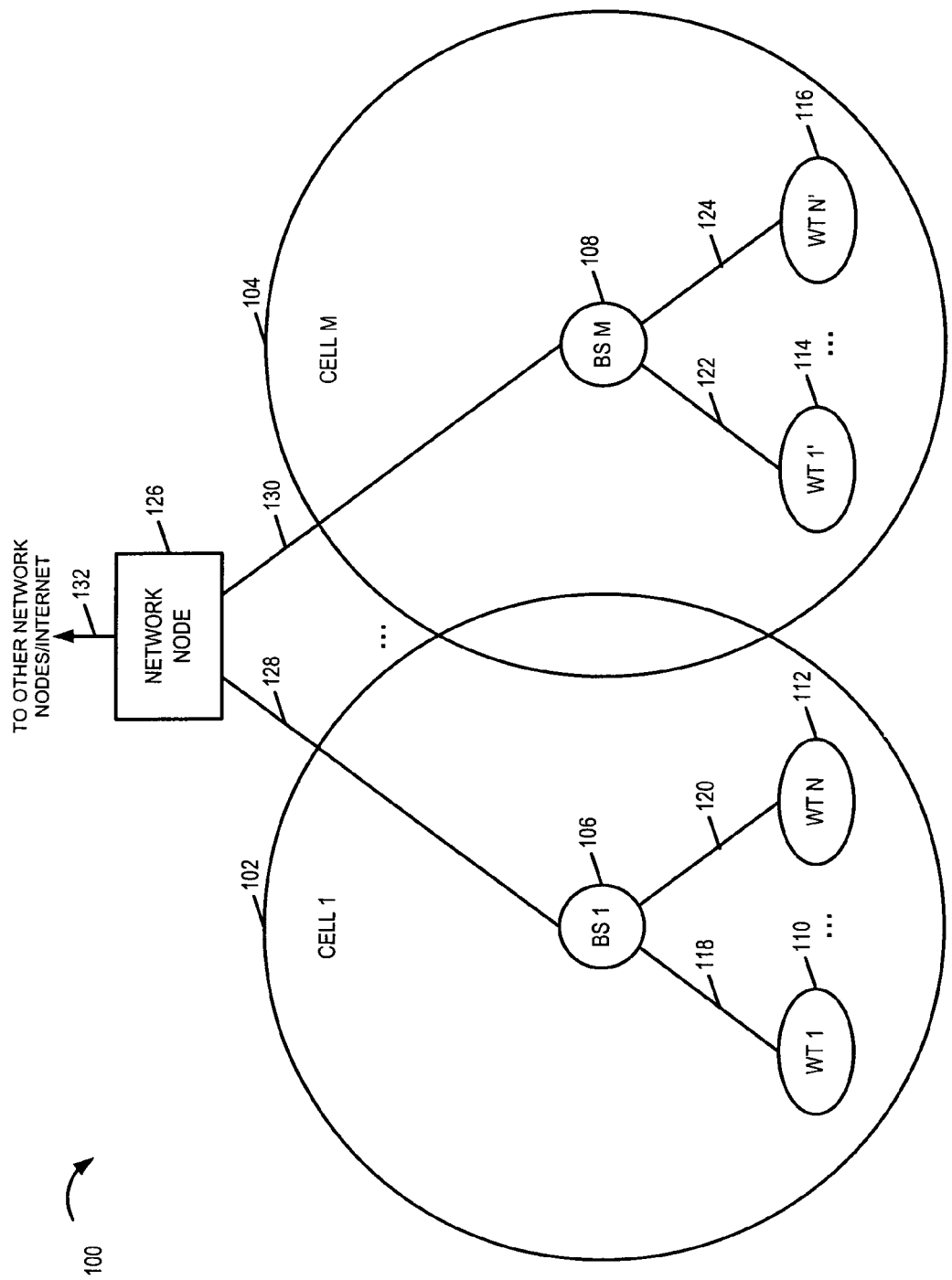
FIG. 1 is a drawing of an exemplary communications system, implemented in accordance with the present invention and using methods of the present invention.

FIG. 1 is a drawing of an exemplary communications system 100, implemented in accordance with the present invention and using methods of the present invention. System 100 includes apparatus and methods directed to downlink and uplink DC tones. Exemplary system 100 may be, e.g., an orthogonal frequency division multiplexing (OFDM) multiple access wireless communication system. System 100 includes a plurality of cells (cell 1 102, cell M 104). Each cell (cell 1 102, cell M 104) represents a wireless coverage area for a corresponding base station (BS 1 106, BS M 108), respectively. A plurality of wireless terminal (WTs) (WT 1 110, WT N 112, WT 1' 114, WT N' 116) are included in system 100. At least some of the WTs are mobile nodes (MNs); the MNs may move throughout the system 100 and establish wireless links with different BSs, the BS corresponding to the cell in which the WT is currently located. In FIG. 1, (WT 1 110, WT N 112) are coupled to BS 1 106 via wireless links (118, 120), respectively; (WT 1' 114, WT N' 116) are coupled to BS M 108 via wireless links (122, 124), respectively.

The BSs (106, 108) are coupled to network node 126 via network links (128, 130), respectively. Network node 126 is coupled to other network nodes, e.g., routers, other base stations, AAA server nodes, Home Agent nodes, etc. and/or the Internet via network link 132. Network links 128, 130, 132 may be, e.g., fiber optic links. Network node 126 and networks links 128, 130, 132 are part of a backhaul network linking various BSs in different cells together and providing connectivity so that a WT located in one cell can communicate with a peer node in a different cell.

System 100 is shown having cells with one sector per cell. The methods and apparatus of the present invention are also applicable in systems having more than one sector per cell, e.g., 2, 3, or more than 3 sectors per cell. In addition the methods and apparatus of the present invention are applicable in systems having different numbers of sectors per cell in different portions of the system.

Figure 2:
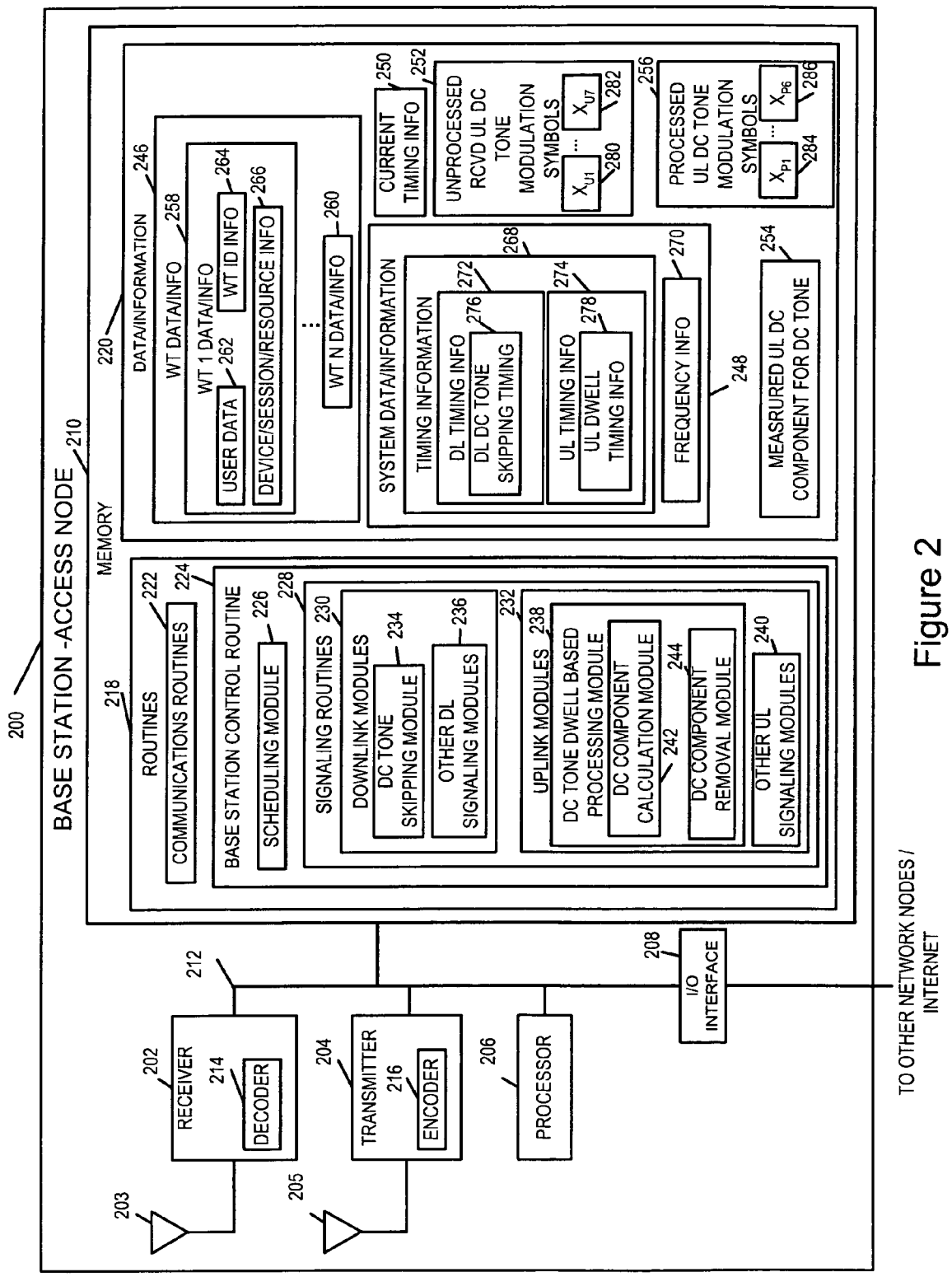
FIG. 2 is a drawing of an exemplary base station, implemented in accordance with the present invention and using methods of the present invention.

FIG. 2 is a drawing of an exemplary base station 200, implemented in accordance with the present invention and using methods of the present invention. Exemplary BS 200 is sometimes referred to as an access node. BS 200 may be any of the BS (106, 108) of system 100 of FIG. 1. Exemplary BS 200 includes a receiver 202, a transmitter 204, a processor 206, I/O interface 208, and memory 210 coupled together via a bus 212 over which the various elements may interchange data and information.

Receiver 202 is coupled to receive antenna 203 through which BS 200 may receive uplink signals from a plurality of wireless terminals. Receiver 202 includes a decoder 214 for decoding received encoded uplink signals.

Transmitter 204 is coupled to transmit antenna 205 over which downlink signals are sent to a plurality of wireless terminals. Transmitter 204 includes an encoder 216 for encoding information prior to transmission.

I/O interface 208 couples the BS 200 to other network nodes, e.g., routers, other base stations, AAA server nodes, Home Agent nodes and/or the Internet. I/O interface 208 provides an interface to a backhaul network providing interconnectivity between nodes in different cells.

Memory 210 includes routines 218 and data/information 220. The processor 206, e.g., a CPU, executes the routines 218 and uses the data/information 220 in memory 210 to operate the BS 200 and implement methods of the present invention.

Routines 218 include communications routines 222 and base station control routines 224. The communications routines 222 implement various communications protocols used by BS 200.

The base station control routines 224 control the operation of BS 200 including receiver 202 operation, transmitter 204 operation, I/O interface 208 operation, scheduling, power control, timing control, uplink signaling including special processing of received signals conveyed via the uplink DC tone, and downlink signaling including the occasional intentional omission of signals on the downlink DC tone. Base station control routines 224 include a scheduling module 226, and signaling routines 228. The scheduling module 226, e.g., a scheduler, schedules uplink and downlink channel air link resources, e.g., segments, to wireless terminal users. As a result of the uplink segment scheduling performed by scheduling module 226, the uplink DC tone may be assigned to different wireless terminal users from one dwell to another dwell.

Signaling routines 228 include downlink modules 230 and uplink modules 232. The downlink modules 230 include a DC tone skipping module 234 and other downlink signaling modules 236. DC tone skipping module 234 controls operation of the transmitter 204 so that occasionally, e.g., at predetermined OFDM symbol transmission time intervals within the base station's downlink timing structure, the downlink DC tone is not used to transmit any signal, thus facilitating WT 300 (see FIG. 3) receiver measurements of self interference. Other downlink signaling modules 236 include, e.g., downlink power control modules, downlink timing control modules, downlink traffic channel modules, beacon signaling modules, and pilot signaling modules. The uplink modules 238 include a DC tone dwell based processing module 238 and other uplink signaling modules 240. The DC tone dwell based processing module 238 includes a DC component calculation module 242 and a DC component removal module 244. DC component calculation module 242 estimates a DC component for the uplink DC tone on a dwell by dwell basis processing the set of received modulation symbols conveyed by the uplink DC tone for the dwell. A predetermined relationship, known to both BS 200 and WT 300, exists between the modulation symbols conveyed by the uplink DC tone for a dwell. In addition, one of the modulation symbols in the set of modulation symbols for the uplink DC tone in a dwell is a function of the other modulation symbols. For example, in some embodiments, the dwell includes 7 OFDM symbol time intervals, and the modulation symbol assigned to uplink DC tone for the seventh OFDM symbol time interval of the dwell is the negative summation of the first six modulation symbols conveyed by uplink DC tone during the dwell; this has the effect of setting the average value of the DC tone modulation symbol during a dwell equal to 0. Module 242 uses the known relationship between the modulation symbols of the uplink DC tone in a dwell to calculate the DC component. In some embodiments, module 242 calculates the DC component by averaging the received modulation symbols conveyed by the uplink DC tone during each OFDM symbol time interval of the dwell. DC component removal module 244 removes the DC component, determined by DC component calculation module 242 from the set of received uplink DC tone modulation symbols for the dwell, excluding the one received modulation signal used to create the relationship between the set of modulation symbols of the dwell and thus facilitate the DC component calculation.

Other uplink signaling modules 240 include signaling modules used to control the reception and processing of uplink signals from WTs including uplink traffic channel signals conveying user data, control channel signals conveying timing and power control information, resource request signaling, and registration signaling.

Data/information 220 includes WT data/information 246 and system data/information 248, current timing information 250, unprocessed received uplink DC tone modulation symbols 252, a measured DC component for uplink DC tone 254, and processed uplink DC tone modulation symbols 256. WT data/information 246 includes a plurality of sets of WT data/information (WT 1 data/information 258, WT N data/information 260). Each set of WT data/info (258, 260) corresponds to a WT using or requesting to use BS 200 as a point of network attachment. WT 1 data/info 258 includes user data 262, WT ID information 264, and device/session/resource information 266. User data 262 includes data/information from WT 1 intended to be transmitted to peer nodes of WT 1 in communications sessions with WT 1 and data/information received from peer nodes of WT 1 intended to be forwarded to WT 1. WT ID information 264 includes identification information associated with WT1 including, e.g., an IP address and a BS 200 assigned active user identifier. Device/session/resource information 266 includes uplink and downlink segments, e.g., traffic channel segments, assigned to WT 1 by scheduling module 226 and session information including address and routing information pertaining to peer nodes of WT1 in communication sessions with WT 1.

System data/information 248 includes timing information 268 and frequency information 254. Timing information 268 includes downlink timing information 272 and uplink timing information 274. Downlink timing information 272 includes downlink timing structure information used by BS 200, e.g., OFDM symbol timing information, grouping of OFDM symbols such as halfslots, slots, superslots, beacon slots, ultra slots. Downlink timing information 272 also includes downlink DC tone skipping timing information 276. Downlink DC tone skipping timing information 276 identifies which OFDM symbol time intervals within the downlink timing structure, e.g., within the ultra slot, are designated for no signal transmission with respect to the downlink DC tone. Uplink timing information 274 includes uplink timing structure information used by BS 200 which includes uplink dwell timing information 278. The uplink dwell timing information 278 includes information grouping uplink OFDM symbol time intervals into sets, e.g., a set for an exemplary dwell including seven successive OFDM symbol time intervals in which the uplink tones are not frequency hopped during the dwell.

Frequency information 270 includes frequency structure information such as downlink carrier frequency, downlink bandwidth, downlink tones, uplink carrier frequency, uplink bandwidth, uplink tones, frequency tone hopping sequences including downlink tone hopping sequences on a per OFDM symbol time interval basis and uplink tone hopping sequences on a per dwell time basis, identification of the DC downlink tone, and identification of the DC uplink tone. Frequency information 270 includes downlink frequency information for both the RF, sometimes referred to as the passband, and the corresponding baseband. Frequency information 270 also includes uplink frequency information for both the RF, sometimes referred to as the passband, and the corresponding baseband.

Current timing information 250 includes information used for referencing the current point in time with respect to a point, e.g., an OFDM symbol time interval, within the overall timing structure, e.g., a repetitive timing structure, used by BS 200. DC tone skipping module 234 uses the current timing information 250 in conjunction with the system downlink timing information 272 to decide when to treat the downlink DC tone in a special manner and not transmit signal. DC tone dwell based processing module 238 uses the current timing information 250 in conjunction with the system uplink timing information 274 for identifying dwell boundaries and identifying OFDM symbol index within the dwell. Each dwell is processed separately with regard to the uplink DC tone, as each dwell may be associated with a different wireless terminal and have different DC component characteristics.

Unprocessed received uplink DC tone modulation symbols includes a set of received modulation symbols which have been conveyed via the uplink DC tone ($X_{U1}$ 280, ..., $X_{U7}$ 282), each received modulation symbol corresponding to the uplink DC tone during one OFDM symbol time interval of the dwell. Processed uplink DC tone modulation symbols 256 includes a set of processed modulation symbols ($X_{P1}$ 284, ... $X_{P6}$ 286) associated with the uplink DC tone during a dwell, the processing including the determination and removal of a DC component by module 238. The set of processed UL DC tone modulation symbols 256 includes one less element than the set of unprocessed received uplink DC tone modulation symbols 252. Measured DC component for DC uplink tone 254 is the result of the DC component calculation module 242 operating on a set of unprocessed received uplink DC modulation tones 252 for a given dwell and is used by the DC component removal module 244 to obtain a set of processed UL DC tone modulation symbols 256. The set of processed DC tone modulation symbols 256 is forwarded to decoder 214 to continue with the normal decoding operation of the received uplink signaling.

Figure 3:
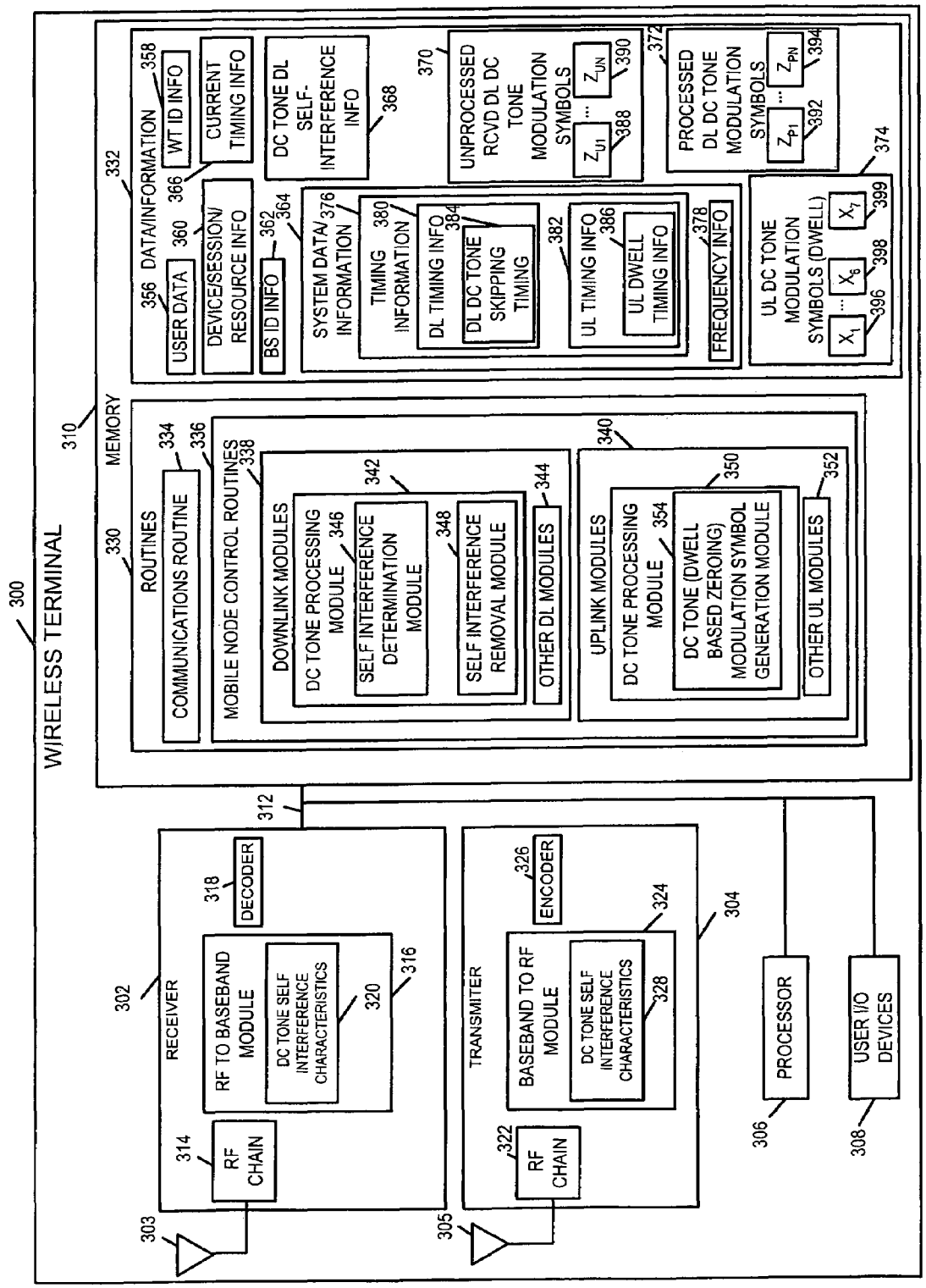
FIG. 3 is a drawing of an exemplary wireless terminal, implemented in accordance with the present invention and using methods of the present invention.

FIG. 3 is a drawing of an exemplary wireless terminal 300, implemented in accordance with the present invention and using methods of the present invention. WT 300 may be any of the WTs (110, 112, 114, 116) of system 100 of FIG. 1. Exemplary WT 300 includes a receiver 302, a transmitter 304, a processor 306, user I/O devices 308, and memory 310 coupled together via a bus 312 over which the various elements may interchange data and information.

Receiver 302 includes a single RF chain 314, an RF to baseband module 316 and a decoder 318. RF chain 314 is coupled to receive antenna 303 through which downlink signals from BS 200 are received. RF to baseband module 316 converts received RF downlink signals, using a selected carrier frequency associated with the BS 200 point of network attachment, to baseband signals. The baseband includes a set of downlink tones including a DC tone. The RF to baseband module 320 of receiver 302 has a DC tone self-interference characteristic 320 representative of errors introduced into received modulation symbols associated with the downlink DC tone as part of the RF to baseband conversion process. DC tone self interference characteristic 320 is primarily a function of the receiver 302 circuitry, design, offsets and tolerances. Changes in DC tone self interference characteristics 320 may be a function of temperature and temperature variation within receiver 302. Apparatus and methods of the present invention facilitate estimation and removal of DC tone self interference characteristic 320. Decoder 318 is used by WT 300 to decode received downlink signals from BS 200.

Transmitter 304 includes an encoder 326, a baseband to RF module 328, and an RF chain 322. Signals to be transmitted by WT 300 are encoded by encoder 326. The encoded signals are converted from baseband to RF by baseband to RF module 324. The baseband to RF module 324 includes a DC tone self-interference characteristic 328 associated with the conversion process for transmitter 304. Modulation symbols conveyed on the uplink DC tone are corrupted during the conversion process to RF by the inherent DC tone interference characteristics of transmitter 304. The RF chain 322 is coupled to a transmit antenna 305 through which uplink signals are transmitted to BS 200 using the selected uplink carrier frequency associated with the BS 200 point of network attachment.

User I/O devices 308 includes, e.g., microphones, speakers, keypad, keyboard, mouse, touchscreen, camera, displays, alarms, vibration device, etc. Various user I/O devices 308 are used to input user data/information intended for peer nodes of WT 300 and to output received data/information from peer nodes of WT 300. In addition, user I/O devices 308 are used by an operator of WT 300 to initiate various functions, e.g., power on, power off, place a call, terminate a call, etc.

Memory 310 includes routines 330 and data/information 332. The processor 306, e.g., a CPU, executes the routines 330 and uses the data/information 332 in memory 310 to control the operation of WT 300 and implement the methods of the present invention.

Routines 330 include a communications routine 334 and mobile node control routines 336. The communications routine 334 implements the various communications protocols used by the WT 300. The mobile node control routines 336 controls operations of WT 300 including the operation of receiver 302, transmitter 304, and user I/O devices 308. Mobile node control routines 336 include downlink modules 338 and uplink modules 340.

Downlink modules 338 include DC tone processing module 342 and other downlink modules 344. The DC tone processing module 342 includes a self-interference determination module 346 and a self interference removal module 348. Self-interference determination module 346 estimates the value of the DC tone self interference characteristic 320 of receiver 302. In accordance with the present invention, BS 200 occasionally, e.g., on a predetermined scheduled basis known to both BS 200 and WT 300, suspends the transmission of signal using the downlink DC tone. Self-interference determination module 346 identifies the intervals of no downlink DC tone transmission signal by BS 200, and identifies the measured received signal on the downlink DC tone during this interval as noise. The measured received noise is a combination of self-interference 320 generated by receiver 302, which is essentially constant over time, and other types of interference, which is essentially random noise over time, e.g., random noise over the air link. The random noise will tend to cancel out over time. In some embodiments, if the self-noise 320 of the receiver 302 is strong, the self interference determination module 346 can take measurements for one OFDM symbol interval where the BS 200 has not transmitted on the downlink DC tone and obtain a value of self-interference to apply for noise removal on downlink DC tones. In some embodiments, the self-interference determination module 346 measures the noise levels for several spaced OFDM symbol intervals where the BS has not transmitted the downlink DC tone. The self-interference determination module 346 can use averaging or filtering to separate the essentially constant self-interference from the random noise which tends to cancel out over time. Self-interference removal module 344 uses the estimated value of self-interference determined by module 346 and subtracts it from the received signal with respect to the downlink DC tone.

Other downlink modules 344 include downlink traffic channel signal processing module, downlink pilot signal processing module, beacon signal processing module, and other downlink control signaling related modules.

Uplink modules 340 includes uplink DC tone processing module 350 and other uplink modules 352. The UL DC tone processing module 350 determines whether WT 300 has been scheduled to use the uplink DC tone during a given dwell, e.g., whether the WT 300 has been scheduled by BS 200 to use a segment that includes the uplink DC tone. If WT 300 has been scheduled to use the DC tone, then DC tone (dwell based zeroing) modulation symbol generation module 354 is used. The DC tone processing module 350 includes a DC tone (dwell based zeroing) modulation symbol generation module 354. For a given dwell including N OFDM time intervals, DC tone (dwell based zeroing) modulation symbol generation module 354, when employed, generates a special modulation symbol as a function of the (N−1) modulation symbols, each of the (N−1) modulation symbols to be conveyed by the uplink DC tone during one OFDM symbol time interval and the special generated modulation symbol being conveyed in the remaining OFDM symbol time interval of that dwell also using the uplink DC tone.

In one embodiment, wherein the dwell includes 7 OFDM symbol time intervals, the special modulation symbol generated by module 354 is the negative of the sum of the other six modulation symbols; this results in a zero average value of the modulation symbol for the dwell with regard to uplink DC tone. Other uplink modules 352 include, e.g., uplink traffic channel modules, uplink power control modules, uplink timing control modules, and uplink timing control modules.

Data/information 332 includes user data 356, WT ID information 358, device/session/resource information 360, base station ID information 362, system data/information 364, current timing information 366, DC tone self-interference information 368, unprocessed received downlink DC tone modulation symbols 370, processed downlink DC tone modulation symbols 372, and uplink DC tone modulation symbols 374. User data 356 includes data/information intended for a peer of WT 300 in a communications session with WT 300 intended to be transmitted by WT 300 to BS 200 over uplink traffic channel segments. User data 356 also includes data/information sourced from a peer of WT 300 in a communications session with WT 300 and received from BS 200 via downlink traffic segments. Wireless terminal identification information 358 includes, e.g., a WT IP address and a BS 200 assigned WT active user identifier. Device/ session/resource information 360 includes uplink and downlink segments, e.g., traffic channel segments, assigned to WT 300 and session information including address and routing information pertaining to peer nodes of WT 300 in communication sessions with WT 300. Base station identification information 362 includes an identifier, e.g., a value of slope in a pilot tone hopping sequence or some other indicator, associated with the BS 200 being used as the current point of network attachment for WT 300.

System data/information 364 includes timing information 376 and frequency information 378. System data/information 364 may include different sets of information corresponding to the different base stations 200 that WT 300 may use as a network point of attachment. Timing information 376 includes downlink timing information 380 and uplink timing information 382. Downlink timing information 380 includes downlink timing structure information used by BS 200, e.g., OFDM symbol timing information, grouping of OFDM symbols such as halfslots, slots, superslots, beacon slots, ultra slots. Downlink timing information 380 also includes downlink DC tone skipping timing information 384. Downlink DC tone skipping timing information 384 identifies which OFDM symbol time intervals within the downlink timing structure, e.g., within the ultra slot, are designated for no signal transmission with respect to the downlink DC tone. Uplink timing information 382 includes uplink timing structure information used by BS 200 which includes uplink dwell timing information 386. The uplink dwell timing information 386 includes information grouping uplink OFDM symbol time intervals into sets, e.g., a set for an exemplary dwell including seven successive OFDM symbol time intervals in which the uplink tones are not frequency hopped during the dwell.

Frequency information 378 includes frequency structure information such as downlink carrier frequency, downlink bandwidth, downlink tones, uplink carrier frequency, uplink bandwidth, uplink tones, frequency tone hopping sequences including downlink tone hopping sequences on a per OFDM symbol time interval basis and uplink tone hopping sequences on a per dwell time basis, identification of the DC downlink tone, and identification of the DC uplink tone. Frequency information 378 includes downlink frequency information for both the RF, sometimes referred to as the passband, and the corresponding baseband. Frequency information 378 also includes uplink frequency information for both the RF, sometimes referred to as the passband, and the corresponding baseband.

Current timing information 366 includes information used for referencing the current point in time with respect to a point, e.g., an OFDM symbol time interval, within the overall timing structure, e.g., a repetitive timing structure, used by BS 200. DL DC tone processing module 342 uses the current timing information 366 in conjunction with the system downlink timing information 380 to decide when to treat the received downlink DC tone in a special manner and evaluate the received DL DC tone for self-interference. DC tone dwell based zeroing modulation symbol generation module 354 uses the current timing information 366 in conjunction with the system uplink timing information 382 for identifying dwell boundaries and identifying OFDM symbol index within the dwell.

DC tone downlink self-interference information 368 includes an obtained value of DC tone self-interference determined by module 342 and used by module 348, the value being an estimate of the DC tone self-interference characteristics 320 of receiver 302. DC tone self-interference information 368 also includes filtering information, e.g., filter constants used by module 346.

Unprocessed received downlink DC tone modulation symbols 370 includes received modulation symbols which have been conveyed via the downlink DC tone ($Z_{U1}$ 388, ..., $Z_{UN}$ 390), each received modulation symbol corresponding to the downlink DC tone during one OFDM symbol time interval. Processed downlink DC tone modulation symbols 372 includes processed modulation symbols ($Z_{P1}$ 392, ... $Z_{PN}$ 394) associated with the downlink DC tone, the processing including the determination and removal of a DC component by downlink DC tone processing module 342.

Uplink DC tone modulation symbols 374 includes a set of modulation symbols to be conveyed on the uplink DC tone ($X_1$ 396, ... $X_6$ 398, $X_7$ 399), each modulation symbol corresponding to one OFDM symbol time interval of a dwell. In this exemplary embodiment of FIG. 3, the dwell includes 7 OFDM symbol time intervals. $X_1$ 396, ... $X_6$ 398 are ordinary modulation symbols, e.g., from a set of modulation symbols used by WT 300 to convey data/information, control information, and/or reference symbols. In accordance with the invention, $X_7$ 399 is a modulation symbol which is a function of the other six modulation symbols ($X_1$ 396 ... $X_6$ 398) and may be outside the range or set of ordinary modulation symbols used by WT 300 for data/information, control signaling, and/or reference signaling. In one embodiment, the value of modulation symbol $X_7$ equals the negative of the weighted summation of the values of modulation symbols $X_1$ 396 through $X_6$ 398.

Figure 4:
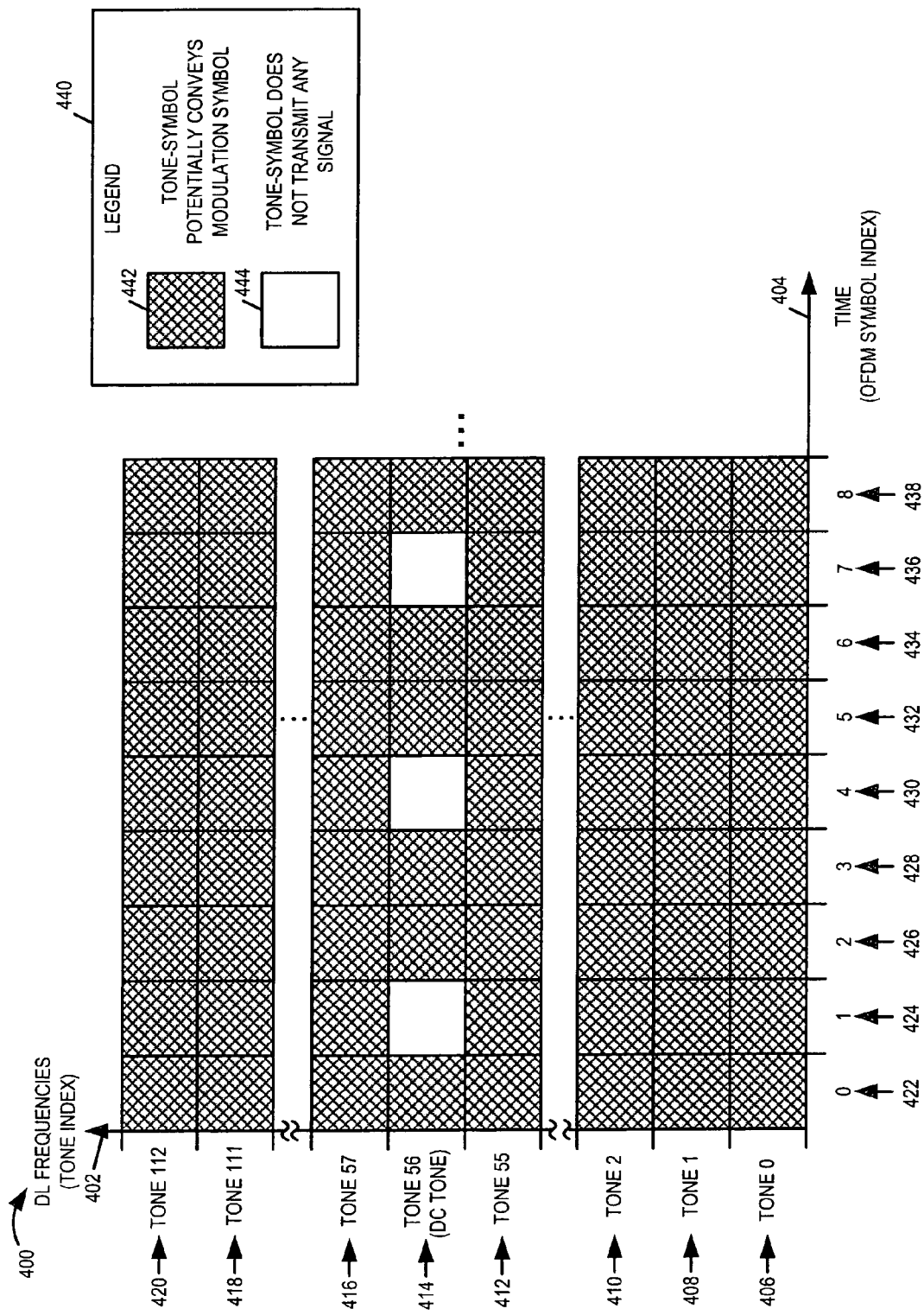
FIG. 4 is a drawing illustrating an exemplary OFDM downlink time frequency grid illustrating occasional suspension of signaling on the DC tone in accordance with the present invention.

FIG. 4 is a drawing illustrating an exemplary OFDM downlink time frequency grid 400 illustrating occasional suspension of signaling on the DC tone in accordance with the present invention. Grid 400 is a plot of downlink frequencies (tone index) on vertical axis 402 vs time (OFDM symbol index) on horizontal axis 404. A basic unit of the grid 400 is an OFDM tone-symbol shown as a square and representing one tone for the duration of one OFDM symbol time interval. Legend 440 is used to indicate the status of tone-symbols in grid 400. A tone-symbol of type 442 shown as a square with cross hatch shading indicated that the tone-symbol potentially conveys a modulation symbol. A tone symbol of type 444 shown as a square with no shading indicates that the tone-symbol does not transmit any signal, in accordance with a feature of the present invention. Vertical axis 402 illustrates that the downlink is divided into a set of tones, e.g., 113 tones (tone 0 406, tone 1 408, tone 2 410, ..., tone 55 412, tone 56 414, tone 57 416, ..., tone 111 418, tone 112 420). Tone 56 414 is the downlink DC tone. Generally, the downlink DC tone is a tone at or near the center of the set of downlink frequency tones used. When the downlink signal is downconverted to the baseband at the wireless terminal, the downlink DC tone generally corresponds to a baseband tone at or near zero frequency. Horizontal axis 404 illustrates 9 exemplary successive OFDM symbol intervals (interval 0 422, interval 1 424, interval 2 426, interval 3, 428, interval 4 430, interval 5 432, interval 6 434, interval 7 436, interval 8 438). In grid 400, each of the tone symbols corresponding to tone 0 406 through tone 55 412 and tone 57 416 through tone 112 420 can potentially convey a modulation symbol in any OFDM symbol interval. However, tone 56 414, the downlink DC tone, receives special treatment in accordance with the present invention. During most of the time, the downlink DC tone can potentially convey a modulation symbol; however, occasionally, the downlink DC tone does not transmit any signal as illustrated in OFDM time intervals 1 424, 4 430, and 7 436. The skipping pattern can be predetermined and known to both the base station and wireless terminals. The skipping pattern can be chosen in relation to the system characteristics including levels of expected random air link interference and self-interference receiver characteristics of the wireless terminals of the system. This occasional skipping of the use of the downlink DC tone, allows wireless terminal receivers, which know the timing corresponding to the skipping, to measure and determine their self-interference noise levels with respect to the DC downlink tone. During an interval such as interval 1 424, the processed DC tone received signal by a wireless terminal, after conversion from RF to baseband, will be predominately the summation of receiver self-interference, generally a relatively constant level, plus air link noise, generally a random signal which averages out over time and thus can be removed.

Figure 23:
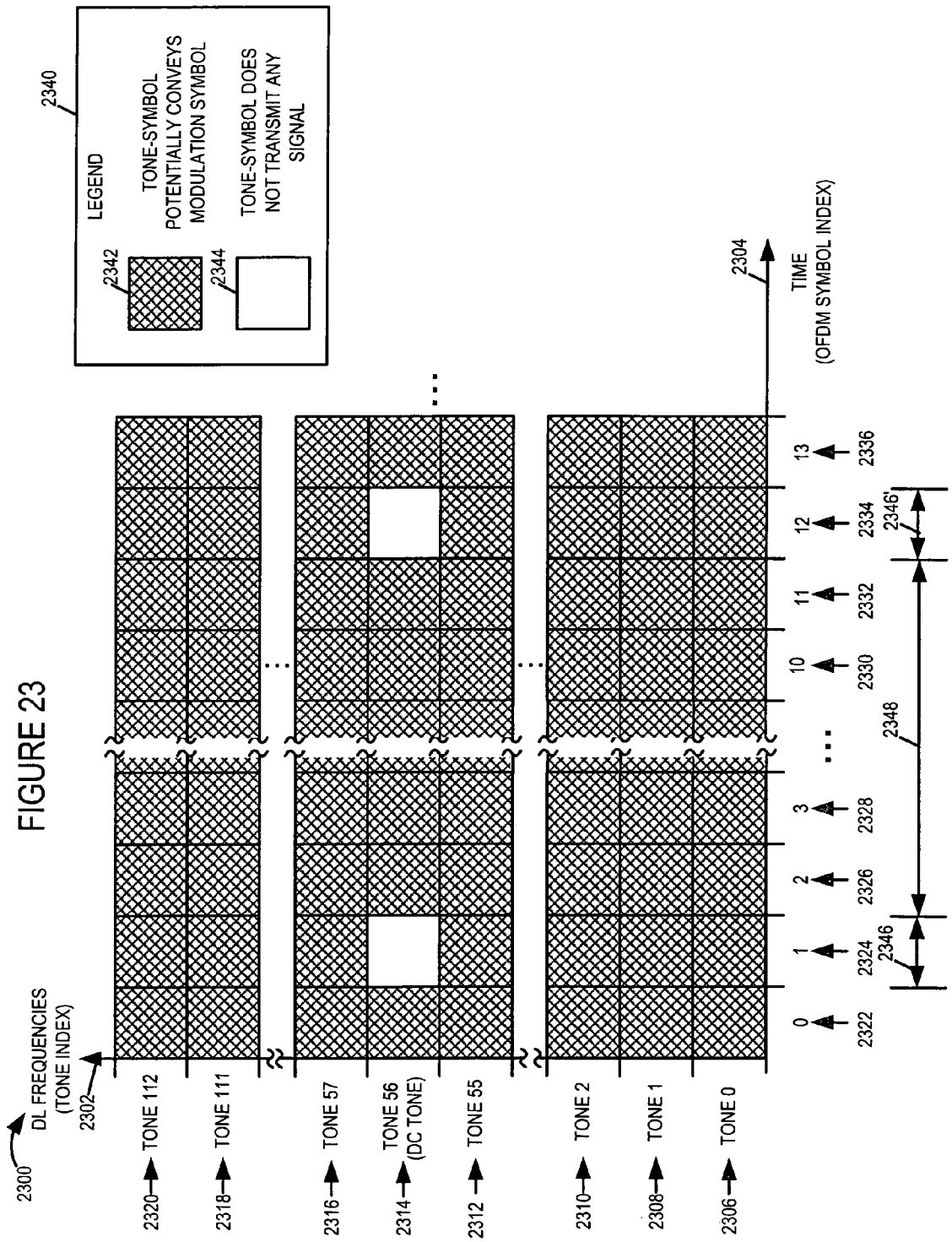
FIG. 23 is a drawing illustrating an exemplary OFDM downlink time frequency grid illustrating another example of the suspension of signaling on the DC tone in accordance with the present invention.

FIG. 23 is a drawing illustrating an exemplary OFDM downlink time frequency grid 2300 illustrating another example of the suspension of signaling on the DC tone in accordance with the present invention. Grid 2300 is a plot of downlink frequencies (tone index) on vertical axis 2302 vs time (OFDM symbol index) on horizontal axis 2304. A basic unit of the grid 2300 is an OFDM tone-symbol shown as a square and representing one tone for the duration of one OFDM symbol time interval. Legend 2340 is used to indicate the status of tone-symbols in grid 2300. A tone-symbol of type 2342 shown as a square with cross hatch shading indicated that the tone-symbol potentially conveys a modulation symbol. A tone symbol of type 2344 shown as a square with no shading indicates that the tone-symbol does not transmit any signal, in accordance with a feature of the present invention. Vertical axis 2302 illustrates that the downlink is divided into a set of tones, e.g., 113 tones (tone 0 2306, tone 1 2308, tone 2 2310, . . . , tone 55 2312, tone 56 2314, tone 57 2316, . . . , tone 111 2318, tone 112 2320). Tone 56 2314 is the downlink DC tone. Generally, the downlink DC tone is a tone at or near the center of the set of downlink frequency tones used. Horizontal axis 2304 illustrates exemplary successive OFDM symbol intervals (interval 0 2322, interval 1 2324, interval 2 2326, interval 3, 2328, . . . , interval 10 2330, interval 11 2332, interval 12 2334, interval 13 2336, . . . ). In grid 2300, each of the tone symbols corresponding to tone 0 2306 through tone 55 2312 and tone 57 2316 through tone 112 2320 can potentially convey a modulation symbol. However, tone 56 2314, the downlink DC tone, receives special treatment in accordance with the present invention. During most of the time, the downlink DC tone can potentially convey a modulation symbol; however, occasionally, the downlink DC tone does not transmit any signal as illustrated in OFDM time intervals 1 2324 and 12 2334. From the DC tone perspective, intervals 2346 and 2346' can be considered a DC noise measurement interval, while interval 2348 can be considered a data period. In data period 2348 10 symbols can be recovered by a wireless terminal on the downlink DC tone, one recovered modulation symbol corresponding to each OFDM symbol index (2 . . . 11) time interval. The data period, interval 2348, of the example of FIG. 23 is 10 times longer than the DC tone noise measurement period, e.g., interval 2346.

Figure 5:
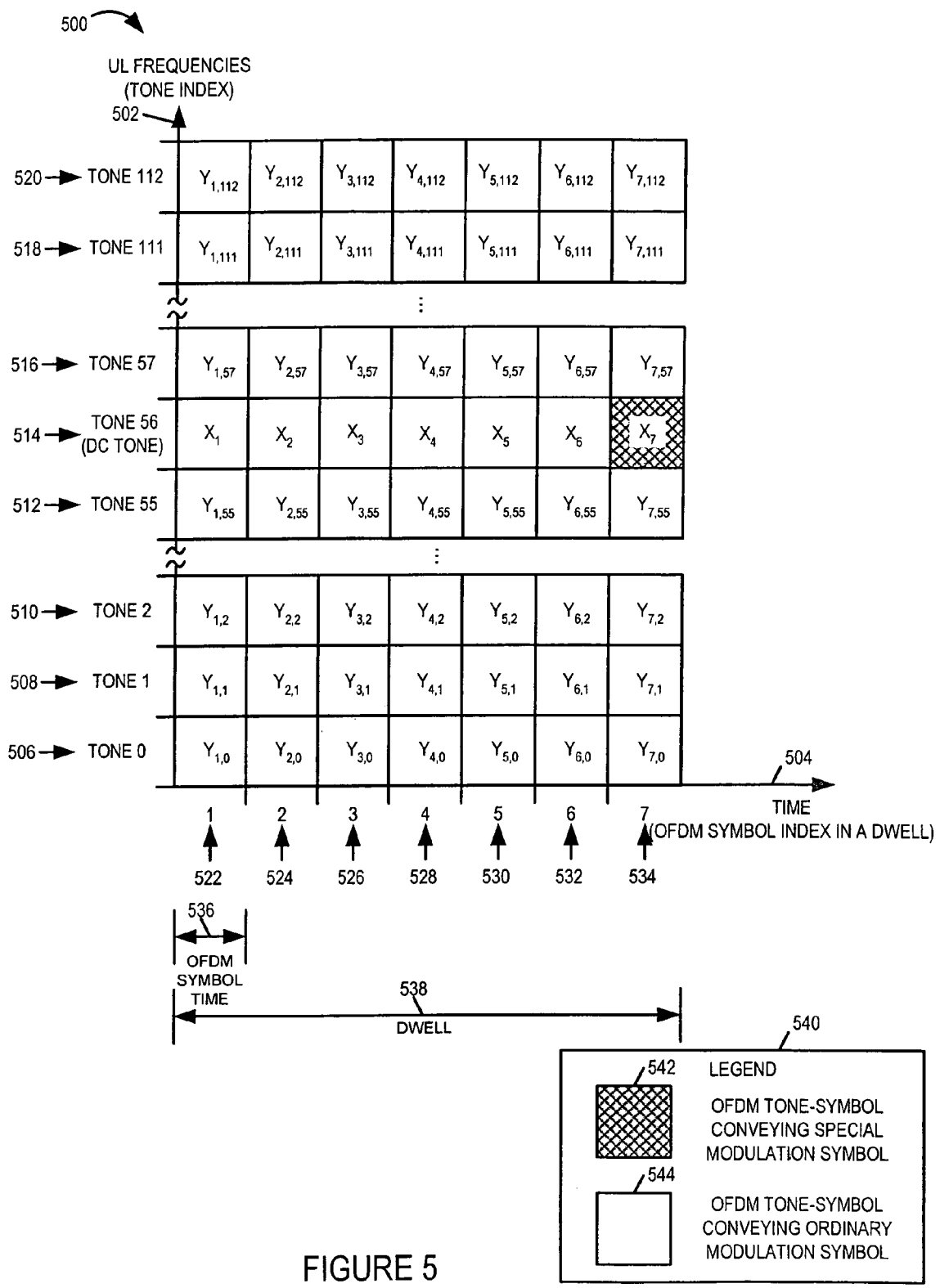
FIG. 5 is a drawing illustrating an exemplary OFDM uplink time frequency grid for a dwell illustrating special treatment of the DC tone in accordance with the present invention.

FIG. 5 is a drawing illustrating an exemplary OFDM uplink time frequency grid 500 for a dwell 538 illustrating special treatment of the uplink DC tone 514 in accordance with the present invention. Grid 500 plots uplink frequencies (tone index) on vertical axis 502 vs time (OFDM symbol index in a dwell) on horizontal axis 504. The basic unit of vertical axis 502 is the tone, while the basic unit of the horizontal axis is the OFDM symbol time 536. The exemplary uplink is illustrated to include 113 tones (tone 0 506, tone 1 508, tone 2 510, . . . , tone 55 512, tone 56 514, tone 57 516, . . . , tone 111 518, tone 112 520.) The uplink DC tone in this example is tone 56 514. In general, the uplink DC tone is at or near the center of the set of uplink tones. At the baseband at the wireless terminal transmitter, the uplink DC tone generally corresponds to a baseband tone at or near zero frequency. When the uplink signal is up-converted to the passband, the uplink DC tone may correspond to the center of the uplink bandwidth. In other embodiments, the uplink may use a different number of tones. The example of FIG. 5 illustrates a dwell 536 with seven OFDM symbol time intervals (interval 1 522, interval 2 524, interval 3 526, interval 4 528, interval 5 530, interval 6 532, interval 7 534). A dwell is a time interval consisting of multiple OFDM symbol intervals during which a given tone is used by the same wireless terminal. In other embodiments, a dwell may include a different number of OFDM symbol time intervals. In accordance with the invention, the DC tone receives special treatment; for one OFDM symbol time interval within the dwell, the DC tone conveys a modulation symbol which is a function of the modulation symbols conveyed by the DC tone for the other OFDM symbol time intervals of the same dwell. In the example of FIG. 5, the seventh OFDM interval 534 conveys the special modulation symbol. Note that any one of the OFDM symbols in a dwell can convey the special modulation symbol. The OFDM symbol used to convey the special modulation symbol can be predetermined and known to both the base station and wireless terminals. Legend 540 illustrates the basic unit of grid 500 a tone-symbol represented by a square box. In grid 500 if a tone symbol is of type 542, as illustrated by cross-hatch shading, the OFDM tone-symbol conveys a special modulation symbol, in accordance with the present invention, while if the tone-symbol is of type 544, as indicated by no shading, the tone-symbol can convey an ordinary modulation symbol. In grid 500, the modulation symbols to be conveyed by the uplink tone-symbols are illustrated as letters including subscripts within each square of the grid. Modulation symbol $Y_{j,k}$ (j=1 to 7, k=0 to 55 and k=57 to 112), where j is the OFDM symbol time index value in the dwell, and k is the uplink tone index value, are ordinary modulation symbols, e.g., from a set of modulation symbols used in the system to conveying data/information, control information, and/or reference information. In addition, for the dwell each modulation symbol in the set of modulation symbols corresponding to a tone from the set of tones (tone 0 506 through tone 55 512 and tone 57 516 through tone 112 520) may be independent of the other modulation symbols in the set of modulation symbols corresponding to the tone. However, tone 56 (DC tone) 514 receives special treatment, in accordance with the present invention. The modulation symbols conveyed by the DC tone are represented as $X_i$, i=1, 7, where i represents the OFDM symbol time index within the dwell. In this example $X_7$ is a function of $X_1$, $X_2$, $X_3$, $X_4$, $X_5$, $X_6$. The value of special modulation symbols $X_7$ can be outside the set of modulation symbols used for the other tone-symbols of the dwell. In one embodiment $$X_7 = -\sum_{i=1}^{6} X_i.$$

In this exemplary treatment of the uplink DC tone, the average value of the modulation symbol conveyed by the DC tone for a dwell is equal to zero. In such an embodiment, a base station 200 receiving a set of uplink DC tones corresponding to a dwell, can interpret a DC offset in the average value of the measured received DC tone modulation symbols for the dwell as an error, e.g., due to a combination of DC tone self-interference characteristics 328 in transmitter 304 and airlink noise; this measured DC offset can be removed. Note that the modulation symbols $Y_{j,k}$ (j=1 to 7, k=0 to 55 and k=57 to 112) and $X_i$, i=1 to 6, may be generated by a normal channel coding operation.

Figure 6:
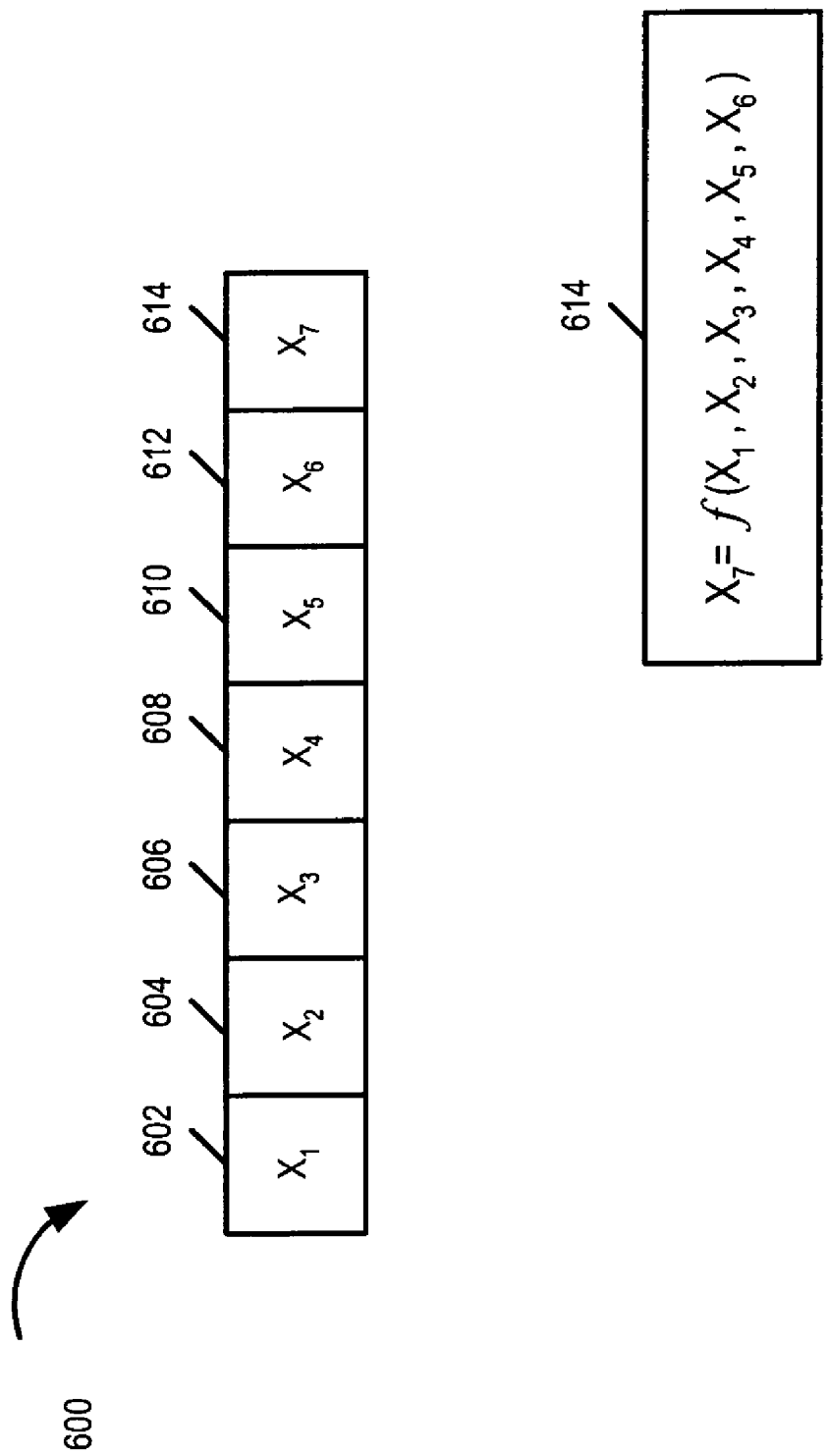
FIG. 6 is a drawing illustrating an exemplary relationship between the modulation symbols conveyed by the uplink DC tone within a dwell in accordance with the present invention.

FIG. 6 is a drawing 600 illustrating an exemplary relationship between the modulation symbols conveyed by the uplink DC tone within a dwell in accordance with the present invention. Modulation symbols ($X_1$ 602, $X_2$ 604, $X_3$ 606, $X_4$ 608, $X_5$ 610, $X_6$ 612, $X_7$ 614) may be the modulation symbols shown in FIG. 5 corresponding to tone 56 514 during dwell 538. In this example modulation symbol $X_7$ 614 is the special modulation symbol and $X_7=f(X_1, X_2, X_3, X_4, X_5, X_6)$, e.g.

$$X_7 = -\sum_{i=1}^{6} Xi.$$

In another example, $$X_7 = -\frac{1}{6}\sum_{i=1}^{6} Xi,$$

in order to reduce the peak-to-average ratio of the signal transmitted in the dwell. In general in accordance with various embodiments of the present invention, for the uplink DC tone, the dwell structure may include a different number of OFDM symbol time intervals, the special modulation symbol may be any of the modulation symbols in the dwell and the special modulation symbol is a function of the other modulation symbols in the dwell, provided the dwell structure, special modulation symbol OFDM symbol index within the dwell, and function used to interrelate the modulation symbols of the dwell is known by both WTs 300 and BSs 200.

With regard to the uplink DC tone, in some embodiments of the present invention, there is an additional step of symbol scrambling. For example, consider that $X_1, X_2, X_3, X_4, X_5, X_6$ are the modulation symbols from the coding and modulation scheme. Without the step of symbol scrambling, $X_7$ is generated from $f(X_1, X_2, X_3, X_4, X_5, X_6)$ and $X_1, X_2, X_3, X_4, X_5, X_6, X_7$ will be the modulation symbols transmitted in a dwell. Now, with the step of scrambling the actual modulation symbols to be transmitted are $A_1{}^*X_1, A_2{}^*X_2, A_3{}^*X_3, A_4{}^*X_4, A_5{}^*X_5, A_6{}^*X_6, A_7{}^*X_7$, where the construction of $X_7$ is given in the following and $A_1, A_2, A_3, A_4, A_5, A_6, A_7$ are predetermined scrambling symbols. $A_1, A_2, A_3, A_4, A_5, A_6, A_7$, are in some embodiments, phase rotation symbols. Then, the modulation symbols received at the base station, ignoring other interference, are $Y_1=A_1{}^*X_1+I_0$, $Y_2=A_2{}^*X_2+I_0$, $Y_3=A_3{}^*X_3+I_0$, $Y_4=A_4{}^*X_4+I_0$, $Y_5=A_5{}^*X_5+I_0$, $Y_6=A_6{}^*X_6+I_0$, $Y_7=A_7{}^*X_7+I_0$, where $I_0$ is the DC noise component generated by the wireless terminal device. It is assumed that $I_0$ is the same for each of the seven symbols in a dwell, since those symbols are transmitted from the same wireless terminal.

To estimate $I_0$, $X_7$ should be constructed: $X_7=f(A_1{}^*X_1, A_2{}^*X_2, A_3{}^*X_3, A_4{}^*X_4, A_5{}^*X_5, A_6{}^*X_6, A_7{}^*X_7)$. For example, in some embodiments, $X_7$ is calculated such that $A_1{}^*X_1+A_2{}^*X_2+A_3{}^*X_3+A_4{}^*X_4+A_5{}^*X_5+A_6{}^*X_6+A_7{}^*X_7=0$. In that exemplary embodiment, the receiver should estimate $I_0$ as $I_0\_estimate=(Y_1+Y_2+Y_3+Y_4+Y_5+Y_6+Y_7)/7$. In another example, in some embodiments, $X_7$ is calculated such that $(A_1{}^*X_1+A_2{}^*X_2+A_3{}^*X_3+A_4{}^*X_4+A_5{}^*X_5+A_6{}^*X_6)/6+A_7{}^*X_7=0$. In that exemplary embodiment, the receiver should estimate $I_0$ as $I_0\_estimate=(Y_1+Y_2+Y_3+Y_4+Y_5+Y_6+6{}^*Y_7)/12$.

Figure 7:
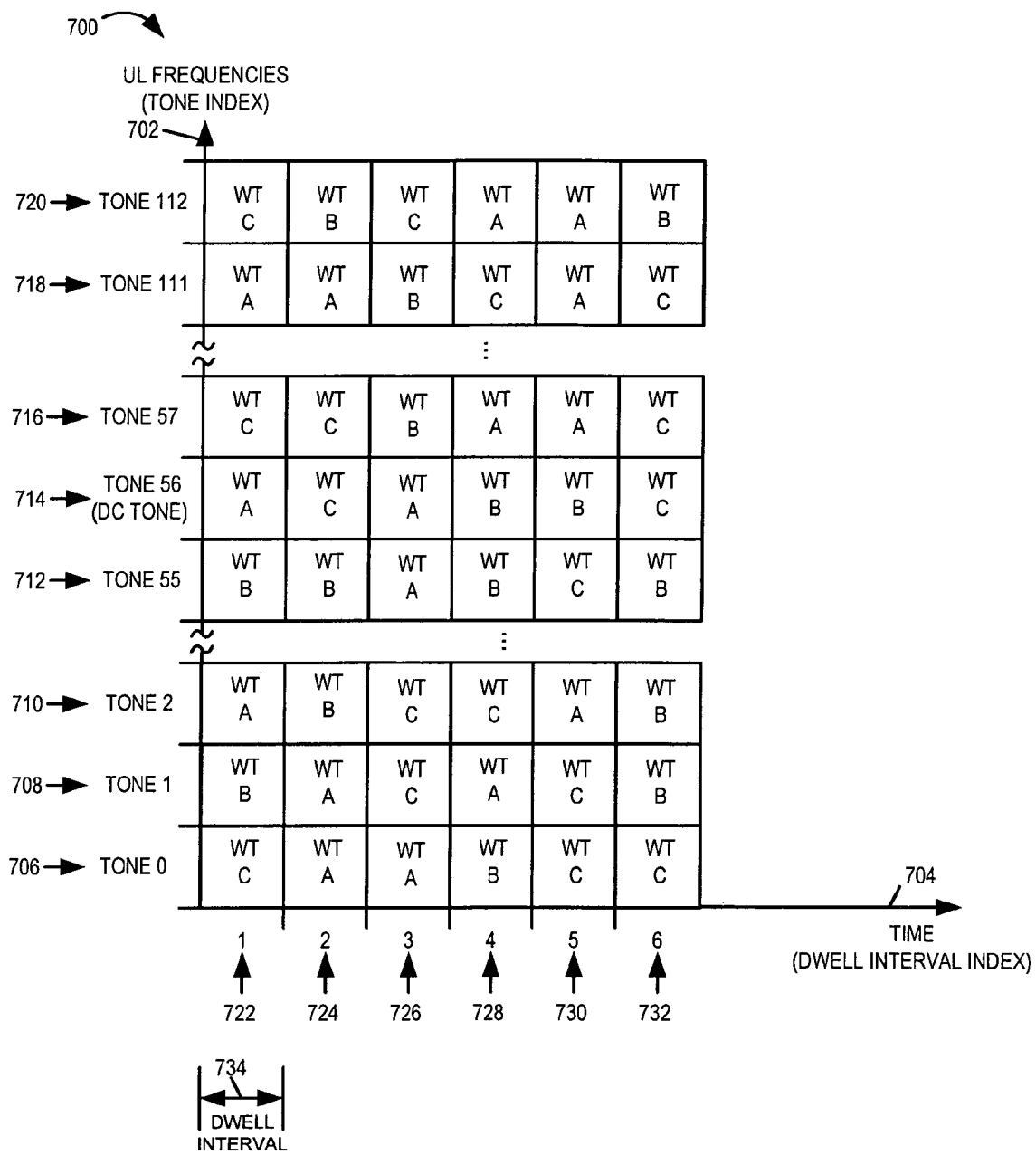
FIG. 7 is a drawing illustrating that the uplink DC tone may be assigned to different users for different dwells in accordance with the present invention.

FIG. 7 is a drawing illustrating that the uplink DC tone may be assigned to different users for different dwells in accordance with the present invention. Drawing 700 plots uplink frequencies (tone index), e.g., corresponding to an exemplary BS 200 using one carrier frequency band, on vertical axis 702 vs time (dwell interval index) on horizontal axis 704. The basic unit of vertical axis 702 is the tone, while the basic unit of the horizontal axis is the dwell interval 734. Dwell interval 734 may correspond to dwell 538 of FIG. 5. The exemplary uplink is illustrated to include 113 tones (tone 0 706, tone 1 708, tone 2 710, . . . , tone 55 712, tone 56 714, tone 57 716, . . . , tone 111 718, tone 112 720.) The uplink DC tone in this example is tone 56 714. In other embodiments, the uplink may use a different number of tones and the uplink DC tone may be a different tone. The example of FIG. 7 illustrates six dwell intervals (interval 1 722, interval 2 724, interval 3 726, interval 4 728, interval 5 730, interval 6 732). Uplink tones are allocated to WTs 300 on a per dwell interval basis, the allocated tones being a function of uplink segments assigned by BS 200's scheduling module 226 and, in some embodiments, an uplink tone hopping sequence used by BS 200. In the example of FIG. 7, the uplink DC tone (tone 56) 714 is assigned to (WT A, WT C, WT A, WT B, WT B, WT C) during (dwell interval 1 722, dwell interval 2 724, dwell interval 3 726, dwell interval 4 728, dwell interval 5 730, dwell interval 6 721), respectively. Different WTs 300 (A, B, C) can have different DC tone self-interference characteristics 328 in their transmitters 324; in addition each WT 300 will have a different airlink channel to BS 200 with different uplink DC tone noise characteristics. Since the WT user of the DC uplink tone may change from dwell to dwell, the special treatment of the uplink DC tone is performed on a per dwell basis in accordance with the present invention, and each dwell is treated independently of other dwells with regard to uplink DC tone special processing. Of course, because the base station knows which WT user uses the uplink DC tone in any dwell, the base station can estimate the DC tone self-interference of a given WT user across multiple dwells used by the WT user, and the WT user may not necessarily transport the special modulation symbol in the uplink DC tone in all the dwells assigned to the WT user.

Figure 8:
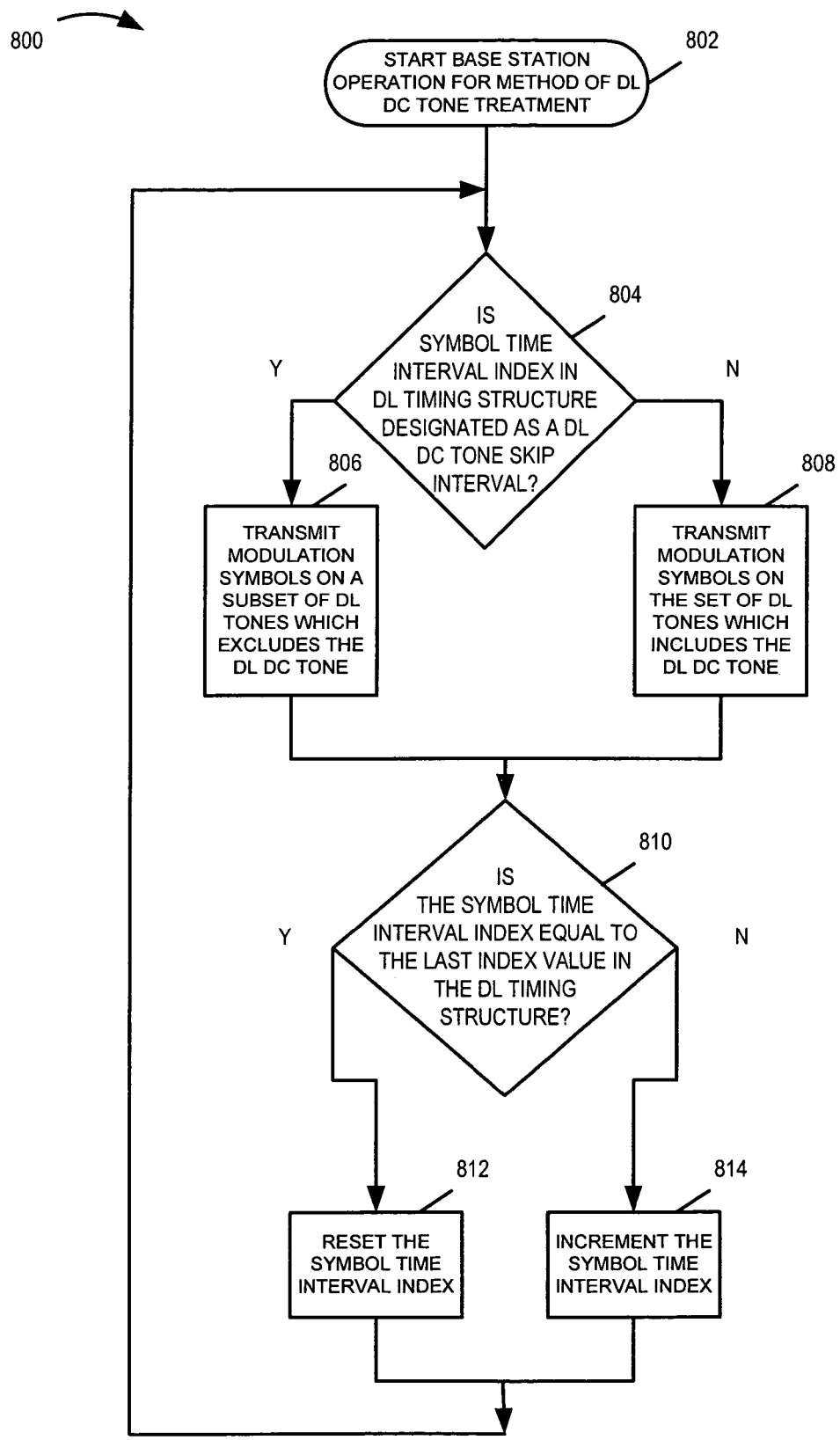
FIG. 8 is a flowchart of an exemplary method of operating a base station to perform downlink DC tone treatment in accordance with the present invention.

FIG. 8 is a flowchart 800 of an exemplary method of operating a base station, e.g., exemplary BS 200 of FIG. 2, to perform downlink DC tone treatment in accordance with the present invention. Operation of the method of DL DC tone treatment start in step 802 where the base station is powered on, initialized, and starts operations using a predetermined downlink timing structure, e.g., a repetitive downlink timing structure, and a set of downlink tones, e.g., a set of orthogonal downlink tones. Operation proceeds from step 802 to step 804. In step 804, the BS checks as to whether the symbol time interval index in the DL timing structure is designated as a downlink DC tone skip interval. If the current symbol time interval is designated as a DL DC tone skip interval, then operation proceeds from step 804 to step 806 where the BS is operated to transmit modulation symbols on a subset of DL tones which excludes the DL DC tone. This intentional exclusion of use of the DL DC tone in step 806 allows a WT receiver to measure its receiver DC tone self-interference characteristic 320. Returning to step 804, if the current symbol time interval index is not designated as a DL DC tone skip interval, then operation proceeds to step 808 where the base station is operated to transmit modulation symbols on the set of downlink tones which includes the downlink DC tone; some of the modulation symbol values may be zero. Operation proceeds from either step 806 or step 808 to step 810. In step 810, a check is performed as to whether the symbol time index is equal to the last symbol time index value in the downlink timing structure. If the symbol time interval index is equal to the last index value in the downlink timing structure, then operation proceeds to step 812; otherwise operation proceeds to step 814. In step 812, the base station is operated to reset the symbol time interval index. In step 814, the base station is operated to increment the symbol time interval index. Operation proceeds from step 812 or step 814 back to step 804, where the new symbol time interval index is checked as to whether it is designated as a DL DC tone skip interval.

Figure 9:
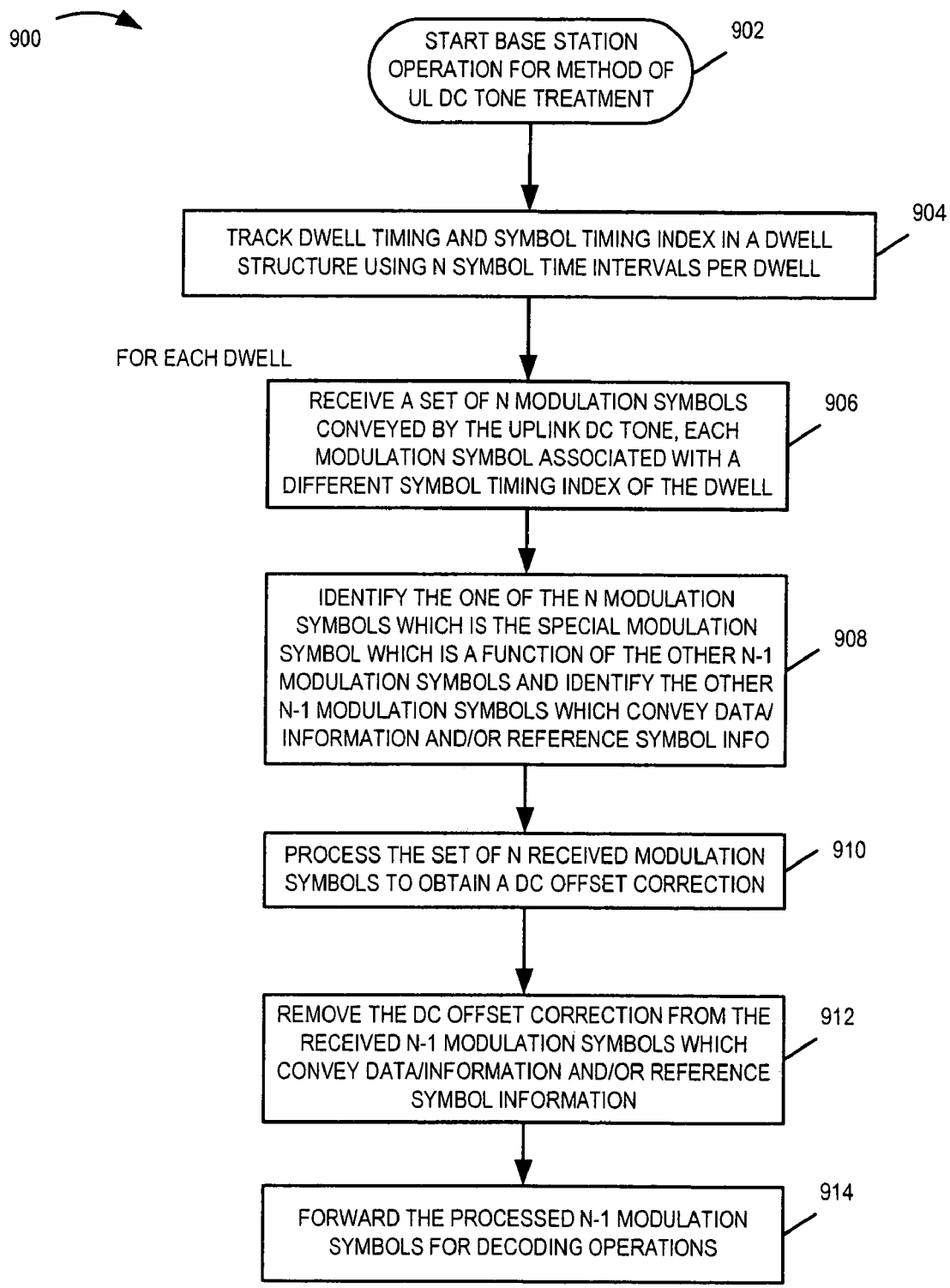
FIG. 9 is a flowchart of an exemplary method of operating a base station to perform uplink DC tone treatment in accordance with the present invention.

FIG. 9 is a flowchart 900 of an exemplary method of operating a base station, e.g., exemplary BS 200 of FIG. 2, to perform uplink DC tone treatment in accordance with the present invention. Operation of the method of UL DC tone treatment starts in step 902 where the base station is powered on, initialized, and starts operations using a predetermined uplink timing structure, e.g., a repetitive uplink timing structure, and a set of uplink tones, e.g., a set of orthogonal uplink tones. Operation proceeds from step 902 to step 904, in which the BS is operated to track dwell timing and symbol timing index in a dwell structure using N symbol time intervals per dwell. For each dwell, steps 906 through 914 are performed. In step 906, the base station receives a set of N modulation symbols conveyed by the uplink DC tone, each modulation symbol associated with a different symbol timing index of the dwell. Operation proceeds from step 906 to step 908. In step 908, the base station is operated to identify the one of the N modulation symbols which is the special modulation symbol which is a function of the other N−1 modulation symbols. In step 908, the base station is also operated to identify the other N−1 modulation symbols which convey data/information and/or reference symbol information. For example, in some embodiments, the other N−1 modulation symbols are communicated during the first N−1 symbol time intervals of the dwell and the special modulation symbol is communicated during the last symbol time interval of the dwell. The position of the special modulation symbol need not be the last position of the dwell, but its location within the dwell is known to both the base station and wireless terminals. Operation proceeds from step 908 to step 910, where the base station is operated to process the set of N received modulation symbols to obtain a DC offset correction. For example, in one exemplary embodiment, where the wireless terminal sets the weighted sum of the N modulation symbols to be transmitted on the uplink DC tone during the dwell equal to zero, the base station determines a weighted average value of the received N modulation symbols on uplink DC tone for the dwell and uses that determined average value as the DC offset correction. Operation proceeds from step 910 to step 912. In step 912, the base station is operated to remove the DC offset correction from the received N−1 modulation symbols which convey data/information and/or reference symbol information. Operation proceeds from step 912 to step 914. In step 914, the base station is operated to forward the processed N−1 modulation symbols for decoding operations, e.g., within the BS receiver decoder.

Figure 10:
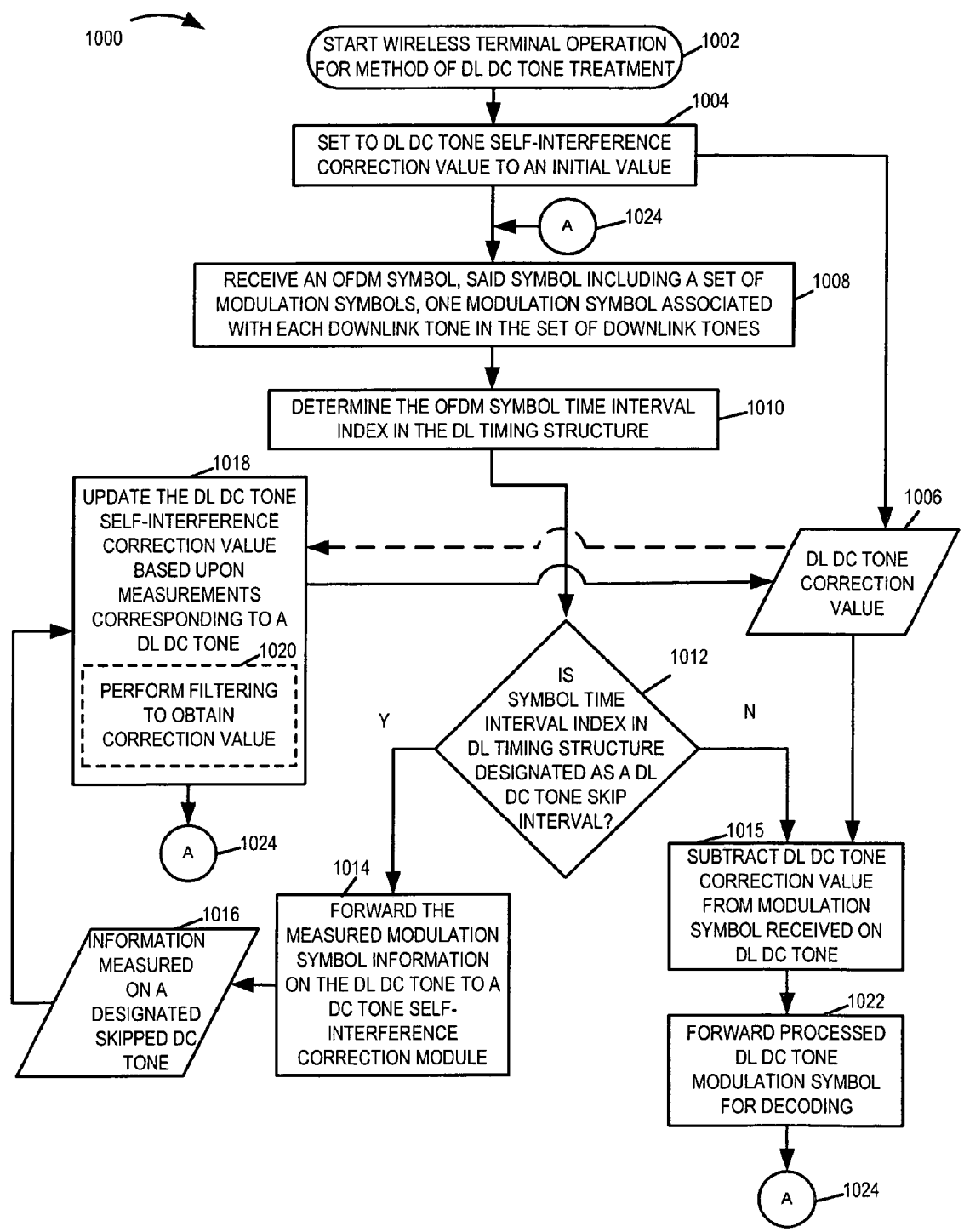
FIG. 10 is a flowchart of an exemplary method of operating a wireless terminal to perform downlink DC tone treatment in accordance with the present invention.

FIG. 10 is a flowchart of an exemplary method of operating a wireless terminal, e.g., exemplary WT 300 of FIG. 3, to perform downlink DC tone treatment in accordance with the present invention. Operation of the method of DL DC tone treatment start in step 1002 where the wireless terminal is powered on, initialized, and starts operations using a predetermined downlink timing structure associated with a base station, e.g., a repetitive downlink timing structure, and a set of downlink tones associated with the base station, e.g., a set of orthogonal downlink tones. Operation proceeds from step 1002 to step 1004. In step 1004, the wireless terminal sets its DL DC tone self-interference correction value to an initial value. For example, the initial value may be zero, a factory stored calibration value, a value determined from a factor stored calibration model including temperature sensitivity, or a function of stored information from a previous turn-on, e.g., the last stored self-interference correction value used. The result of step 1004 is DL DC tone correction value 1006. Operation proceeds from step 1004 to step 1008, where the wireless terminal is operated to receive an OFDM symbol, said symbol including a set of modulation symbols, one modulation symbol associated with each downlink tone in the set of downlink tones. Operation proceeds from step 1008 to step 1010. In step 1010, the wireless terminal is operated to determine the OFDM symbol time interval index corresponding to the received OFDM symbol in the downlink timing structure. Operation proceeds from step 1010 to step 1012. In step 1012, the wireless terminal checks as to whether or not the determined interval index in the downlink timing structure is designated as a downlink DC tone skip interval. If the interval is designated as a DL DC tone skip interval, then operation proceeds to step 1014; otherwise operation proceeds to step 1015. In step 1014, the wireless terminal is operated to forward the measured modulation symbol information on the DL DC tone to a DC tone self-interference correction module 1014. The information measured on a designated skipped DC tone 1016 is illustrated as being forwarded to step 1018. Operation proceeds from step 1016 to step 1018. In step 1018, the wireless terminal is operated to update the DL DC tone self-interference correction value based upon measurements corresponding to a DL DC tone. In some embodiments, information derived from block 1016 results in a new value of a DL DC tone correction value 1006 and does not depend upon previous DL DC tone correction values. In some embodiments, sub-step 1020 is performed as part of step 1018. In sub-step 1020, the wireless terminal performs filtering, e.g., averaging, to obtain a new correction value. In such an embodiment, the output value from step 1018 is a function of the previous value or values of the DL DC tone correction value as indicated by dashed line arrow from DL DC tone correction value block 1006 to step 1018 and solid line arrow from step 1018 to block 1006.

Returning to step 1012, if the symbol time interval index is not a designated DL DC tone skip interval, then operation proceeds to step 1015. In step 1015, the wireless terminal subtracts the current DL DC tone correction value 1006 from the modulation symbol received on the DL DC tone. Operation proceeds from step 1015 to step 1022. In step 1022, the wireless terminal is operated to forward the processed DL DC tone modulation symbol for decoding along with other received downlink modulation symbols.

In some embodiments, the wireless terminal determines whether or not the DL DC tone is used by the WT during the symbol time interval, e.g., whether the DL DC tone corresponds to a DL segment which the WT desires to decode. If the DL DC tone is not being used by the WT in the symbol time interval under consideration, then steps 1015 and/or step 1016 in the method may be skipped.

Operation proceeds from either step 1022 or step 1018 via connecting node A 1024 to step 1008, where the wireless terminal is operated to receive the next OFDM downlink symbol.

Figure 11:
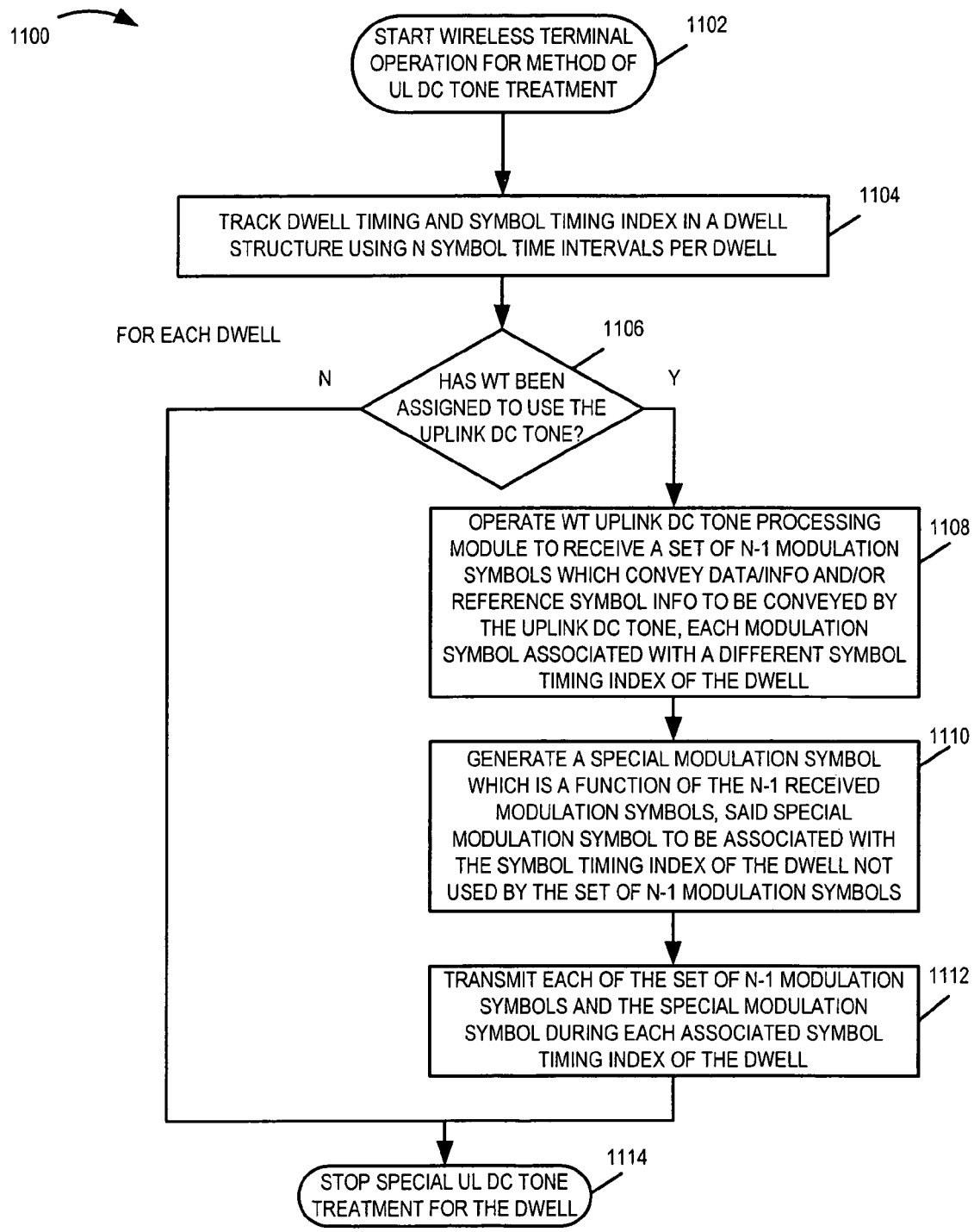
FIG. 11 is a flowchart of an exemplary method of operating a wireless terminal to perform uplink DC tone treatment in accordance with the present invention.

FIG. 11 is a flowchart 1100 of an exemplary method of operating a wireless terminal, e.g., exemplary WT 300 of FIG. 3, to perform uplink DC tone treatment in accordance with the present invention. Operation of the method of UL DC tone treatment starts in step 1102 where the wireless terminal is powered on, initialized, and starts operations using a predetermined uplink timing structure associated with a base station, e.g., a repetitive uplink timing structure, and a set of uplink tones associated with the base station, e.g., a set of orthogonal uplink tones. Operation proceeds from start step 1102 to step 1104. In step 1104, the wireless terminal is operated to track dwell timing and symbol timing index in a dwell structure using N symbol time intervals per dwell. Operation proceeds from step 1104 to step 1106. Operation flows through step 1106 for each dwell. In step 1106, the WT checks as to whether it has been assigned to use the uplink DC tone, e.g., based upon uplink segment assignments from a connected base station and/or uplink tone hopping sequence information. If the WT has been assigned to use the uplink DC tone for the dwell under consideration, then the WT should perform special uplink DC processing and operation proceeds from step 1106 to step 1108; otherwise the WT does not need to perform special uplink DC tone processing during this dwell and operation proceeds to step 1114.

In step 1108, the WT uplink DC tone processing module is operated to receive a set of N−1 modulation symbols which convey data/information and/or reference symbol information to be conveyed by the uplink DC tone, each modulation symbol associated with a different symbol timing index of the dwell. Operation proceeds from step 1108 to step 1110, where the wireless terminal is operated to generate a special modulation symbol which is a function of the N−1 received modulation symbols, said special modulation symbol to be associated with the symbol timing index of the dwell not used by the set of N−1 modulation symbols. For example, in one exemplary embodiment, where N=7, the first six modulation symbols of the dwell may be the N−1 modulation symbols and the seventh modulation symbol of the dwell may be the special modulation symbol. In some exemplary embodiments said function used to generate the special modulation symbol is the negative of the summation of the N−1 modulation symbols. Operation proceeds from step 1110 to step 1112. In step 1112, the wireless terminal is operated to transmit each modulation symbol of the set of N−1 modulation symbols and the special modulation symbol during each associated symbol timing index of the dwell. Operation proceeds from step 1112 to step 1114.

In step 1114, the wireless terminal stops special uplink DC tone treatment for the dwell. Operation returns to step 1106, if the wireless terminal is to operate for additional dwells.

Figure 12:
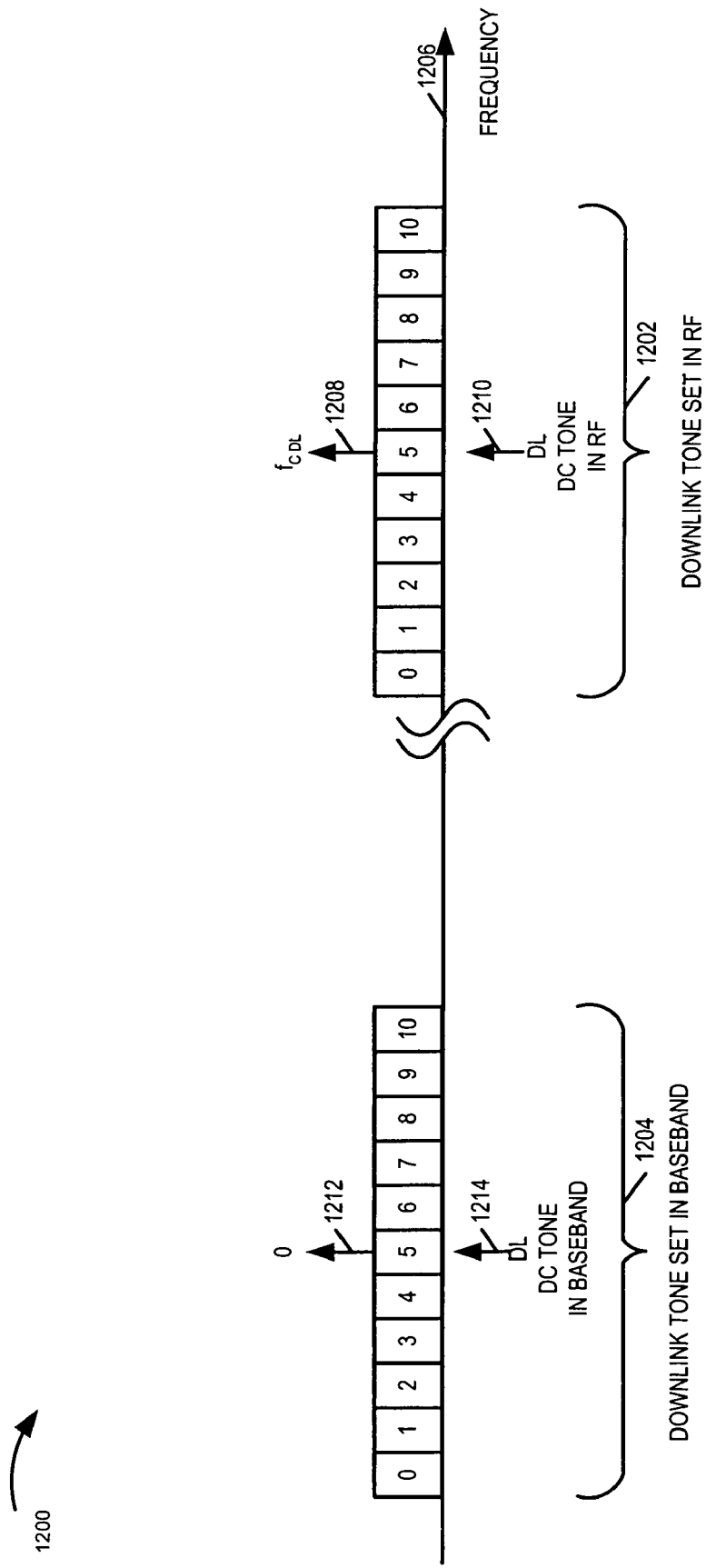
FIG. 12 is a drawing illustrating an exemplary set of downlink tones in RF and a corresponding set of downlink tones in the baseband.

FIG. 12 is a drawing 1200 illustrating an exemplary set of downlink tones in RF 1202 and a corresponding set of downlink tones in the baseband 1204. The RF is sometimes referred to as the passband. Horizontal axis 1206 indicates frequency. The tones may be, e.g., OFDM tones. Each set of tones (1202, 1204) includes the same number of tones. In the example of FIG. 12, 11 contiguous tones (index 0 . . . 10) are shown as comprising a downlink set for simplicity of illustration. In other embodiments, a different number of tones may be used for a downlink tone set, e.g., 113 tones. The RF tone set 1202 is centered around downlink carrier frequency $f_{CDL}$ 1208, and the downlink DC tone in RF 1210 is tone number 5. The baseband tone set 1204 is centered around DC (0 Hz) 1212, and the downlink DC tone in baseband 1214 is tone number 5.

Figure 13:
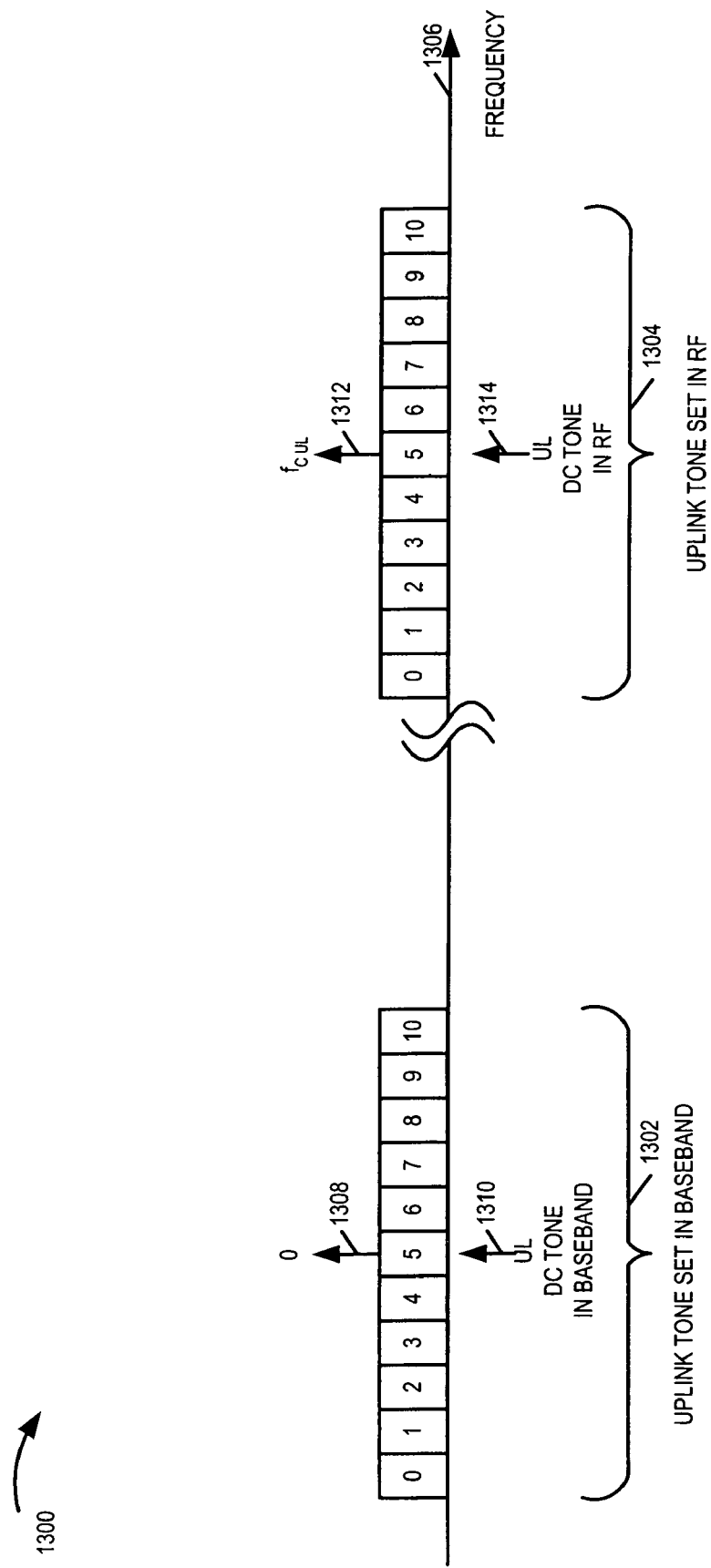
FIG. 13 is a drawing illustrating an exemplary set of uplink tones in baseband and a corresponding set of uplink tones in the RF.

FIG. 13 is a drawing 1300 illustrating an exemplary set of uplink tones in baseband 1302 and a corresponding set of uplink tones in the RF 1304. The RF is sometimes referred to as the passband. Horizontal axis 1306 indicates frequency. The tones may be, e.g., OFDM tones. Each set of tones (1302, 1304) includes the same number of tones. In the example of FIG. 13, 11 contiguous tones (index 0 . . . 10) are shown as comprising an uplink tone set for simplicity of illustration. In other embodiments, a different number of tones may be used for an uplink tone set, e.g., 113 tones. The baseband tone set 1302 is centered around DC (0 Hz) 1308, and the uplink DC tone in baseband 1310 is tone number 5. The RF tone set 1304 is centered around uplink carrier frequency $f_{C\,UL}$ 1312, and the uplink DC tone in RF 1314 is tone number 5.

In various embodiments, supporting simultaneous downlink and uplink signaling, the downlink carrier frequency $f_{CDL}$ 1208 is different from the uplink carrier frequency $f_{CUL}$ 1312 and the downlink tone set in RF 1202 is non-overlapping with the uplink tone set in RF 1304.

Figure 14:
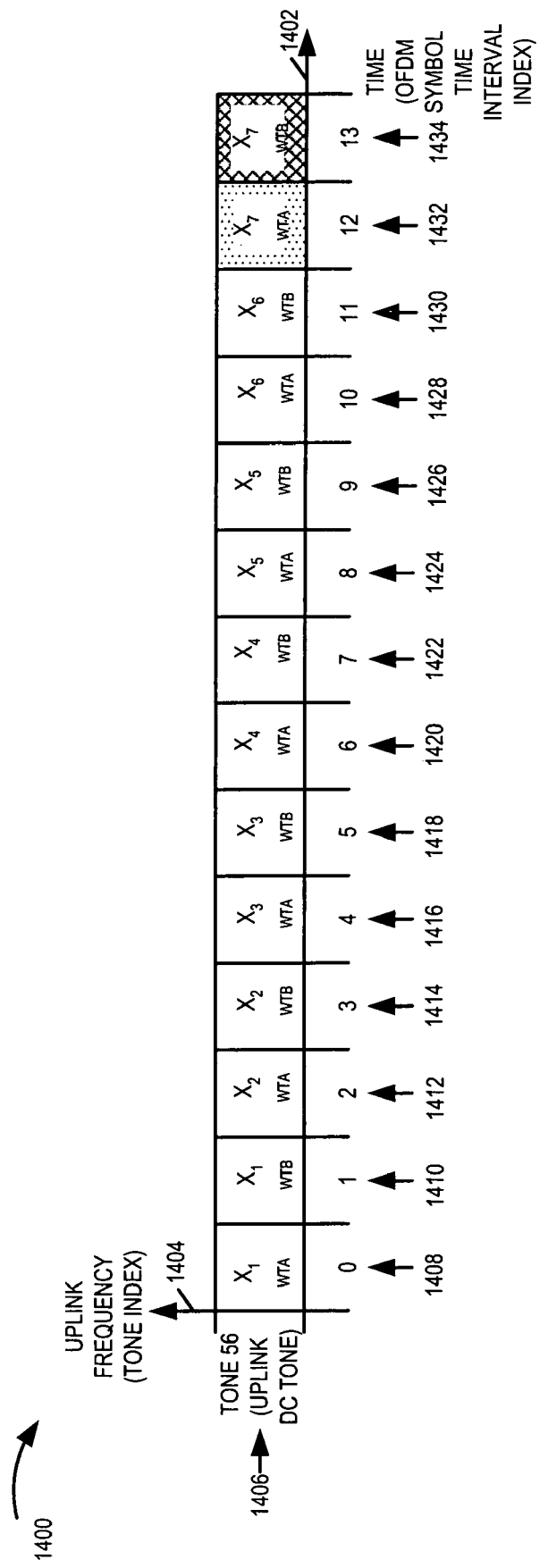
FIG. 14 is a drawing illustrating an exemplary embodiment of the present invention in which uplink tone assignment structure is not implemented as a tone assignment to a single wireless terminal for a dwell of a fixed number of contiguous symbol time intervals, but rather a given tone can be assigned in an interwoven manner alternating between different wireless terminals.
Figure 14A:
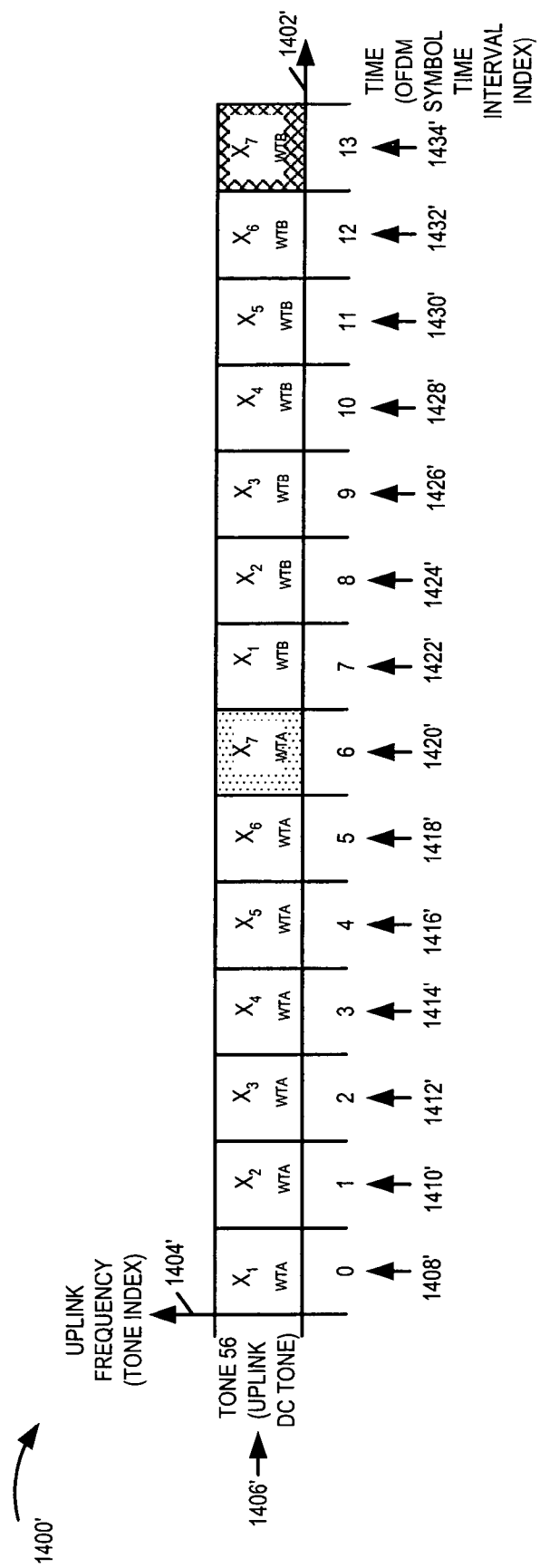
FIG. 14A is a drawing illustrating an exemplary embodiment of the present invention in which uplink tone assignment structure is implemented such that an uplink tone, e.g., the uplink DC tone, is assigned to a single wireless terminal for a dwell of a fixed number of contiguous symbol time intervals.

FIG. 14A is a drawing 1400' illustrating an exemplary embodiment of the present invention in which uplink tone assignment structure is implemented such that an uplink tone, e.g., the uplink DC tone, is assigned to a single wireless terminal for a dwell of a fixed number of contiguous symbol time intervals. In some embodiments, during some dwells, the wireless terminals may be assigned a set of one or more tones to be used by the wireless terminal for the given dwell, and during some dwells the uplink DC tone may be included in the set of tones assigned to the wireless terminal, while during other dwells the uplink DC tone may not be included in the set of tones assigned to the wireless terminal. Vertical axis 1404' illustrates uplink frequency expressed in tone index while the horizontal axis 1402' illustrates time expressed in OFDM symbol time interval index. Exemplary tone 56 1406' is the uplink DC tone, and tone 56 may be the center tone in an uplink tone set of 113 tones. Fourteen successive OFDM symbol time intervals are shown (interval 0 1408', interval 1 1410', interval 2 1412', interval 3 1414', interval 4 1416', interval 5 1418', interval 6 1420', interval 7 1422', interval 8 1424', interval 9 1426', interval 10 1428', interval 11 1430', interval 12 1432', interval 13 1434'. In the example of FIG. 14A, uplink DC tone 1406' is allocated on a dwell by dwell basis, and may be used by different wireless terminals during each successive dwells, a dwell in this example including seven successive OFDM symbol time intervals. Wireless terminal A, implemented in accordance with the present invention, uses the uplink DC tone 1406' during the first dwell, OFDM time intervals (interval 0 1408', interval 1 1410', interval 2 1412', interval 3 1414', interval 4 1416', interval 5 1418', interval 6 1420') to convey modulation symbols ($X_{1\,WTA}, X_{2\,WTA}, X_{3\,WTA}, X_{4\,WTA}, X_{5\,WTA}, X_{6\,WTA}, X_{7\,WTA}$), respectively. Modulation symbol $X_{7\,WTA}$ is generated by WTA as a function of modulation symbols ($X_{1\,WTA}, X_{2\,WTA}, X_{3\,WTA}, X_{4\,WTA}, X_{5\,WTA}, X_{6\,WTA}$). Wireless terminal B, implemented in accordance with the present invention, uses the uplink DC tone 1406 during the second dwell, OFDM time intervals (interval 7 1422', interval 8 1424', interval 9 1426', interval 10 1428', interval 11 1430', interval 12 1432', interval 13 1434') to convey modulation symbols ($X_{1\,WTB}, X_{2\,WTB}, X_{3\,WTB}, X_{4\,WTB}, X_{5\,WTB}, X_{6\,WTB}, X_{7\,WTB}$), respectively. Modulation symbol $X_{7\,WTB}$ is generated by WTB as a function of modulation symbols ($X_{1\,WTB}, X_{2\,WTB}, X_{3\,WTB}, X_{4\,WTB}, X_{5\,WTB}, X_{6\,WTB}$). The function or functions used by WTA and WTB are known and used by the base station, implemented in accordance with the present invention, receiving and processing the uplink signals. For example the function may be such that the sum of the seven modulation symbols in the set equals zero.

FIG. 14 is a drawing 1400 illustrating an exemplary embodiment of the present invention in which uplink tone assignment structure is not implemented as a tone assignment to a single wireless terminal for a dwell of a fixed number of contiguous symbol time intervals, but rather a given tone can be assigned in an interwoven manner alternating between different wireless terminals. Vertical axis 1404 illustrates uplink frequency expressed in tone index while the horizontal axis 1402 illustrates time expressed in OFDM symbol time interval index. Exemplary tone 56 1406 is the uplink DC tone, and tone 56 may be the center tone in an uplink tone set of 113 tones. Fourteen successive OFDM symbol time intervals are shown (interval 0 1408, interval 1 1410, interval 2 1412, interval 3 1414, interval 4 1416, interval 5 1418, interval 6 1420, interval 7 1422, interval 8 1424, interval 9 1426, interval 10 1428, interval 11 1430, interval 12 1432, interval 13 1434. In the example of FIG. 14, uplink DC tone 1406 is allocated and used by different wireless terminals during each of successive OFDM symbol time intervals. Wireless terminal A, implemented in accordance with the present invention, uses the uplink DC tone 1406 during OFDM time intervals (interval 0 1408, interval 2 1412, interval 4 1416, interval 6 1420, interval 8 1424, interval 10 1428, interval 12 1432) to convey modulation symbols ($X_{1\ WTA}, X_{2\ WTA}, X_{3\ WTA}, X_{4\ WTA}, X_{5\ WTA}, X_{6\ WTA}, X_{7\ WTA}$), respectively. Modulation symbol $X_{7\ WTA}$ is generated by WTA as a function of modulation symbols ($X_{1\ WTA}, X_{2\ WTA}, X_{3\ WTA}, X_{4\ WTA}, X_{5\ WTA}, X_{6\ WTA}$). Wireless terminal B, implemented in accordance with the present invention, uses the uplink DC tone 1406 during OFDM time intervals (interval 1 1410, interval 3 1414, interval 5 1418, interval 7 1422, interval 9 1426, interval 11 1430, interval 13 1434) to convey modulation symbols ($X_{1\ WTB}, X_{2\ WTB}, X_{3\ WTB}, X_{4\ WTB}, X_{5\ WTB}, X_{6\ WTB}, X_{7\ WTB}$), respectively. Modulation symbol $X_{7\ WTB}$ is generated by WTB as a function of modulation symbols ($X_{1\ WTB}, X_{2\ WTB}, X_{3\ WTB}, X_{4\ WTB}, X_{5\ WTB}, X_{6\ WTB}$). The function or functions used by WTA and WTB are known and used by the base station, implemented in accordance with the present invention, receiving and processing the uplink signals. For example the function may be such that the sum of the seven modulation symbols in the set equals zero.

Different interweaving structures may be used and/or different numbers of OFDM symbol time intervals, e.g., other than seven, may form a set for a wireless terminal. The interweaving structure information and uplink DC tone set formation information is known to the WT and base station. For example, a WT may use a set of N OFDM time intervals in a sequence of more than N sequential OFDM time intervals, for conveying N OFDM modulation symbols using the uplink DC tone, and one of the designated N OFDM time intervals is used for conveying a special modulation symbol which is a function of the other N−1 modulation symbols. The function may be such that the sum of the N modulation symbols in the set is equal to zero. The location, e.g., OFDM symbol time interval index, of the special modulation symbol in the sequence of N modulation symbols as well as the location of each of the other N−1 modulation symbols in the sequence of N modulation symbols is known to the wireless terminal and base station.

Figure 15:
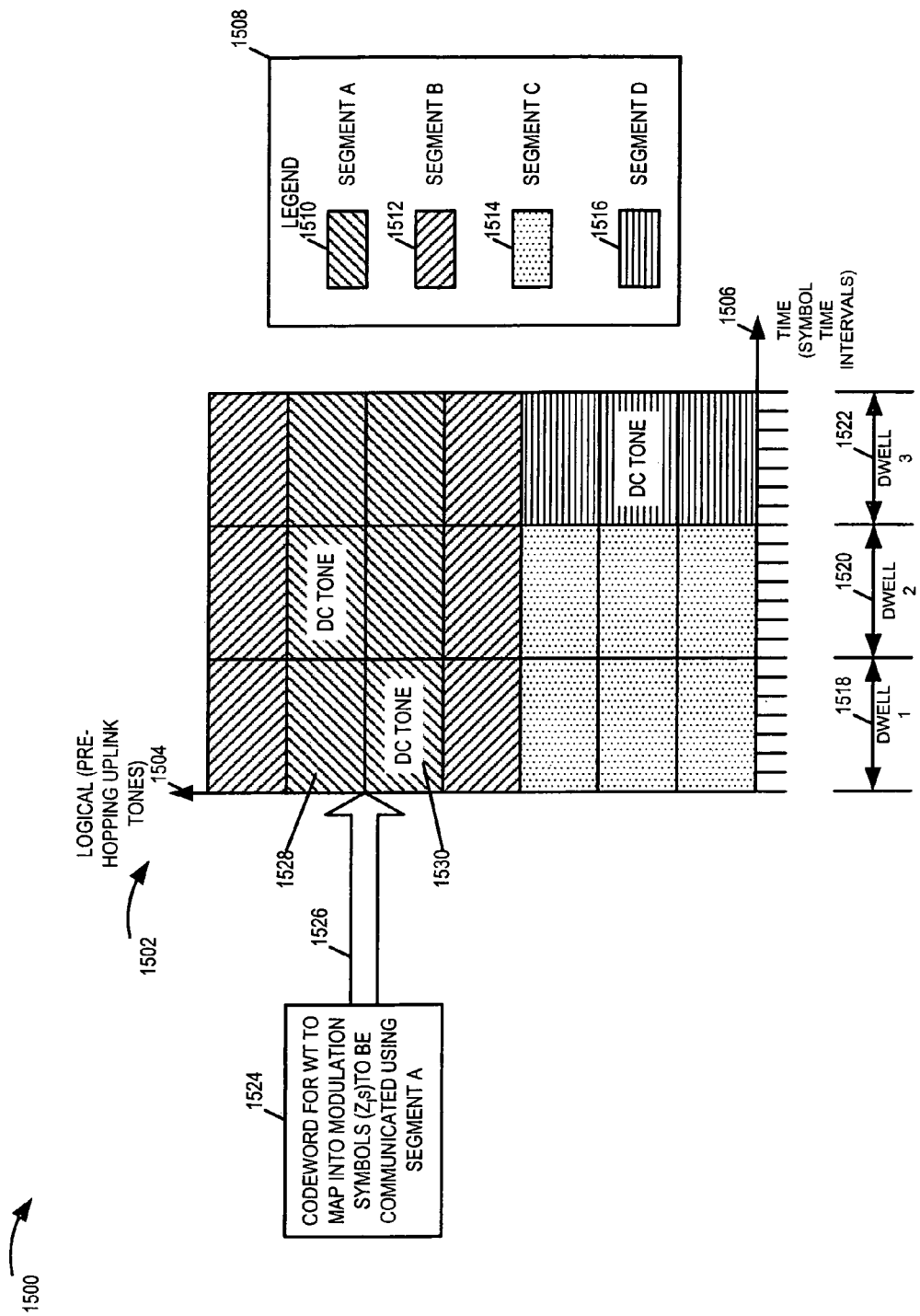
FIG. 15 and FIG. 16 illustrate features of an exemplary embodiment of the present invention utilizing special treatment of the uplink DC tone in accordance with the present invention.
Figure 16:
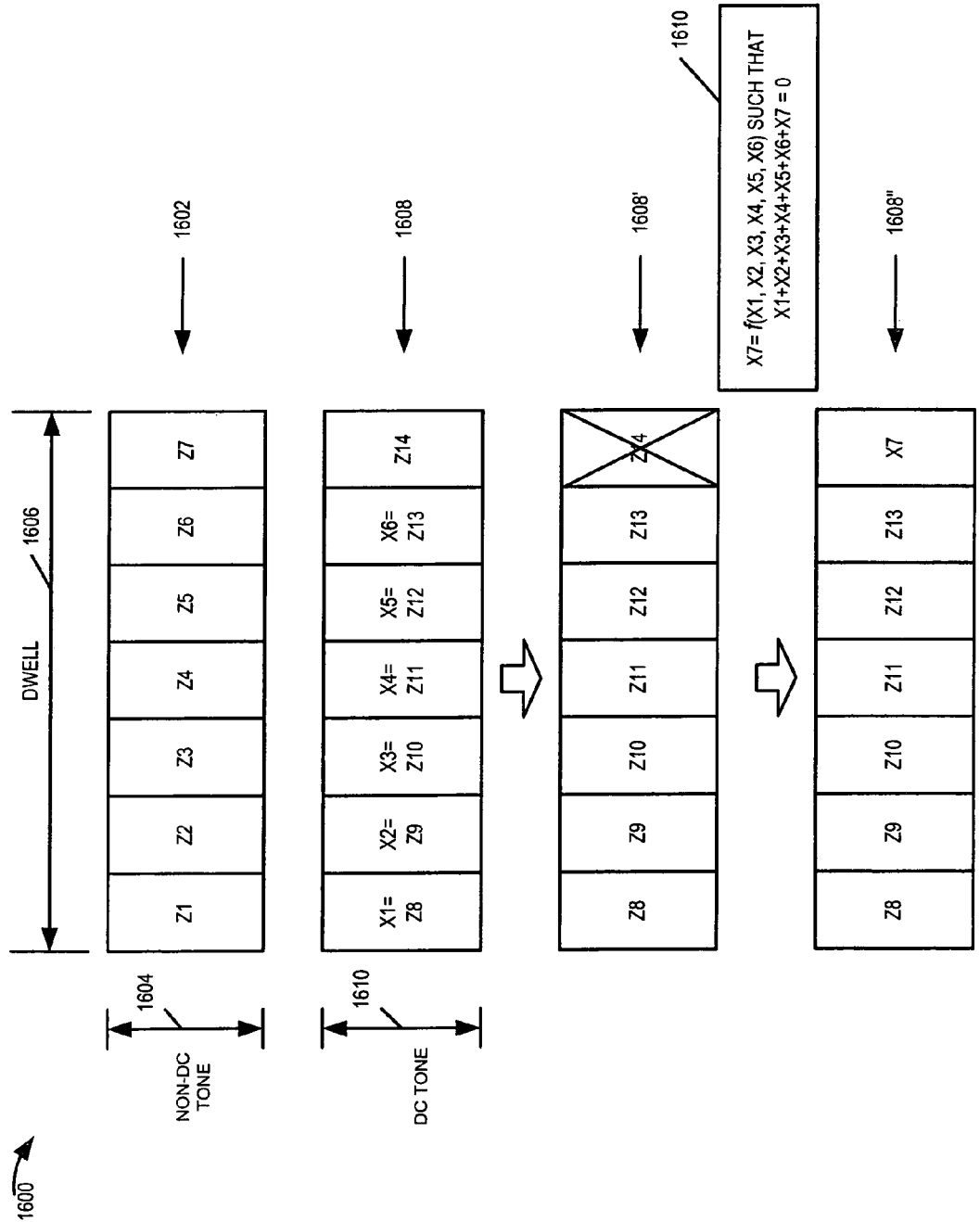

FIG. 15 and FIG. 16 illustrate features of an exemplary embodiment of the present invention utilizing special treatment of the uplink DC tone in accordance with the present invention. FIG. 15 is a drawing 1500 including a grid 1502 representing an exemplary partition of uplink channel resources into segments. Legend 1508 illustrates that segment A is illustrated by diagonal line shading ascending from left to right 1510, segment B is illustrated by diagonal line shading descending from left to right 1512, segment C is illustrated by dotted shading 1514, and segment D is illustrated by horizontal line shading 1516. Vertical axis 1504 represents logical (pre-hopping) tone designations, while the horizontal axis 1506 represents time expressed in symbol time intervals. The grid 1502 includes 7 uplink tones using pre-hopping designations. Uplink tone hopping sequence is used to convert the pre-hopping designations to the post hopping designations. In the pre-hopping tone reference designations, the uplink DC tone may be associated with different pre-hopping tones from one dwell to another dwell. In the post hopping tone reference designations, the uplink DC tone occupies the same tone, e.g., center tone in a frequency band of uplink tones. Along the horizontal axis, the grid 1502 is further divided into dwells, each dwell (dwell 1 1518, dwell 2 1520, dwell 3 1522) including seven successive OFDM symbol time intervals. Tone hopping may occur on dwell boundaries. For example the designated uplink DC tone is shown to hop from the fifth pre-hopping tone index to the sixth pre-hopping tone index and then to the $2^{nd}$ pre-hopping tone index. During dwell 1 1518 the uplink DC tone corresponds to a pre-hopping indexed tone in segment A; during dwell 2 1520 the uplink DC tone corresponds to a different pre-hopping indexed tone in segment A; during dwell 3 1522, the uplink DC tone corresponds to another different pre-hopping indexed tone which is used by segment D.

Now, assume that an exemplary wireless terminal has uplink data/information to communicate and has been allocated to use uplink segment A, e.g., by a base station scheduler. The wireless terminal constructs data/information into a codeword 1524 which maps into modulation symbols ($Z_i$s) to be communicated using tone-symbols, a tone for an interval of a symbol time interval, of segment A. Arrow 1526 represents the modulation symbols being assigned to tone-symbols of segment A. Segment A includes 2 pre-hopping tones utilized for three dwells. Special treatment is performed, in accordance with the present invention, if the pre-hopping tone during a given dwell is an uplink DC tone, as with block 1530 of segment A during dwell 1 1518. However, if the pre-hopping tone during a given dwell is not the uplink DC tone, then special treatment is not performed, as with block 1528 of segment A.

FIG. 16 is an illustration 1600 of two exemplary uplink tones, a non-DC tone 1604 and a DC tone 1610 for an exemplary dwell 1606. Block 1602 includes seven OFDM tone-symbols of the non-DC tone 1604 for dwell 1606, each tone-symbol being associated with a modulation symbol (Z1, Z2, Z3, Z4, Z5, Z6, Z7). Block 1608 includes seven OFDM tone-symbols of the DC tone 1610 for dwell 1606, each tone-symbol being associated with a modulation symbol (Z8, Z9, Z10, Z11, Z12, Z13, Z14). Block 1602 may represent block 1528 of FIG. 15, while block 1608 may represent block 1530 of FIG. 15. Modulation symbols (Z1, Z2, Z3, Z4, Z5, Z6, Z7, Z8, Z9, Z10, Z11, Z12, Z13, Z14) may represent modulation symbols of codeword 1524 mapped by the wireless terminal to segment A.

Modulation symbols (Z1, Z2, Z3, Z4, Z5, Z6, Z7) are forwarded for transmission using the post-hopping tone index as determined by the hopping sequence information, the tone being used is not the uplink DC tone.

The wireless terminal performs special processing on the DC tone, in accordance with the present invention. Modulation symbols (Z8, Z9, Z10, Z11, Z12, Z13) are designated as modulation symbols (X1, X2, X3, X4, X5, X6). Modulation symbol Z14 is punched through as illustrated by the X covering the box representing the tone-symbol to which modulation symbol Z14 had been mapped as illustrated in block 1608'. The wireless terminal generates a new modulation symbol X7 1610, where X7 is a function of (X1, X2, X3, X4, X5, X6) such that (X1+X2+X3+X4+X5+X6+X7)=0. The new modulation symbol replaces the punched out modulation symbol as illustrated in block 1608". The modulation symbols (Z8, Z9, Z10, Z11, Z12, Z13, X7) are forwarded for transmission using the post-hopping tone index as determined by the hopping sequence information, the tone being used is the uplink DC tone.

The base station receives modulation symbols conveyed on uplink tones, determines which uplink tones are uplink DC tones and performs special treatment of the modulation symbols conveyed on the uplink DC tone. For example, the base station recognizes the modulation symbol of the dwell which has been punched through and replaced; measurement information and knowledge of the function relating the seven modulation symbols of the dwell is used by the base station to perform adjustments to the other 6 received modulation symbols to correct for DC offset. The six corrected received modulation symbols are forwarded for decoding operations along with the other modulation symbols which have been conveyed using non-DC tones.

In various embodiments, the number of symbol time intervals per dwell is a value other than seven and the punch-though/replacement location within the dwell may be different provided the structure information is known by the wireless terminal and base station. For example, a dwell may comprise a set of contiguous N OFDM time intervals where one OFDM modulation symbol is conveyed on the uplink DC tone per OFDM symbol time interval, and one of the N OFDM symbol time intervals is used for conveying a special modulation symbol which is a function of the other N−1 modulation symbols. The N−1 modulation symbols are modulation symbols which have been mapped from a codeword. The special modulation symbol replaces a punched out mapped modulation symbol from a codeword. The function may be such that the sum of the N modulation symbols in the set, including the N−1 modulation symbols and the special replacement modulation, is equal to zero. The location, e.g., OFDM symbol time interval index, of the special modulation symbol in the sequence of N modulation symbols as well as the location of each of the other N−1 modulation symbols in the sequence of N modulation symbols of the dwell is known to the wireless terminal and base station.

Figure 17:
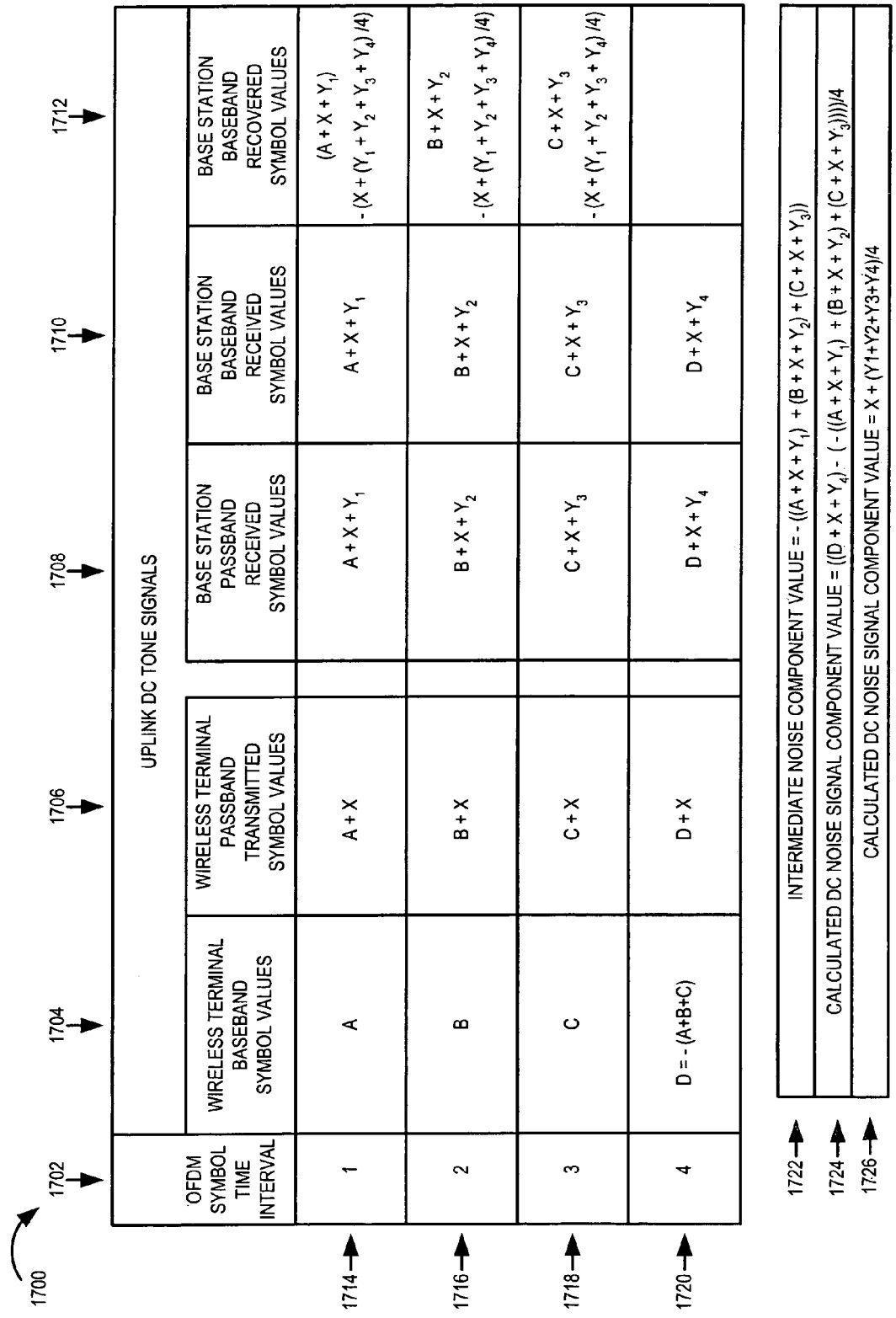
FIG. 17 is a drawing illustrating exemplary uplink DC tone signals and exemplary noise component calculations in accordance with the present invention.

FIG. 17 is a drawing 1700 illustrating exemplary uplink DC tone signals and exemplary noise component calculations in accordance with the present invention. First column 1702 identifies OFDM symbol time interval in an exemplary dwell including 4 OFDM symbol time intervals. Second column 1704 includes wireless terminal baseband symbol values to be communicated. Third column 1706 includes wireless terminal passband transmitted symbol values. Fourth column 1708 includes base station passband received symbol values. Fifth column 1710 includes base station received baseband symbol values. Sixth column 1712 includes base station baseband recovered symbol values 1712. First row 1714 includes information corresponding to OFDM symbol time interval 1; second row 1716 includes information corresponding to OFDM symbol time interval 2; third row 1718 includes information corresponding to OFDM symbol time interval 3; fourth row 1720 includes information corresponding to OFDM symbol time interval 4.

Consider column 1704, the wireless terminal has mapped modulation symbol values (A, B, C), e.g., symbol values conveying data/information or reference symbol information, to be transmitted in symbol interval times (1, 2, 3), respectively. Modulation symbols values (A, B, C) may be include information that is part of a codeword. The fourth time interval has been designated the special time interval in the dwell to convey a special modulation symbol which is a function of the other three modulation symbol values (A, B, C). In some embodiments, no modulation symbol including, e.g., codeword information is mapped to be communicated during the fourth symbol time interval. In some embodiments, a modulation symbol including, e.g., codeword information is mapped to be communicated during the fourth symbol time interval, but is punctured by the special modulation symbol value which is the function of the other three modulation symbol values. In this example, the function is the negative of the summation of the other three values. The special modulation symbol value D=−(A+B+C) and is the baseband symbol value for the fourth symbol time interval as shown in the entry for column 1704, row 1720.

Consider column 1706, the wireless terminal passband transmitted symbol values are represented as the wireless terminal baseband symbol values+X, where X can represent the wireless terminal transmitter's DC tone noise characteristic error. The wireless terminal converts the baseband signal to a passband signal. The transmitter's DC tone noise characteristic error is introduced as part of the baseband to passband conversion process in the WT. The uplink signals are transmitted over the airlink and received by the base station. Channel noise is introduced via the air link transmission. In FIG. 17, the channel noise is represented as Y, the channel noise may change from one OFDM symbol time interval to another, e.g., due to changes in interference introduced from other sources. In symbol time interval (1, 2, 3, 4), the channel noise is represented as ($Y_1$, $Y_2$, $Y_3$, $Y_4$), respectively.

Column 1708 represents the passband received symbol value at the base station. For example, during symbol time interval 1, the received passband signal value is $A+X+Y_1$ as shown in the entry for column 1708, row 1714. The base station converts the passband signal to a baseband signal. It is assumed that the base station introduces relatively little additive noise as a result of its conversion from passband to baseband. Therefore, the symbol values shown in column 1710, the baseband received symbol values are the same as the passband received symbol values of column 1708.

The base station measures the received symbol values during the four symbol time intervals of the dwell. The base station generates an intermediate noise component value using a predetermined function. In this example, the base station generates an intermediate noise component value 1722 as the negative sum of the received symbol values from the first three symbol time intervals, Intermediate noise component value $=-((A+X+Y_1)+(B+X+Y_2)+(C+X+Y_3))$. The base station subtracts the intermediate noise component value from the fourth received symbol value, the predetermined special one of the four symbol values, and then scales the result of the subtraction by a factor of ¼ to produce a calculated DC noise signal component value 1724, Calculated DC noise signal component value $=((D+C+Y_4)-(-((A+X+Y_1)+(B+X+Y_2)+(C+X+Y_3))))/4$. Box 1726 also represents the calculated DC noise signal component value, but shows that since D=−(A+B+C), the calculated DC noise value=$X+(Y_1+Y_2+Y_3+Y_4)/4$.

The base station recovers the symbol values for the first three OFDM symbol time intervals, by subtracting the calculated DC noise signal component value from each of the received symbol values for the first three OFDM symbol time intervals. Column 1712 includes the base station recovered symbol values. For example, the symbol value recovered during symbol interval 2=$(B+X+Y2)-(X+(Y_1+Y_2+Y_3+Y_4)/4)$, as shown in the entry of column 1712 row 1716. In accordance with the present invention, the DC noise component, X, introduced during the baseband to passband conversion in the wireless terminal's transmitter cancels out in the equation and has been removed. In addition, if the channel characteristic remains constant during the dwell, the channel contribution Y will also cancel out and be removed. If the channel characteristics vary, an average amount of the channel characteristic DC noise during the dwell is removed.

Figure 24:
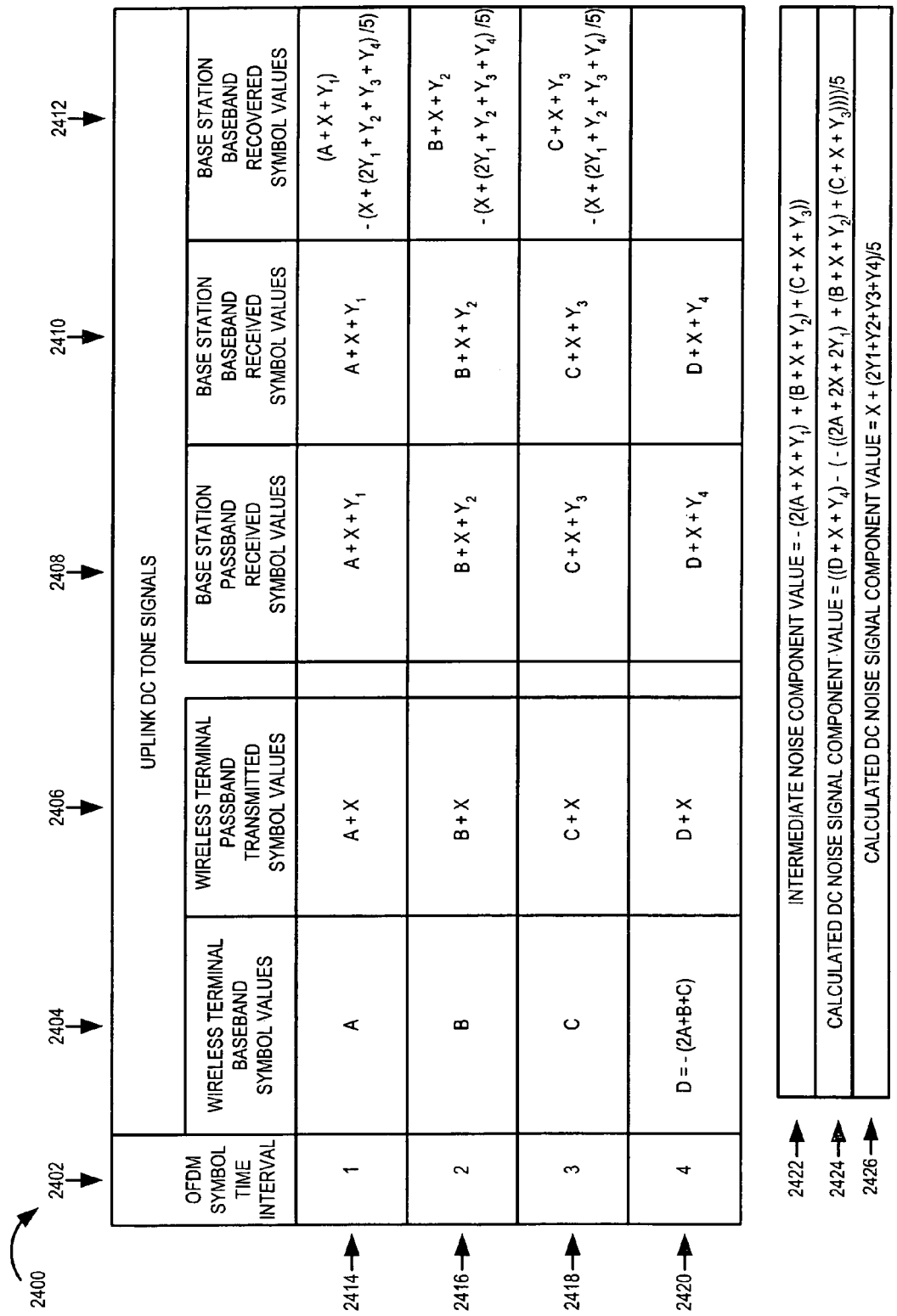
FIG. 24 is a drawing illustrating another set of exemplary uplink DC tone signals and exemplary noise component calculations in accordance with the present invention.

FIG. 24 is a drawing 2400 illustrating another set of exemplary uplink DC tone signals and exemplary noise component calculations in accordance with the present invention. First column 2402 identifies OFDM symbol time interval in an exemplary dwell including 4 OFDM symbol time intervals. Second column 2404 includes wireless terminal baseband symbol values to be communicated. Third column 2406 includes wireless terminal passband transmitted symbol values. Fourth column 2408 includes base station passband received symbol values. Fifth column 2410 includes base station received baseband symbol values. Sixth column 2412 includes base station baseband recovered symbol values 2412. First row 2414 includes information corresponding to OFDM symbol time interval 1; second row 2416 includes information corresponding to OFDM symbol time interval 2; third row 2418 includes information corresponding to OFDM symbol time interval 3; fourth row 2420 includes information corresponding to OFDM symbol time interval 4.

Consider column 2404, the wireless terminal has mapped modulation symbol values (A, B, C), e.g., symbol values conveying data/information or reference symbol information, to be transmitted in symbol interval times (1, 2, 3), respectively. Modulation symbols values (A, B, C) may be include information that is part of a codeword. The fourth time interval has been designated the special time interval in the dwell to convey a special modulation symbol which is a function of the other three modulation symbol values (A, B, C). In some embodiments, no modulation symbol including, e.g., codeword information is mapped to be communicated during the fourth symbol time interval. In some embodiments, a modulation symbol including, e.g., codeword information is mapped to be communicated during the fourth symbol time interval, but is punctured by the special modulation symbol value which is the function of the other three modulation symbol values. In this example, the function is the negative of the summation of (i) twice the value of the first modulation symbol, (ii) the value of the second modulation symbol, and (iii) the value of the third modulation symbol. The special modulation symbol value $D=-(2A+B+C)$ and is the baseband symbol value for the fourth symbol time interval as shown in the entry for column 2404, row 2420.

Consider column 2406, the wireless terminal passband transmitted symbol values are represented as the wireless terminal baseband symbol values+X, where X can represent the wireless terminal transmitter's DC tone noise characteristic error. The wireless terminal converts the baseband signal to a passband signal. The transmitter's DC tone noise characteristic error is introduced as part of the baseband to passband conversion process in the WT. The uplink signals are transmitted over the airlink and received by the base station. Channel noise is introduced via the air link transmission. In FIG. 24, the channel noise is represented as Y, the channel noise may change from one OFDM symbol time interval to another, e.g., due to changes in interference introduced from other sources. In symbol time interval (1, 2, 3, 4), the channel noise is represented as $(Y_1, Y_2, Y_3, Y_4)$, respectively.

Column 2408 represents the passband received symbol value at the base station. For example, during symbol time interval 1, the received passband signal value is $A+X+Y_1$ as shown in the entry for column 2408, row 2414. The base station converts the passband signal to a baseband signal. It is assumed that the base station introduces relatively little additive noise as a result of its conversion from passband to baseband. Therefore, the symbol values shown in column 2410, the baseband received symbol values are the same as the passband received symbol values of column 2408.

The base station measures the received symbol values during the four symbol time intervals of the dwell. The base station generates an intermediate noise component value using a predetermined function. In this example, the base station generates an intermediate noise component value 2422 as the negative sum of (i) two times the received symbol value from the first symbol time interval, (ii) the received symbol value from the second symbol time interval, and (iii) the received symbol value from the third symbol time interval; the Intermediate noise component value=$-(2(A+X+Y_1)+(B+X+Y_2)+(C+X+Y_3))$. The base station subtracts the intermediate noise component value from the fourth received symbol value, the predetermined special one of the four symbol values, and then scales the result of the subtraction by a factor of ⅕ to produce a calculated DC noise signal component value 2424, Calculated DC noise signal component value=$((D+C+Y_4)-(-((2A+2X+2Y_1)+(B+X+Y_2)+(C+X+Y_3))))/5$. Box 2426 also represents the calculated DC noise signal component value, but shows that since $D=-(2A+B+C)$, the calculated DC noise value=$X+(2Y_1+Y_2+Y_3+Y_4)/5$.

The base station recovers the symbol values for the first three OFDM symbol time intervals, by subtracting the calculated DC noise signal component value from each of the received symbol values for the first three OFDM symbol time intervals. Column 2412 includes the base station recovered symbol values. For example, the symbol value recovered during symbol interval $2=(B+X+Y_2)-(X+(2Y_1+Y_2+Y_3+Y_4)/5)$, as shown in the entry of column 1712 row 1716. In accordance with the present invention, the DC noise component, X, introduced during the baseband to passband conversion in the wireless terminal's transmitter cancels out in the equation and has been removed. In addition, if the channel characteristic remains constant during the dwell, the channel contribution Y will also cancel out and be removed. If the channel characteristics vary, variation levels will be a factor in determining the amount of channel noise removed.

Numerous variations of the function relating the special modulation symbol of the dwell to the other modulation symbols are possible, in accordance with the invention. Such exemplary functions may include scalers and/or offsets. For example, an offset can be added to generate the special modulation symbol and removed by the base station during recovery processing. For example, one exemplary function is $D=-(A+B+C)+E$, where D is the value of the special modulation symbol to be communicated during the fourth symbol time interval, (A, B, C) are modulation symbols representing encoded data to be communicated during the $(1^{st}, 2^{nd}, 3^{rd})$ symbol time intervals, and E is a reference offset value known to both the wireless terminal and the base station.

Figure 18:
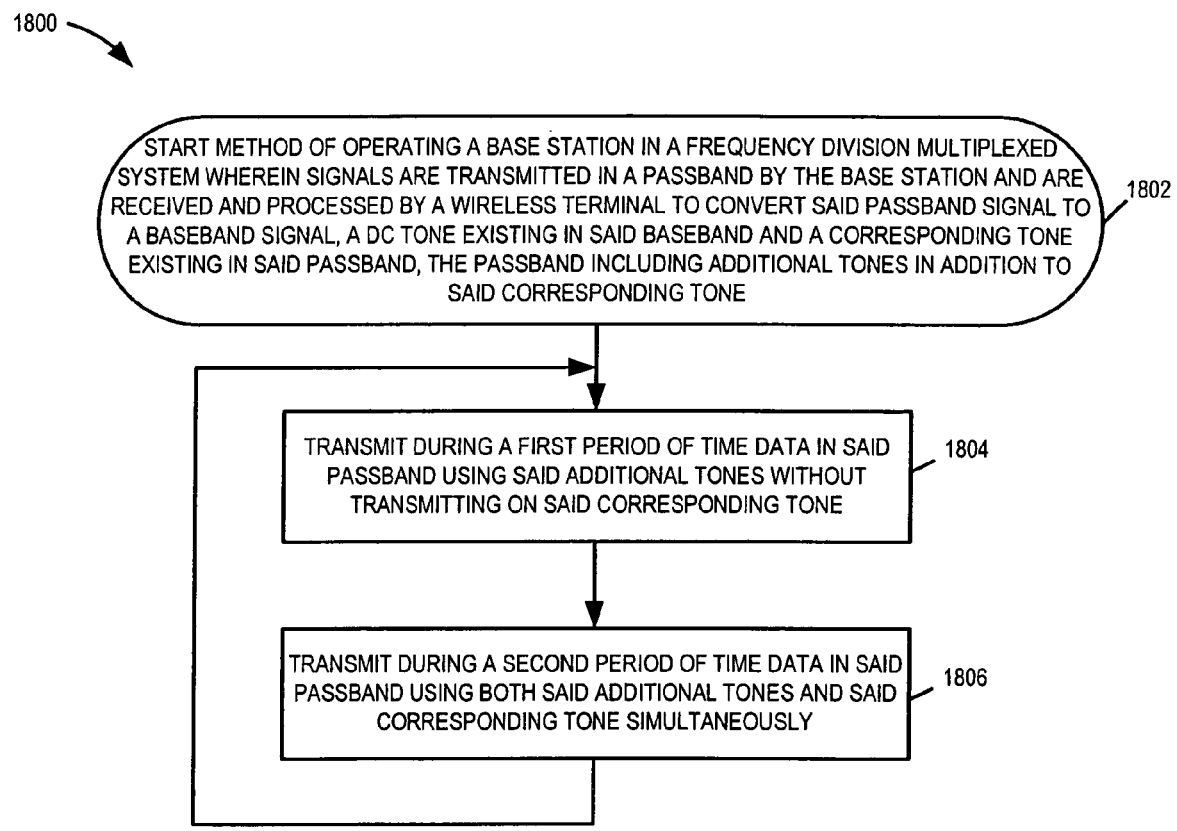
FIG. 18 is a flowchart of an exemplary method of operating a base station including special treatment of the downlink DC tone in a frequency division multiplexed system in accordance with the present invention.

FIG. 18 is a flowchart 1800 of an exemplary method of operating a base station in a frequency division multiplexed system in accordance with the present invention, wherein signals are transmitted by the base station in a passband and are received and processed by a wireless terminal to convert said passband signal to a baseband signal, a DC tone existing in said baseband and a corresponding tone existing in said passband, the passband including additional tones in addition to said corresponding tone. The base station may be the exemplary base station implemented in accordance with the present invention, e.g., BS 200 of FIG. 2. In some embodiments, the exemplary system is an orthogonal frequency division multiplexing (OFDM) system. In various embodiments, there are at least 100 additional tones.

Operation starts in start step 1802, where the base station is powered on and initialized. In some embodiments, the base station is initialized to operate using predefined downlink timing structure information. Operation proceeds from start step 1802 to step 1804, where the base station is operated to transmit during a first period of time data in said passband using said additional tones without transmitting on said corresponding tone. Operation proceeds from step 1804 to step 1806. In step 1806, the base station is operated to transmit during a second period of time data in said passband using both said additional tones and said corresponding tone simultaneously. Operation proceeds from step 1806 to step 1804, where transmission during another first period of time occurs.

In some embodiments, the first and second periods of time have a fixed timing relationship to one another and recur on a periodic basis. In various embodiments, the second period of time is at least 10 times longer than the first period of time.

Figure 19:
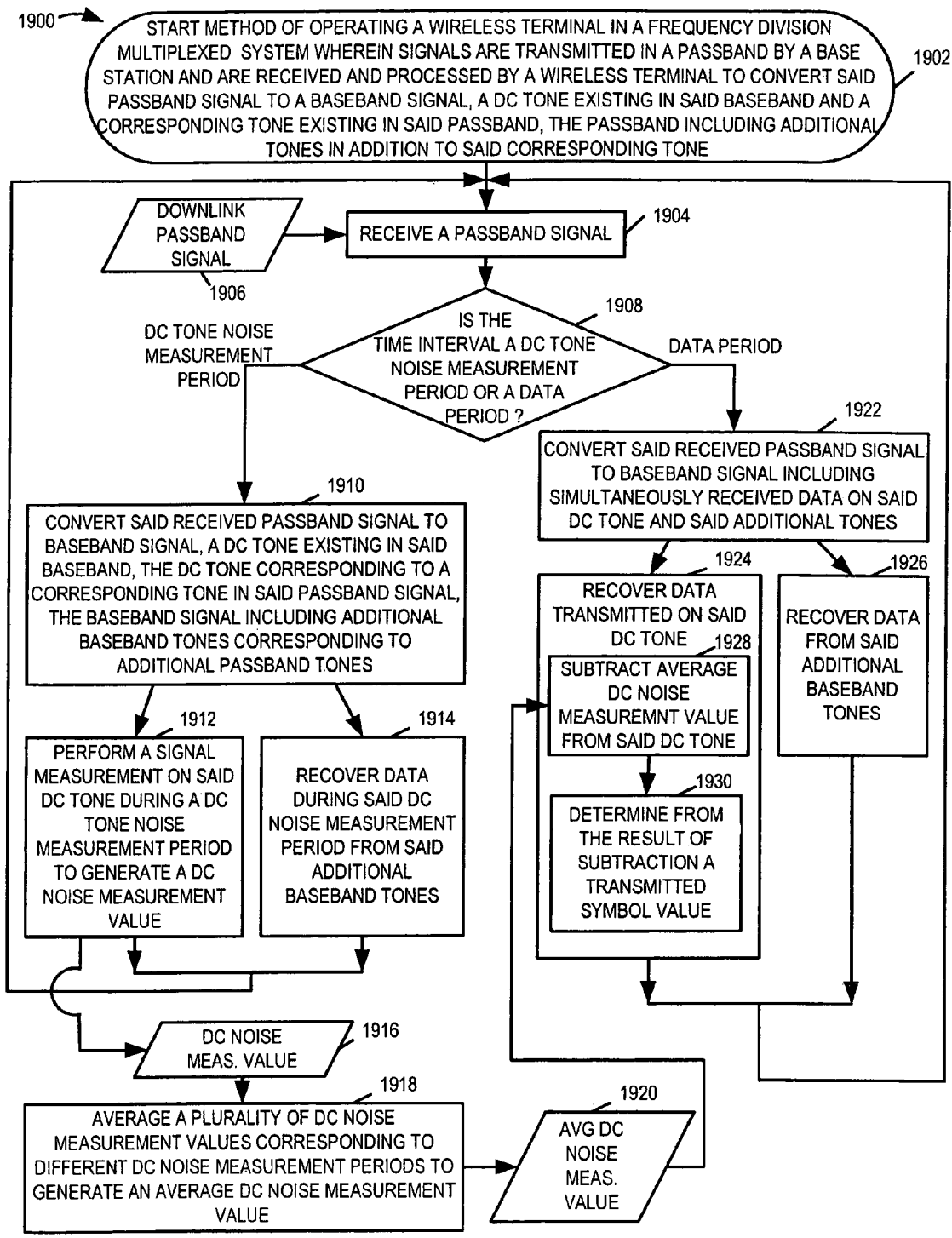
FIG. 19 is a flowchart of an exemplary method of operating a wireless terminal including special treatment of the downlink DC tone in accordance with the present invention in a frequency division multiplexed system.

FIG. 19 is a flowchart 1900 of an exemplary method of operating a wireless terminal in accordance with the present invention in a frequency division multiplexed system where signals are transmitted in a passband by a base station and are received and processed by a wireless terminal to convert said passband signal to a baseband signal, a DC tone existing in said baseband and a corresponding tone existing in said passband, the passband including additional tones in addition to said corresponding tone. The wireless terminal may be an exemplary wireless terminal implemented in accordance with the present invention, e.g., WT 300 of FIG. 3. In some embodiments, the exemplary system is an orthogonal frequency division multiplexing (OFDM) system. In various embodiments, there are at least 100 additional tones.

Operation starts in start step 1902, where the wireless terminal is powered on and initialized. In some embodiments, the wireless is initialized to operate using predefined downlink timing structure information known to the base station and wireless terminal, and the wireless terminal may be operated to synchronize with the base station downlink signaling timing. Operation proceeds from start step 1902 to step 1904, where the wireless terminal is operated to receive a passband signal, downlink passband signal 1906. Operation proceeds from step 1904 to step 1908.

In step 1908, the wireless terminal checks as to whether the time interval, corresponding to the received signal of step 1904, is a DC tone noise measurement period or a data period. If the time interval is a DC tone noise measurement period, operation proceeds from step 1908 to step 1910; however, if the time interval is a data period, operation proceeds from step 1908 to step 1922.

In step 1910, the wireless terminal is operated to convert said received passband signal to baseband signal, a DC tone existing in said baseband, the DC tone corresponding to a corresponding tone in said passband signal, the baseband signal including additional baseband tones corresponding to additional passband tones. Operation proceeds from step 1910 to steps 1912 and step 1914. In step 1912, the wireless terminal is operated to perform a signal measurement on said DC tone during a DC tone measurement period to generate a DC noise measurement value 1916. In step 1916, the wireless terminal is operated to recover data during said DC noise measurement period from said additional baseband tones. Operation proceeds from step 1912 and 1914 to step 1904, where the wireless terminal receives additional passband signals. Operation also proceeds from step 1912 to step 1918, Where the DC noise measurement value 1916 is received. A number of DC noise measurement values 1916 may be forwarded to step 1918 from different DC noise measurement periods. In step 1918, the wireless terminal is operated to average a plurality of DC noise measurement values corresponding to different DC noise measurement periods to generate an average DC noise measurement value 1920. In some embodiments, different techniques, such as, e.g., filtering, weighted averaging, etc. may be employed in place of the averaging of step 1918 to generate a DC noise measurement correction value in place of average DC noise measurement value 1920.

Returning to step 1908, assume that the time interval corresponding to received passband signal of step 1904 is a data period, then operation proceeds to step 1922. In step 1922, the wireless terminal is operated to convert said received passband signal to baseband including simultaneously received data on said DC tone and said additional tones. Operation proceeds from step 1922 to step 1924 and step 1926.

In step 1924, the wireless terminal is operated to recover data transmitted on said DC tone. Step 1924 includes sub-step 1928 and sub-step 1930. In sub-step 1928, the wireless terminal is operated to subtract the average DC noise measurement value 1920 from said DC tone. Operation proceeds from step 1928 to step 1930. In step 1930, the wireless terminal is operated to determine from the result of the subtraction a transmitted symbol value. Data may be recovered from the determined transmitted symbol value.

In step 1926, the wireless terminal is operated to recover data from said additional baseband tones. Operation proceeds from steps 1924 and 1926 to step 1904, where the wireless terminal receives additional passband signals.

In some embodiments, during said noise measurement period, the corresponding tone does not carry any transmitted power. In various embodiments, the data period is at least 10 times longer than said DC tone noise measurement period and at least 10 symbols are recovered during said data period on said DC tone.

Figure 20:
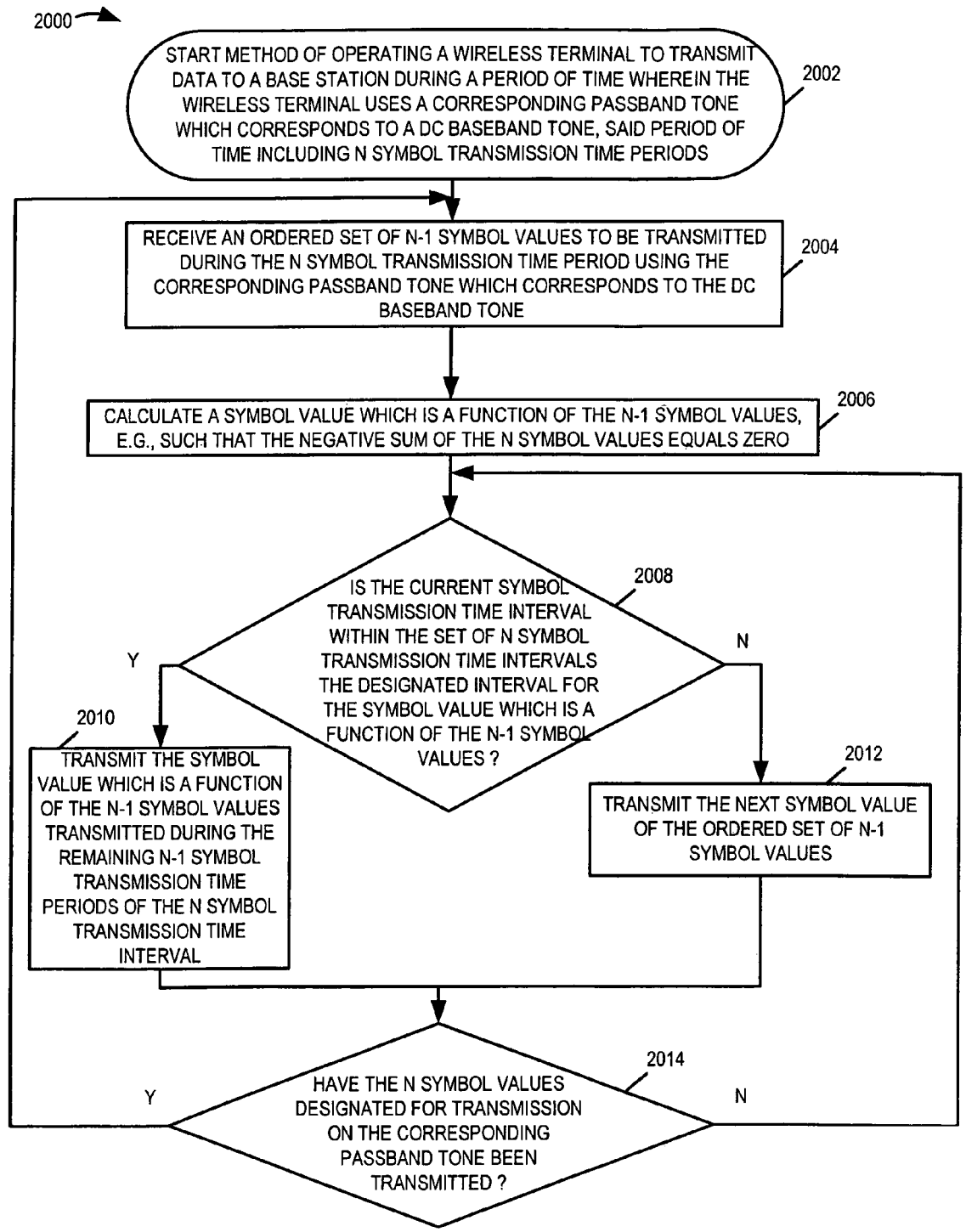
FIG. 20 is a flowchart of an exemplary method of operating a wireless terminal including special treatment of the uplink DC tone in accordance with the present invention to transmit data to a base station.

FIG. 20 is a flowchart 2000 of an exemplary method of operating a wireless terminal in accordance with the present invention to transmit data to a base station during a period of time wherein the wireless terminal uses a corresponding passband tone which corresponds to a DC baseband tone, said period of time including N symbol transmission time periods. The wireless terminal may be an exemplary wireless terminal implemented in accordance with the present invention, e.g., WT 300 of FIG. 3. In some embodiments, the wireless terminal is part on an exemplary frequency division multiplexing system, e.g., an orthogonal frequency division multiplexing (OFDM) system. In various embodiments, there are at least 100 additional passband tones used in the system for uplink signaling in addition to the corresponding passband tone which corresponds to the DC baseband tone.

Operation starts in start step 2002, where the wireless terminal is powered on, initialized, and has determined that the wireless terminal should use the corresponding passband tone which corresponds to the DC baseband tone for a time period including N symbol transmission time periods. In some embodiments, the wireless is initialized to operate using predefined uplink timing structure information known to the base station and wireless terminal, and the wireless terminal may be operated to synchronize with the base station with respect to uplink signaling timing. In some embodiments, a set of tones is allocated to the wireless terminal by the base station for uplink signaling during a given period of time as a function of the uplink scheduling information, said set of allocated tones may include the passband tone which corresponds to the baseband DC tone. Assuming the passband tone corresponding to the baseband tone for uplink signaling has been allocated to the wireless terminal, operation proceeds from step 2002 to step 2004.

In step 2004, the wireless terminal's uplink DC tone module is operated to receive an ordered set of N−1 symbol values to be transmitted during the N symbol transmission time period using the corresponding passband tone which corresponds to the DC baseband tone. Operation proceeds from step 2004 to 2006, where the wireless terminal is operated calculate a symbol value which is a function of the N−1 symbol values. For example, the symbol value which is a function of the N−1 symbol values may be a function such that the negative sum of the N symbol values equals zero. Operation proceeds from step 2006 to step 2008.

In step 2008, the wireless terminal is operated to determine if the current symbol transmission time interval within the set of N symbol transmission time intervals is the designated interval for transmission of the symbol value which is a function of the other N−1 symbol values. Timing structure information, known to both the wireless terminal and the base station, can be used by the wireless terminal in performing the determination of step 2008. For example, in some embodiments, the special symbol value which is a function of the other N−1 symbol values is transmitted in a fixed predetermined location within the set of N transmission time intervals, e.g., the Nth location. If the current symbol transmission time interval is the designated interval for transmission of the special symbol value which is a function of the N−1 symbol values, then operation proceeds to step 2010; otherwise operation proceeds to step 2012.

In step 2010, the wireless terminal is operated to transmit the symbol value which is a function of the N−1 symbol values transmitted during the remaining N−1 symbol transmission time periods of the N symbol transmission time interval. In step 2012, the wireless terminal is operated to transmit the next symbol value of the ordered set of N−1 symbol values. Operation proceeds from either step 2010 or step 2012 to step 2014. In step 2014, the wireless terminal is operated to check if the N symbol values designated for transmission on the corresponding passband tone corresponding to the DC baseband tone have been transmitted. If the N symbol values have been transmitted, then the period of time including the N symbol time periods has completed and operation goes to step 2004, where the wireless terminal waits to be allocated the corresponding tone corresponding to the DC baseband tone for another period of time including another N symbol transmission time periods and waits to receive another ordered set of N−1 symbol values to be transmitted using said corresponding tone. If the N symbol values have not been transmitted, then the time period including the N symbol time periods has not completed, and the wireless terminal moves to the next symbol transmission time interval in the set of N symbol transmission time intervals and proceeds to step 2008, where the wireless terminal checks if the current symbol transmission time interval is the designated interval for transmission of the symbol value which is a function of the other N−1 symbol values.

Figure 21:
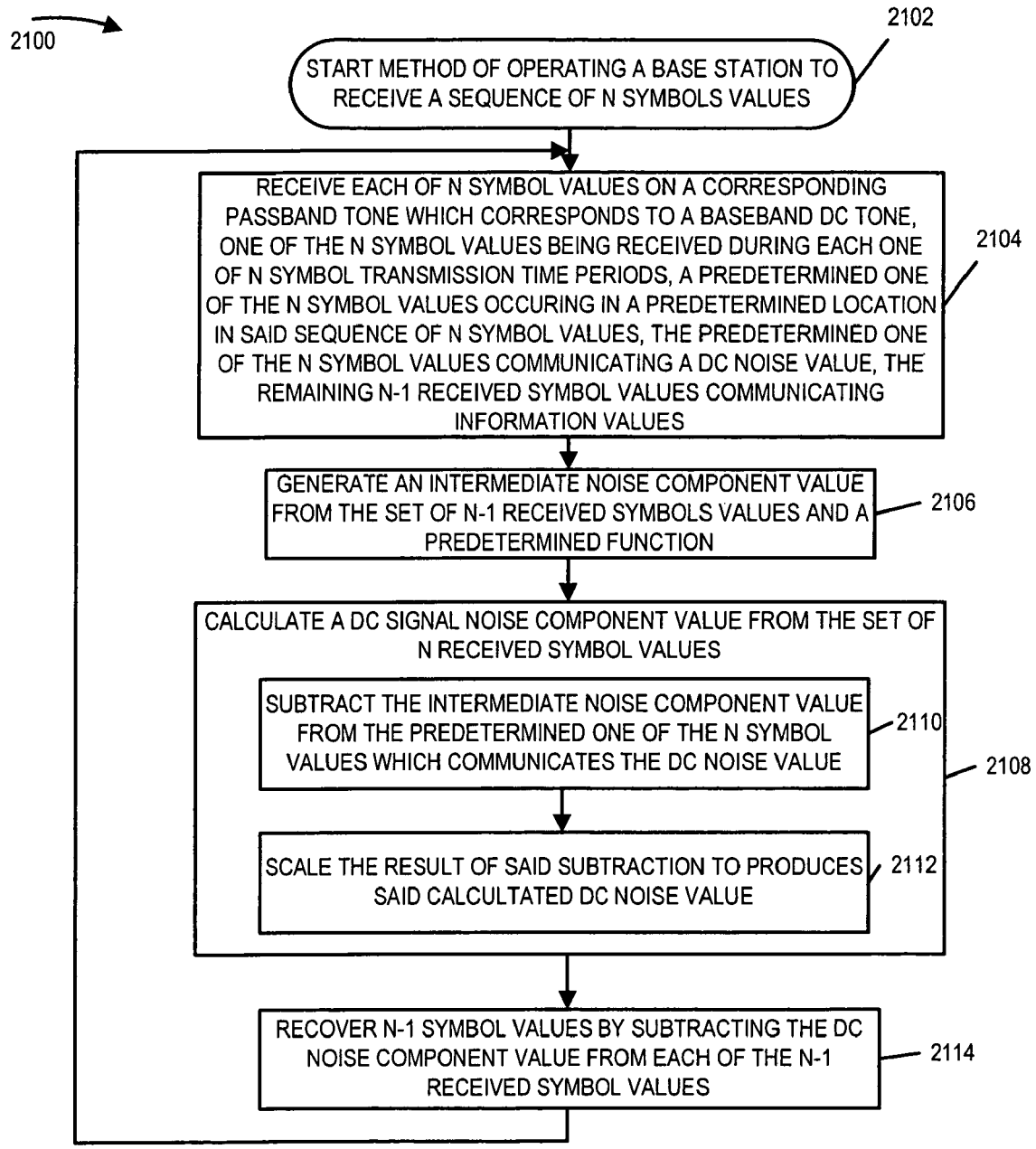
FIG. 21 is a flowchart of an exemplary method of operating a base station to receive a sequence of N symbols values from the same wireless terminal on an uplink passband tone corresponding to an uplink baseband DC tone in accordance with the present invention.

FIG. 21 is a flowchart 2100 of an exemplary method of operating a base station to receive a sequence of N symbols values from the same wireless terminal on an uplink passband tone corresponding to an uplink baseband DC tone in accordance with the present invention. The base station may be the exemplary base station implemented in accordance with the present invention, e.g., BS 200 of FIG. 2. In some embodiments, the exemplary system is a frequency division multiplexing system, e.g., an orthogonal frequency division multiplexing (OFDM) system. In various embodiments, there are at least 100 additional uplink tones used the system in addition to the uplink DC tone. Operation starts in start step 2102, where the base station is powered on and initialized. The base station may be initialized to operate using predetermined timing structure information, may accept registration signals from wireless terminals, and may allocate resources to the wireless terminals. Operation proceeds from start step 2102 to step 2104.

In step 2104, the base station is operated to receive each of N symbol values on a corresponding passband tone which corresponds to a baseband DC tone, one of the N symbol values being received during each one of N symbol transmission time periods, a predetermined one of the N symbol values occurring in a predetermined location in said sequence of N symbol values, the predetermined one of the N symbol values communicating a DC noise value, the remaining N−1 received symbol values communicating information values. The wireless terminal transmitting the uplink signals also knows and uses the predetermined location information relating to the sequence of N symbols. The N received symbol values having been transmitted by the same wireless terminal. In some embodiments, the received N symbol transmissions time periods are contiguous and correspond to a dwell. Operation proceeds from step 2104 to step 2106.

In step 2106, the base station is operated to generate an intermediate noise component value from the set of N−1 received symbol values associated with communicated information values and a predetermined function. In some embodiments, the predetermined function is the negative of the sum of the N−1 received symbol values. Operation proceeds from step 2106 to step 2108.

In step 2108, the base station is operated to calculate a DC signal noise component value from the set of N received symbol values. Step 2108 includes sub-step 2110 and sub-step 2112. In sub-step 2110, the base station is operated to subtract the intermediate noise component value from the predetermined one of the received N symbol values which communicates the DC noise value. In step 2112, the base station is operated to scale the result of the subtraction of sub-step 2110 to produce said calculated DC noise value. In some embodiments, the step of scaling includes diving the result of said subtraction by a predetermined fixed value, e.g. the value of N. Operation proceeds from step 2108 to step 2114.

In step 2114, the base station is operated to recover N−1 symbol values by subtracting the DC noise component value from each of the N−1 received symbol values. Operation proceeds from step 2114 to step 2104, where the base station receives another set of N symbol values on the passband tone corresponding the baseband DC tone. In various embodiments, different wireless terminals are assigned to use the uplink passband tone corresponding to the uplink baseband DC tone at different times, e.g., different dwells.

In some embodiments, the N symbol time periods are contiguous time periods and the DC tone is used by a different wireless terminal in the immediate subsequent set of N symbol transmission time periods for at least some subsequent sets of N symbol transmission time periods. For example, in various embodiments, base station segment allocation determines which wireless terminal is allocated the DC tone for a contiguous set of N symbol time periods. In some embodiments, the uplink DC tone may be allocated for a contiguous set of N symbol time periods to different WTs, e.g., on an alternating basis.

In some embodiments, the use of the uplink passband tone corresponding to the uplink baseband DC tone may be interwoven between two or more wireless terminals. In such an embodiment, the base station may operate two or more implementations, e.g., in parallel, of steps (2104, 2106, 2108, 2114). Each implementation may correspond to a different wireless terminal using the uplink baseband DC for a sequence of N transmitted symbols, where the time interval associated with the sequence of the N transmitted symbols for one WT overlaps, e.g., partially, with the time sequence associated with the sequence of N transmitted symbols associated with a different WT.

Figure 22:
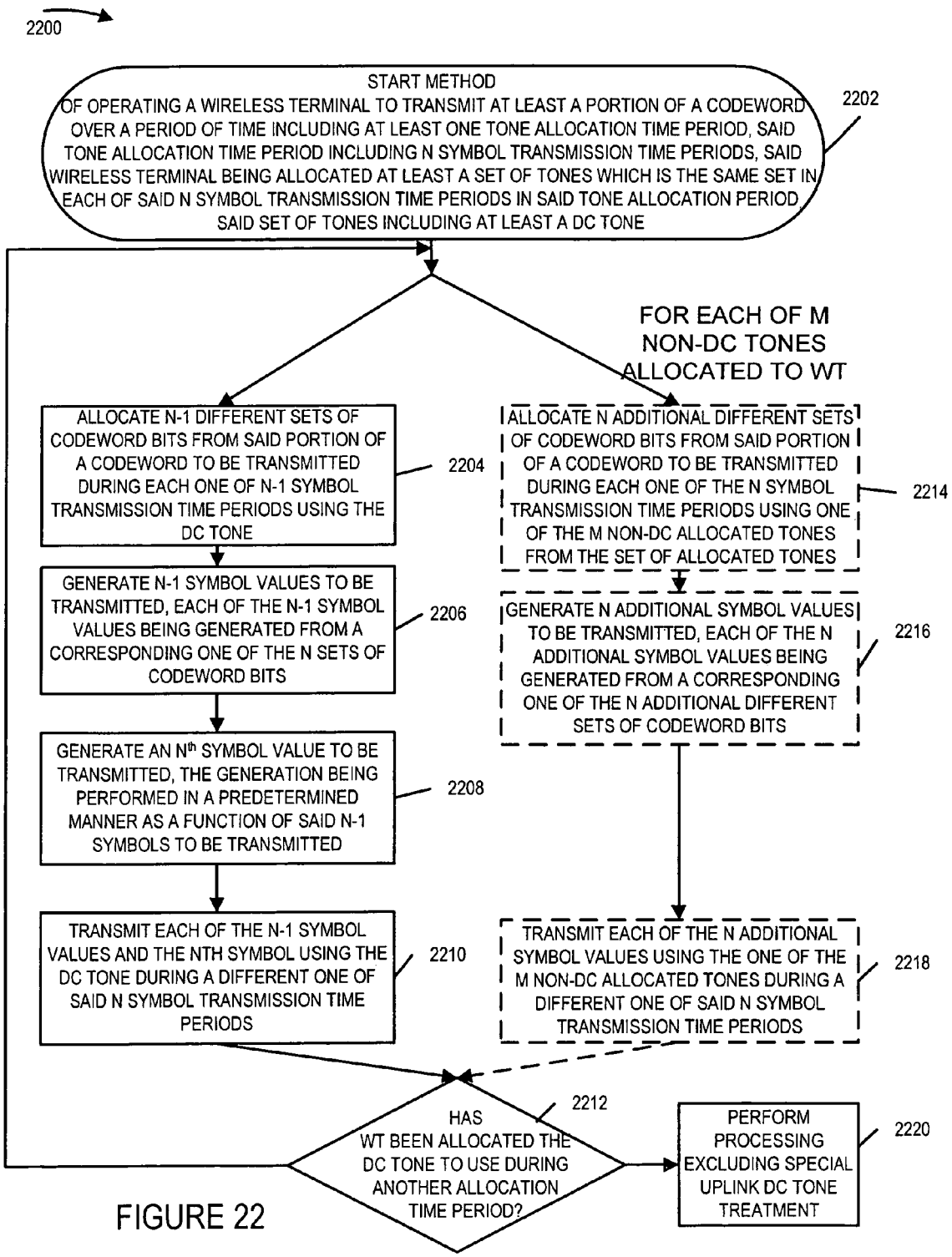
FIG. 22 is a flowchart of an exemplary method of operating a wireless terminal in accordance with the present invention to transmit at least a portion of a codeword over a period of time including at least one tone allocation time period, said tone allocation time period including N symbol transmission time periods, said wireless terminal being allocated the same set of tones to use in each of said N symbol transmission time periods in said tone allocation time period, said set of tones including at least a DC tone.

FIG. 22 is a flowchart 2200 of an exemplary method of operating a wireless terminal to transmit at least a portion of a codeword over a period of time including at least one tone allocation time period, said tone allocation time period including N symbol transmission time periods, said wireless terminal being allocated at least a set of tones which is the same in each of said N symbol transmission time periods in said tone allocation time period, said set of tones including at least a DC tone. The wireless terminal may be an exemplary wireless terminal implemented in accordance with the present invention, e.g., WT 300 of FIG. 3. In some embodiments, the wireless terminal is one of a plurality of wireless terminals in a frequency division multiplexing system, e.g., an orthogonal frequency division multiplexing (OFDM) system, in which the wireless terminals transmit uplink signals to a base station. In various embodiments, the set of tones allocated to one wireless terminal for one tone allocation period is a subset of a set of uplink tones used in the system, said uplink system set including at least 100 additional tones in addition to the DC tone.

Operation starts in start step 2202, where the wireless terminal is powered on and initialized. In some embodiments, the wireless is initialized to operate using predefined uplink timing structure information known to the base station and wireless terminal, and the wireless terminal may be operated to synchronize with the base station regarding uplink signaling timing. In some embodiments, the set of allocated tones is allocated to the wireless terminal by the base station as a function of the uplink scheduling information. Operation proceeds from start step 2202 to step 2204.

In step 2204 the wireless terminal is operated to allocate N−1 different sets of codeword bits from said portion of a codeword to be transmitted during each one of N−1 symbol transmission time periods using the DC tone. Operation proceeds from step 2204 to step 2206. During tone allocations periods, where the set of allocated tones to the wireless terminal includes M additional non-DC tones in addition to the DC tone, operation also proceeds from start step 2202 to step 2214.

In step 2206, the wireless terminal is operated to generate N−1 symbol values to be transmitted, each of the N−1 symbol values to be transmitted being generated from a corresponding one of the N sets of codeword bits. Operation proceeds from step 2206 to step 2208. In step 2208, the wireless terminal is operated to generate an Nth symbol value to be transmitted, the generation being performed in a predetermined manner as a function of said N−1 symbols to be transmitted. In some embodiments, the generated N symbol values to be transmitted sums to zero. Operation proceeds from step 2208 to step 2210.

In step 2210, the wireless terminal is operated to transmit each of the N−1 symbol values and the Nth symbol value using the DC tone during a different one of said N symbol transmission time periods. In some embodiments, the Nth symbol value is transmitted in a predetermined one of the N symbol transmission time periods using said DC tone. For the example, the Nth symbol value can be transmitted in the last symbol transmission time period of the set of N symbol transmission time periods, and that predetermined location is known to the wireless terminal and base station. Operation proceeds from step 2210 to step 2212.

Returning to step 2214, in step 2214 the wireless terminal is operated to allocate N additional different sets of codeword bits from said portion of a codeword to be transmitted during each one of the N symbol transmission time periods using one of the M non-DC allocated tones from the set of allocated tones. Operation proceeds from step 2214 to step 2216.

In step 2216, the wireless terminal is operated to generate N additional symbol values to be transmitted, each of the N additional symbol values to be transmitted being generated from a corresponding one of the N additional different sets of codeword bits. Operation proceeds from step 2216 to step 2218.

In step 2218, the wireless terminal is operated to transmit each of the N additional symbol values using the one of the M non-DC allocated tones during a different one of said N symbol transmission time periods. The operations of step 2218, when performed, are performed in parallel to the operations of step 2210. Operations proceed from step 2218 to step 2212.

If the set of allocated tones includes more than one non-DC tone to use for uplink transmission, multiple flows of steps (2214, 2216, 2218) may be performed, e.g., one for each of the allocated non-DC tones.

In step 2212 the wireless terminal checks if it has been allocated the DC tone to use during another tone allocation time period, e.g., the subsequent tone allocation period immediately following said tone allocation period. If the wireless terminal has been allocated the DC tone for another tone allocation time period, operation proceeds to steps 2204 and, if a non DC tone has also been allocated, to step 2214. However, if the wireless terminal has not been allocated to use the DC tone for uplink signaling during the another tone allocation period under consideration, then operation proceeds to step 2220, where the wireless terminal is operated to perform processing excluding special uplink DC tone treatment. For example, if the wireless terminal is allocated to use a set of tones for uplink signaling which excludes the DC tone for the tone allocation period under consideration, then operations similar to step 2214, 2216, 2218 may be performed.

Figure 25:
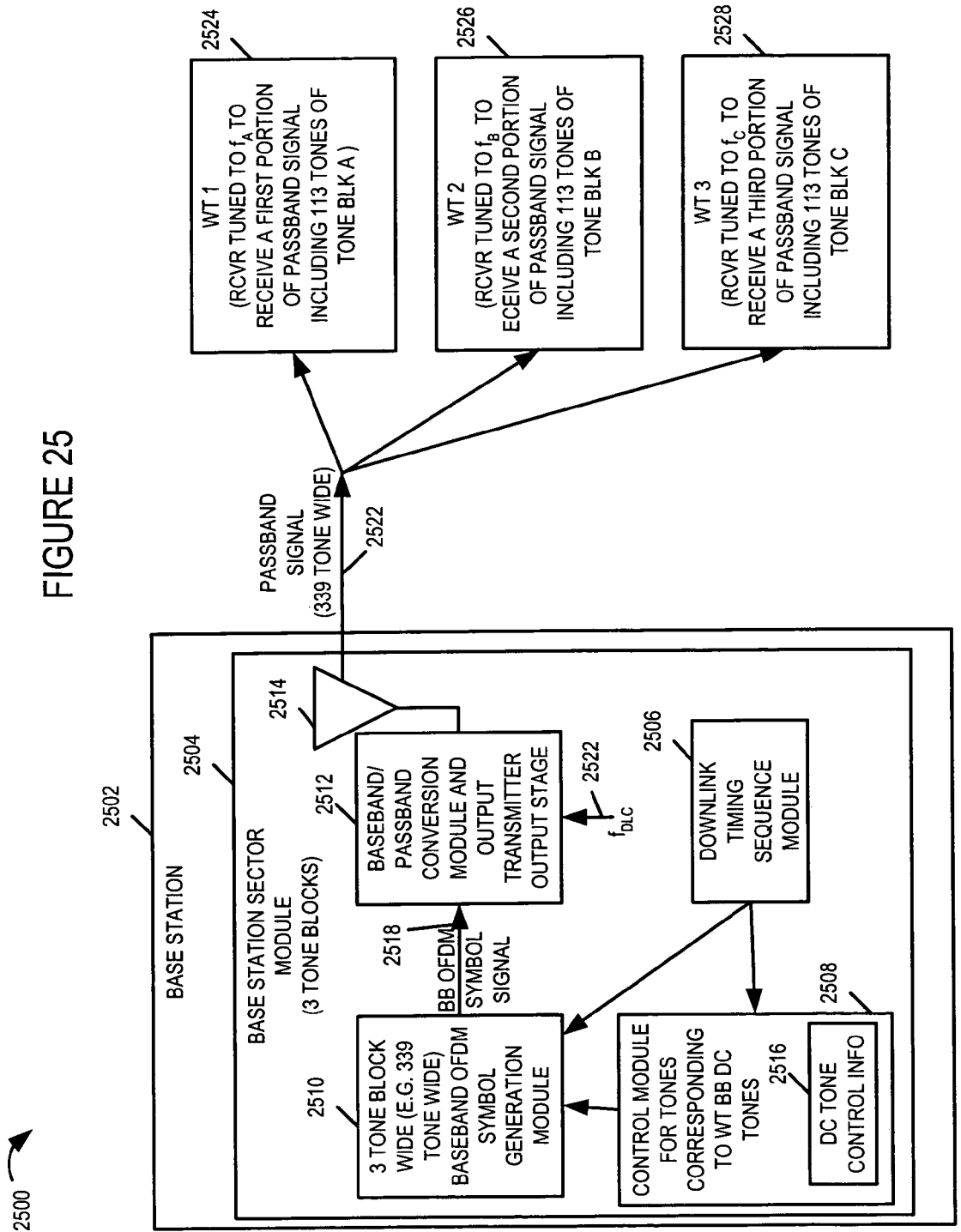
FIG. 25 is a drawing illustrating an exemplary base station and exemplary wireless terminals, implemented in accordance with the present invention.

FIG. 25 is a drawing 2500 illustrating an exemplary base station 2502 and exemplary wireless terminals (2524, 2526, 2528), implemented in accordance with the present invention. Exemplary base station 2502 is a base station which uses three tone blocks in the same sector, e.g., each tone block corresponding to a point of network attachment. For each point of network attachment a plurality of active wireless terminal users may be maintained and serviced. Base station 2502 is, e.g., a base station supporting 3 sectors, with each sector supporting 3 points of network attachment corresponding to 3 tone blocks. Base station 2504 includes a base station sector module 2504 for each sector supported by the base station. Base station sector module 2504 includes a downlink timing sequence module 2506, a control module for tones corresponding to WT baseband DC tones 2508, a 3 tone block wide baseband OFDM symbol generation module 2510, a baseband to passpand conversion module and output transmitter stage 2512, and a transmitter antenna 2514. The downlink timing sequence module 2506 signals the control module 2508 and/or the symbol generation module 2510 as to the current timing in a downlink timing and frequency structure being maintained by the base station, e.g., which recurs periodically. Control module 2508 includes DC tone control information 2516. The DC tone control information 2516 identifies which tones and at what point in the downlink timing structure no transmission should occur on each of those tones. The tones identified will correspond to baseband DC tones from the perspective of a WT receiver, tuned to receive a single tone block, e.g., tone block A, tone block B, or tone block C. In some embodiments, each of the tones identified will be controlled to suspend transmission at the same time. In some other embodiments, identified tones from different tone blocks will be controlled to suspend transmission at different points in time. Control signals from module 2508 are input to baseband OFDM symbol generation module 2510.

The baseband symbol generation module 2510 generates baseband OFDM symbol signals 2518, each OFDM symbol signal including a 3 tone block wide frequency width, e.g., 339 contiguous baseband tones. The control information from module 2508 is used by symbol generation module to zero the power level associated with specific tones at specific times in the downlink timing structure, thus providing the opportunity for a wireless terminal receiver to measure self-noise corresponding to the DC tone. The basesband OFDM symbol signals 2518 output from module 2510 are input to baseband/passband conversion module and output transmitter output stage 2512. Module 2512 mixes the baseband signal with the downlink carrier frequency $f_{DLC}$ 2520 and amplifies the signal which it transmits via antenna 2514 as passband signal 2522, the passeband signal including 339 tones corresponding to the 339 baseband tones.

WT 1 2524 is tuned to $f_A$ to receive a first portion of passband signal 2522 including 113 tones of tone block A. WT 2 2526 is tuned to $f_B$ to receive a second portion of passband signal 2522 including 113 tones of tone block B. Wireless terminal 3 2528 is tuned to $f_C$ to receive a third portion of passband signal 2522 including 113 tones of tone block C. From each WT's perspective, its baseband DC tone has been periodically controlled not to be transmitted on, thus allowing the WT to perform a calibration of the noise level corresponding to its DC tone, and rendering the DC tone to be useful for communicating downlink signals. This approach, in accordance with the present invention, increases capacity of the downlink. This approach is in contrast to known implementations where the tone corresponding to the WT's downlink DC tone is not used to communicate information or where the information communicated on the tone corresponding to the WT's downlink DC tone is typically ignored due the uncertainties associated with the noise.

Figure 26:
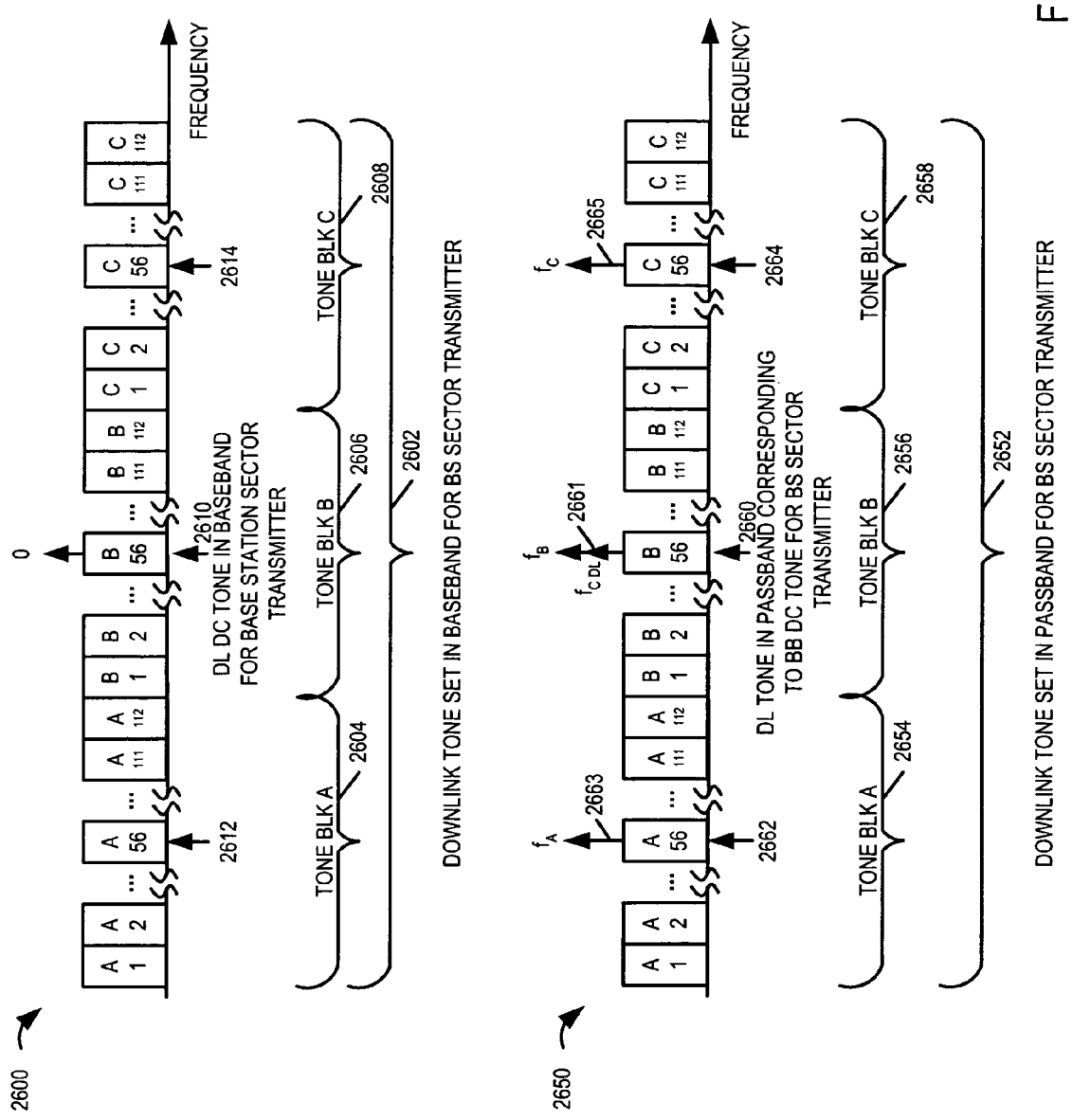
FIG. 26 is a drawing illustrating an exemplary downlink tone set in the baseband for an exemplary basestation sector transmitter using multiple tone blocks and a corresponding passband set of tones.

FIGS. 26-31 are to be considered in view of the exemplary embodiment illustrated in FIG. 25. FIG. 26 includes a drawing 2600 illustrating a downlink tone set in the baseband for an exemplary basestation sector transmitter 2602. The tone block 2602 includes tone block A 2604, tone block B 2606, and tone block C 2608. Each tone block (2604, 2606, 2608) includes 113 tones. From the base station's perspective the downlink DC tone in its baseband is tone 2610 (tone block B tone 56). However, it is anticipated that a wireless terminal receiver will typically be processing a single tone block; therefore, in accordance with the invention, special treatment is also applied to the center tone in each of the other tone blocks, tone 2612 (tone block A tone 56) and tone 2614 (tone block C 2614). The special treatment applied to tones 2610, 2612, and 2614, is, e.g., the suspension of transmission on those tones at periodic time intervals within the downlink timing structure. FIG. 26 also includes a drawing 2650 illustrating a downlink tone set in the passband for the base station sector transmitter 2652. The tone set 2652 includes a tone block A 2654, a tone block B 2656, and a tone block C 2658. The downlink tone in the passband corresponding to the baseband DC tone 2610 for the base station sector transmitter is tone 2660 situated at the downlink carrier frequency $f_{CDL}$ 2661. Downlink carrier frequency $f_{CDL}$ 2661 also corresponds to the carrier frequency $f_B$ to which a WT, e.g., WT 2 2526, would tune to receive the portion of the downlink passband signal including tone block B passband tones. The downlink tone in the passband corresponding to the baseband tone 2612 for the base station sector transmitter is tone 2662 situated at the downlink carrier frequency $f_A$ 2663. Downlink carrier frequency $f_A$ 2663 also corresponds to the carrier frequency to which a WT, e.g., WT 1 2524, would tune to receive the portion of the downlink passband signal including tone block A passband tones. The downlink tone in the passband corresponding to the baseband tone 2614 for the base station sector transmitter is tone 2664 situated at the downlink carrier frequency $f_C$ 2665. Downlink carrier frequency $f_C$ 2665 corresponds to the carrier frequency to which a WT, e.g., WT 3 2528, would tune to receive the portion of the downlink passband signal including tone block C passband tones.

Figure 27:
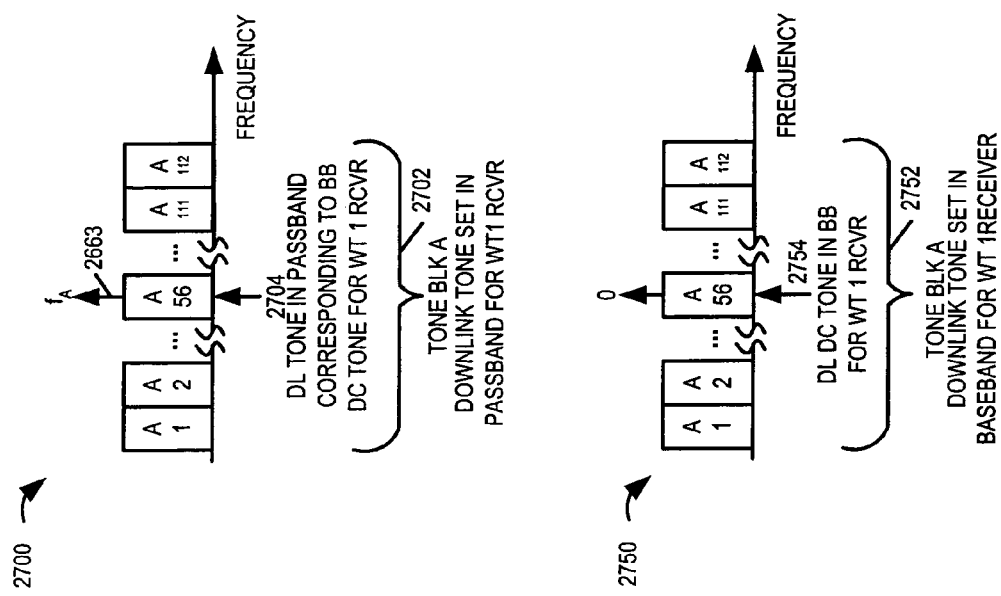
FIG. 27 includes a drawing including a tone block downlink tone set in the passband for exemplary WT1 receiver and a corresponding baseband set of tones.

FIG. 27 includes a drawing 2700 including a tone block A downlink tone set 2702 in the passband for WT1 receiver. Tone block 2702 includes a downlink tone 2704 in the passband corresponding to the baseband DC tone 2754 for WT1 receiver. FIG. 27 also includes a drawing 2750 including a tone block A downlink tone set 2752 in the baseband for WT1 receiver. Tone block 2752 includes a downlink DC tone 2754 in the baseband for WT1 receiver.

Figure 28:
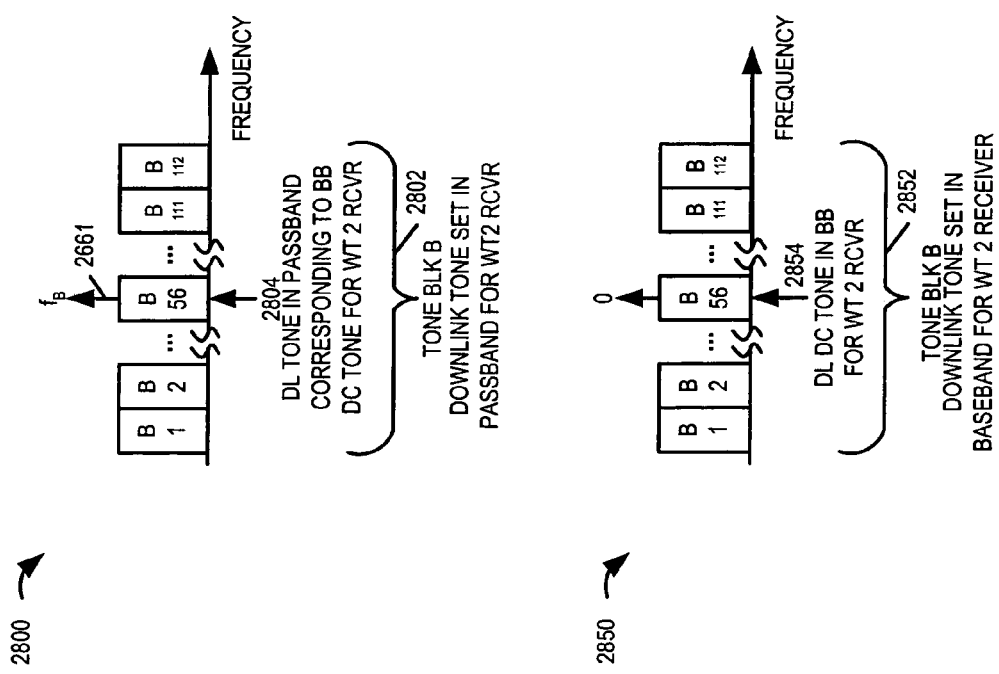
FIG. 28 includes a drawing including a tone block downlink tone set in the passband for exemplary WT2 receiver and a corresponding baseband set of tones.

FIG. 28 includes a drawing 2800 including a tone block B downlink tone set 2802 in the passband for WT2 receiver. Tone block 2802 includes a downlink tone 2804 in the passband corresponding to the baseband DC tone 2854 for WT2 receiver. FIG. 28 also includes a drawing 2850 including a tone block B downlink tone set 2852 in the baseband for WT2 receiver. Tone block 2852 includes a downlink DC tone 2854 in the baseband for WT2 receiver.

Figure 29:
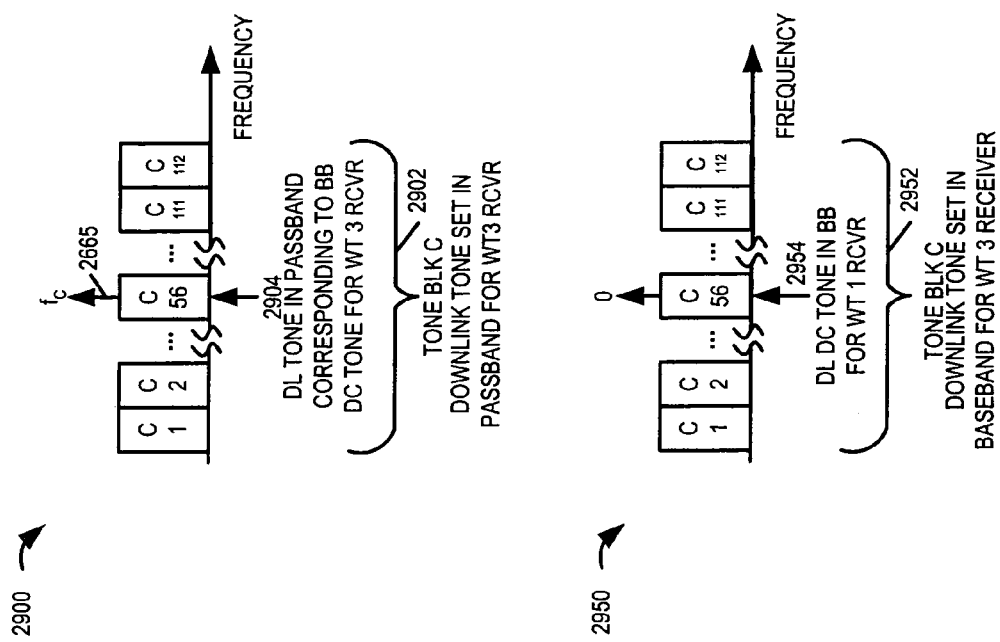
FIG. 29 includes a drawing including a tone block downlink tone set in the passband for exemplary WT3 receiver and a corresponding baseband set of tones.

FIG. 29 includes a drawing 2900 including a tone block C downlink tone set 2902 in the passband for WT3 receiver. Tone block 2902 includes a downlink tone 2904 in the passband corresponding to the baseband DC tone 2954 for WT3 receiver. FIG. 29 also includes a drawing 2950 including a tone block C downlink tone set 2952 in the baseband for WT3 receiver. Tone block 2952 includes a downlink DC tone 2954 in the baseband for WT3 receiver.

Figure 30:
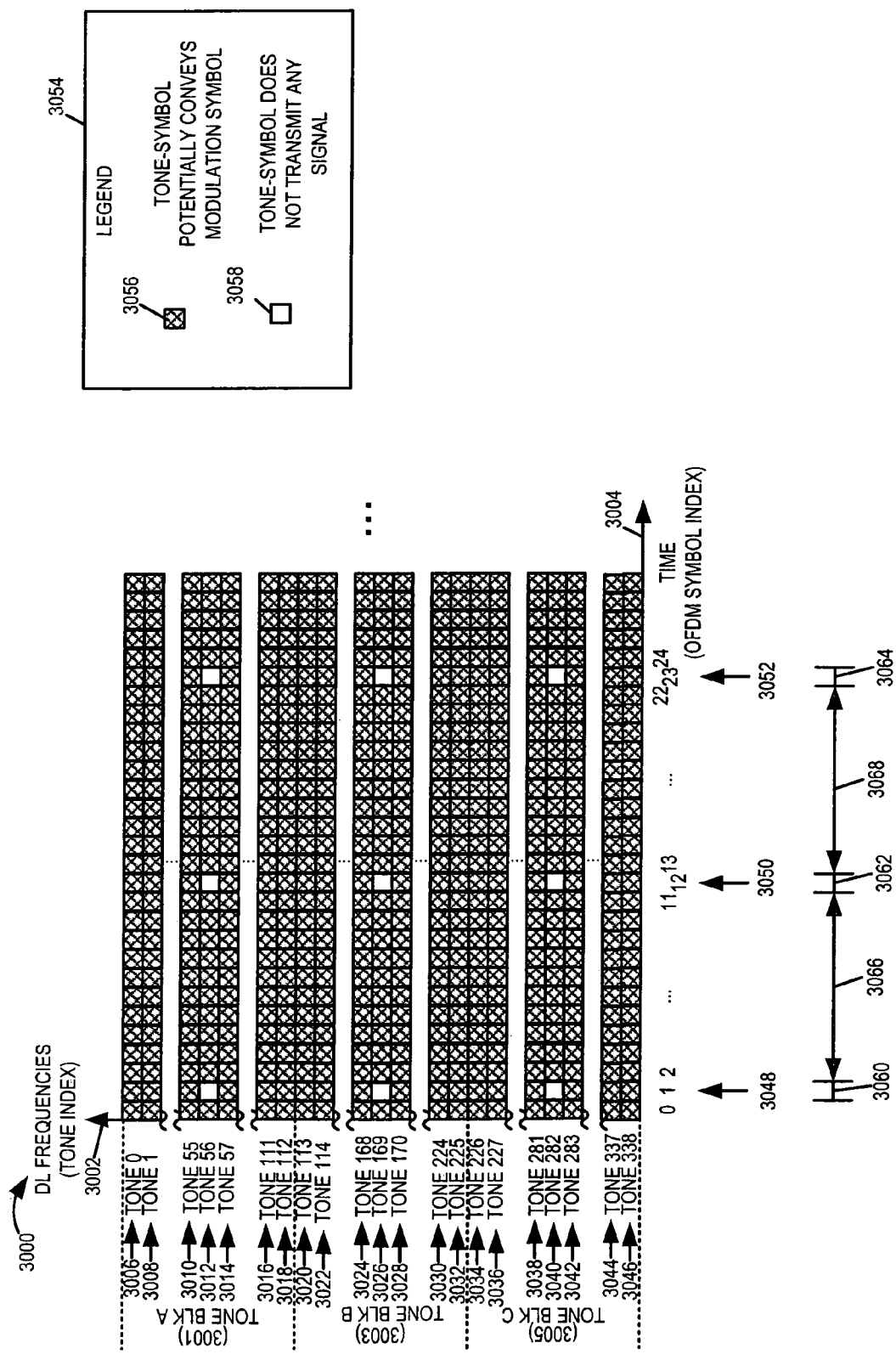
FIG. 30 is a drawing illustrating an exemplary OFDM downlink time frequency grid which illustrates an example of the suspension of base station sector transmitter signaling on the downlink tones corresponding to DC tones in wireless terminal receivers recovering a tone block in accordance with the present invention.

FIG. 30 is a drawing illustrating an exemplary OFDM downlink time frequency grid 3000 which illustrates an example of the suspension of base station sector transmitter signaling on the downlink tones corresponding to DC tones in wireless terminal receivers recovering a tone block in accordance with the present invention. Grid 3000 is a plot of downlink frequencies (tone index) on vertical axis 3002 vs time (OFDM symbol index) on horizontal axis 3004. A basic unit of the grid 3000 is an OFDM tone-symbol shown as a square and representing one tone for the duration of one OFDM symbol transmission time interval. Legend 3054 is used to indicate the status of tone-symbols in grid 3000. A tone-symbol of type 3056 shown as a square with cross hatch shading indicates that the tone-symbol potentially conveys a modulation symbol. A tone symbol of type 3058 shown as a square with no shading indicates that the tone-symbol does not transmit any signal, in accordance with a feature of the present invention. Vertical axis 3002 illustrates that the downlink including 339 tones (tone 0 3006, tone 1 3008, . . . , tone 55 3010, tone 56 3012, tone 57 3014, . . . , tone 111 3016, tone 112 3018, tone 113 3020, tone 114 3022, . . . tone 168 3024, tone 169 3026, . . . tone 170 3028, . . . , tone 224 3030, tone 225 3032, tone 226 3034, tone 227 3036, . . . , tone 281 3038, tone 282 3040, tone 283 3042, . . . , tone 337 3044, tone 338 3046) is divided into three tone blocks (tone block A 3001, tone block B 3003, and tone block C 3005). Each tone block (3001, 3003, 3005) includes 113 contiguous tones. In this exemplary embodiment the downlink DC tone from the perspective of the base station sector transmitter is tone 169 3026, the center tone. However, from the perspective of a wireless terminal which may be tuned to receive a single tone block, the tone corresponding to the WT's downlink DC tone may be tone 56 3012, tone 169 3026, or tone 282 3040, depending upon the tuning of the WT receiver at a particular time.

In this exemplary embodiment, during OFDM time interval 1 3048, OFDM time interval 12 3050, and OFDM time interval 23 3052, the tone-symbol associated with tone 56 3012, tone 169 3026, and tone 282 3040 does convey a transmit signal from the base station sector transmitter. Horizontal axis 3004 illustrates exemplary successive OFDM symbol transmission time intervals. In grid 3000, each of the tone symbols corresponding to (tone 0 3006 through tone 55 3010) and (tone 57 3014 through tone 168 3024) and (tone 170 3028 through 281 3038) and (tone 283 3042 through tone 338 3046) can potentially convey a modulation symbol. However, tones 56 3012, tone 169 3026, and tone 282 3040 receive special treatment in accordance with the present invention. During most of the time tone 56 3012, tone 169 3026, and tone 282 3040 can potentially convey a modulation symbol; however, occasionally, tone 56 3012, tone 169 3026, and tone 282 3040 do not transmit any signal as illustrated in OFDM time intervals 1 3048, 12 3050, and 23 3052. From a WT's DC tone perspective, intervals 3048, 3050, and 3052 can be considered DC noise measurement intervals (3060, 3062, 3064), while intervals (3066, 3068) corresponding to OFDM symbol transmission time intervals (2-11, 13-22) can be considered a data period. Ten modulation symbols can be recovered by a wireless terminal on the downlink DC tone corresponding to data period 3062, one recovered modulation symbol corresponding to each OFDM symbol index (2 . . . 11) time interval. The data period, e.g., interval 3066, of the example of FIG. 30 is 10 times longer than the DC tone noise measurement period, e.g., interval 3060.

Figure 31:
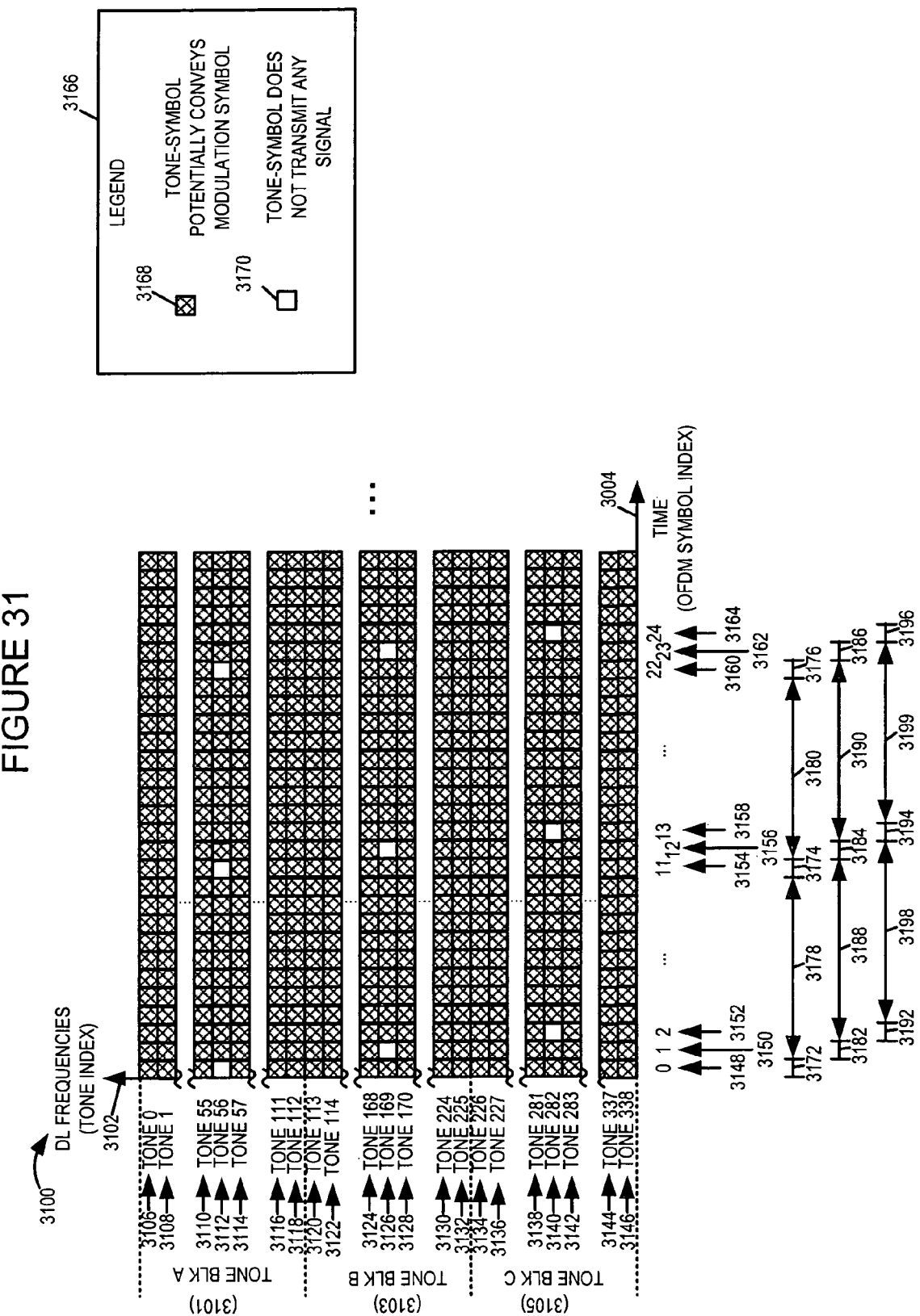
FIG. 31 is a drawing illustrating an exemplary OFDM downlink time frequency grid which illustrates another example of the suspension of base station sector transmitter signaling on the downlink tones corresponding to DC tones in wireless terminal receivers recovering a tone block in accordance with the present invention.

FIG. 31 is a drawing illustrating an exemplary OFDM downlink time frequency grid 3100 which illustrates an example of the suspension of base station sector transmitter signaling on the downlink tones corresponding to DC tones in wireless terminal receivers recovering a tone block in accordance with the present invention. Grid 3100 is a plot of downlink frequencies (tone index) on vertical axis 3102 vs time (OFDM symbol index) on horizontal axis 3104. A basic unit of the grid 3100 is an OFDM tone-symbol shown as a square and representing one tone for the duration of one OFDM symbol transmission time interval. Legend 3166 is used to indicate the status of tone-symbols in grid 3100. A tone-symbol of type 3168 shown as a square with cross hatch shading indicates that the tone-symbol potentially conveys a modulation symbol. A tone symbol of type 3170 shown as a square with no shading indicates that the tone-symbol does not transmit any signal, in accordance with a feature of the present invention. Vertical axis 3102 illustrates that the downlink including 339 tones (tone 0 3106, tone 1 3108, . . . , tone 55 3110, tone 56 3112, tone 57 3114, . . . , tone 111 3116, tone 112 3118, tone 113 3120, tone 114 3122, . . . tone 168 3124, tone 169 3126, . . . tone 170 3128, . . . , tone 224 3130, tone 225 3132, tone 226 3134, tone 227 3136, . . . , tone 281 3138, tone 282 3140, tone 283 3142, . . . , tone 337 3144, tone 338 3146) is divided into three tone blocks (tone block A 3101, tone block B 3103, and tone block C 3105). Each tone block (3101, 3103, 3105) includes 113 contiguous tones. In this exemplary embodiment the downlink DC tone from the perspective of the base station sector transmitter is tone 169 3126, the center tone. However, from the perspective of a wireless terminal which may be tuned to receive a single tone block, the tone corresponding to the WT's downlink DC tone may be tone 56 3112, tone 169 3126, or tone 282 3140, depending upon the tuning of the WT receiver at a particular time.

In this exemplary embodiment, during OFDM time interval 1 3148, OFDM time interval 12 3150, and OFDM time interval 23 3152, the tone-symbol associated with tone 56 3112, tone 169 3126, and tone 282 3140 does convey a transmit signal from the base station sector transmitter. Horizontal axis 3104 illustrates exemplary successive OFDM symbol transmission time intervals. In grid 3100, each of the tone symbols corresponding to (tone 0 3106 through tone 55 3110) and (tone 57 3114 through tone 168 3124) and (tone 170 3128 through 281 3138) and (tone 283 3142 through tone 338 3146) can potentially convey a modulation symbol. However, tones 56 3112, tone 169 3126, and tone 282 3140 receive special treatment in accordance with the present invention. During most of the time tone 56 3112, tone 169 3126, and tone 282 3140 can potentially convey a modulation symbol; however, occasionally, tone 56 3112, tone 169 3126, and tone 282 3140 do not transmit any signal as illustrated in: OFDM time intervals (0 3148, 11 3154, 11 3160) for tone 56 3112, OFDM time intervals (1 3150, 12 3156, 23 3162) for tone 169 3126, and OFDM time intervals (2 3152, 13 3158, 24 3164) for tone 282. In this exemplary embodiment each tone block has different time intervals associated with the suspension of transmitted signal on a tone corresponding to a DC tone in the WT receiving the tone block. With regard to tone block A 3101 time intervals 3172, 3174, and 3176 are associated with the null on tone 56 to accommodate DC tone noise measurement, while intervals 3178 and 3180 are associated with data on tone 56. With regard to tone block B 3103 time intervals 3182, 3184, and 3186 are associated with the null on tone 169 to accommodate DC tone noise measurement, while intervals 3188 and 3190 are associated with data on tone 169. With regard to tone block C 3105 time intervals 3192, 3194, and 3196 are associated with the null on tone 169 to accommodate DC tone noise measurement, while intervals 3198 and 3199 are associated with data on tone 169.

Figure 32:
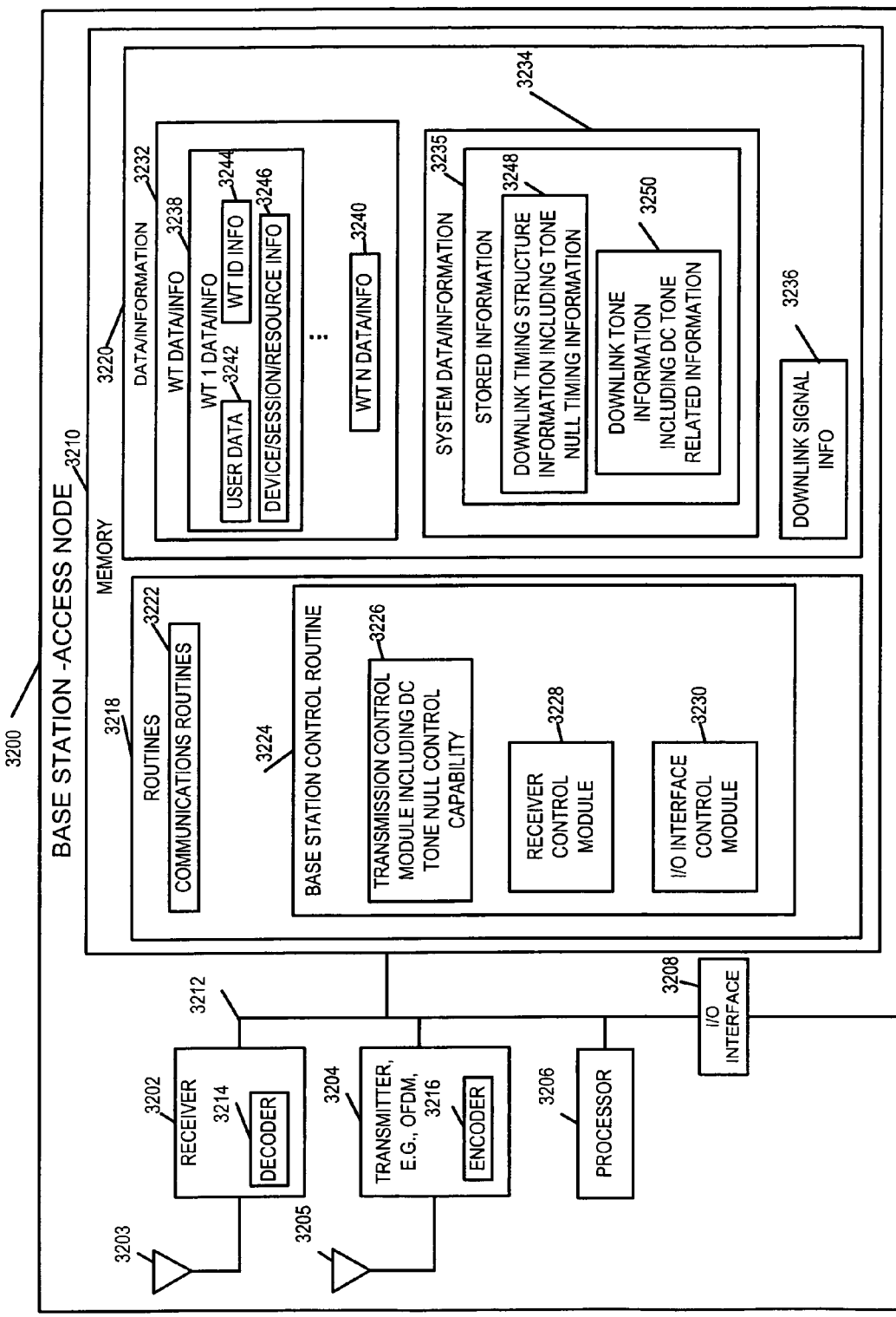
FIG. 32 is a drawing of an exemplary base station implemented in accordance with the present invention and using methods of the present invention.

FIG. 32 is a drawing of an exemplary base station 3200 implemented in accordance with the present invention and using methods of the present invention. Exemplary base station 3200 is a base station in a frequency division multiplexing system, e.g., an OFDM system, where signals are transmitted in the passband by a base station and are received and processed by a wireless terminal to convert the passband signal to a baseband signal, a DC tone existing in the baseband and a corresponding tone existing in the passband, the passband including additional tones in addition to the corresponding tone.

Exemplary base station 3200 includes a receiver 3202, a transmitter 3204, a processor 3206, an I/O interface 3208 and a memory 3210 coupled together via a bus 3212 over which the various elements can exchange data and information. Receiver 3202 is coupled to receive antenna 3203, via which the base station 3200 can receive uplink signals, e.g., from a plurality of wireless terminals. Receiver 3202 includes a decoder 3214 for decoding received uplink signals.

Transmitter 3204 is coupled to a transmit antenna 3205 through which the base station 3200 transmits downlink signals, e.g., to a plurality of wireless terminals using the base station as their point of network attachment. Transmitter 3204 transmits signals on the corresponding tone and the additional tones. Transmitter 3204, e.g., an OFDM transmitter, includes an encoder 3216 for encoding data/information prior to transmission, e.g., block encoding information bits to be communicated in a downlink traffic channel segment. Memory 3210 includes routines 3218 and data/information 3220. The processor 3206, e.g., a CPU, executes the routines 3218 and uses the data/information 3220 in memory 3210 to control the operation of the base station 3200 and implement the methods of the present invention. I/O interface 3208 couples the base station 3200 to other network node, e.g., other base stations, AAA nodes, routers, home agent nodes, etc. and/or the Internet.

Routines 3218 include communications routines 3222 and base station control routine 3224. The communications routine 3322 performs various communications operations and implements various communications protocols used by the base station. Base station control routine 3224 includes a transmission control module with DC tone null control capability 3226, a receiver control module 3228 and an I/O interface control module 3230. The transmission control module 3226 controls the base station transmitter 3204 to transmit signals into the passband using the additional tones without transmitting on the corresponding tone during a first period of time and controls the transmitter 3204 to simultaneously transmit during a second period of time in said passband using both the additional tones and the corresponding tone. In various embodiments, the first and second periods of time have a fixed timing relationship to one another and recur on a repeating basis. The receiver control module 3228 controls operations of receiver 3202, while I/O interface control module 3230 controls operations of I/O interface 3208.

Data/information 3220 includes wireless terminal data/information 3232, system data/information 3234, and downlink signal information 3236. WT data/information 3232 includes a plurality of sets of WT information (WT 1 data/information 3238, WT N data/information 3240) corresponding to WTs, e.g., corresponding to WTs that a currently using BS 3200 as their point of network attachment. WT 1 data information 3238 includes user data 3242, WT identification information 3244, and device/session/resource information 3246. User data 3242 includes, e.g., data/information representing voice, audio, video, text, files, etc. corresponding to data being communicated between WT 1 and another WT in a communications session with WT 1. WT ID information 3244 includes, e.g., a base station assigned identifier or identifiers, e.g., an active user identifier. Device/session/resource information 3246 includes, e.g., information associate with WT1, information associated with a peer node in a communications session with WT1 such as an address, session information, routing information, air link resource information such as uplink and/or downlink traffic channel segments assigned to WT1.

System data/information 3234 includes stored information 3235. The stored information 3235 includes downlink timing structure information including tone null timing information 3248 and downlink tone information including DC tone related information 3250. The downlink timing structure information 3248 indicates the relationship of the first and second periods of time, e.g., times during which the a null occurs on the corresponding tone in the passband, the corresponding tone corresponding to the DC tone in the baseband, and the second period of time wherein the corresponding tone is not controlled to be nulled. Timing structure information 3248 identifies, in some embodiments, a fixed timing relationship between first and second timing periods with respect to one another, and information identifying the recurrences of such time periods in a downlink timing structure which repeats. In various embodiments, the first and second periods of time repeat on a predetermined basis, and the second period of time is at least ten times longer than the first period of time. It is important that the ratio, spacing, and/or duration of first and second time periods be carefully selected. Improved throughput can be achieved by minimizing average first time period time, an overhead period with respect to the corresponding tone being intentionally nulled to allow for WT calibration measurements, and maximizing the average second time period time, a modulation symbol payload signaling interval with respect to the corresponding tone. However, it should be noted that first and second time interval time timing information is selected, e.g., in establishing a downlink timing structure, such as to be expected to achieve usable results on the corresponding tone when not being nulled, e.g., taking into account the benefit achieved by the WT measurements and adjustments to the corresponding tone. Downlink tone information 3250 identifies the corresponding tone in the passband. In some embodiments, the corresponding tone is a center tone in a downlink tone block including the additional tones and the corresponding tones. In various embodiments, the transmitter 3204 transmits at least 100 additional tones in parallel with the corresponding tone during the second period of time. For example, in some systems, an exemplary downlink OFDM tone block in a passband comprises 113 tones which are identified in downlink tone information 3250.

Data/information 3220 also includes downlink signal information 3236, e.g., information relating to baseband downlink signals and information relating to passband downlink signals. Downlink signal information 3236, in some embodiments, includes intermediate information being used and/or generated by transmitter 3204 pertaining to generated and/or transmitted downlink signals.

Figure 33:
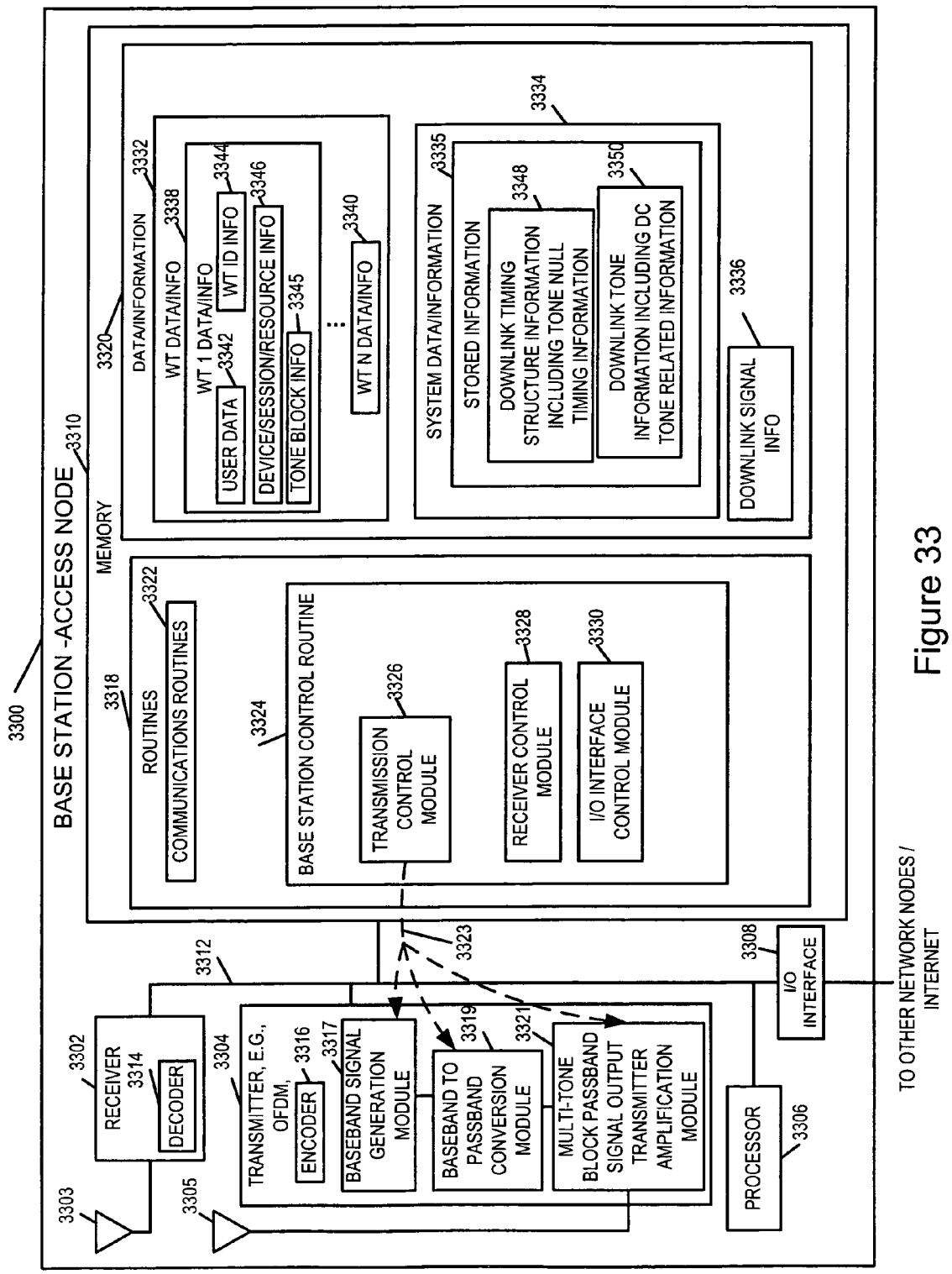
FIG. 33 is a drawing of an exemplary base station implemented in accordance with the present invention and using methods of the present invention.

FIG. 33 is a drawing of an exemplary base station 3300 implemented in accordance with the present invention and using methods of the present invention. Exemplary base station 3300 is a base station in an orthogonal frequency division multiplexing system (OFDM) system wherein OFDM symbols including a plurality of tones are transmitted in the passband by a base station, each OFDM symbol being transmitted as a passband signal, said passband signal including multiple tone blocks.

Exemplary base station 3300 includes a receiver 3202, a transmitter 3304, a processor 3306, an I/O interface 3308 and a memory 3310 coupled together via a bus 3312 over which the various elements can exchange data and information. Receiver 3302 is coupled to receive antenna 3303, via which the base station 3300 can receive uplink signals, e.g., from a plurality of wireless terminals. Receiver 3302 includes a decoder 3314 for decoding received uplink signals.

Transmitter 3304 is coupled to a transmit antenna 3305 through which the base station 3300 transmits downlink signals, e.g., to a plurality of wireless terminals using the base station as their point of network attachment. Transmitter 3304, e.g., an OFDM transmitter, includes an encoder 3216 for encoding data/information prior to transmission, e.g., block encoding information bits to be communicated in a downlink traffic channel segment. Transmitter 3304 also include a baseband signal generation module 3317, a baseband to passband conversion module 3319 and a multi-tone block passband signal output transmitter module 3321. The baseband signal generation module 3317 generates baseband signals, e.g., a baseband OFDM symbol for each OFDM symbol transmission time period. Baseband to passband conversion module 3319 converts a baseband OFDM symbol, output from baseband signal generation module 3317, into a multi-tone block passband signal. For example, the baseband to passband conversion module 3319 operations include modulation with a downlink carrier frequency. The multi-tone block passband signal output transmitter amplification module 3321, e.g., a power amplification stage, which is coupled to the conversion module 3319, amplifies the multi-tone block passband signal, and the amplified signal is transmitted via antenna 3305.

Memory 3310 includes routines 3318 and data/information 3320. The processor 3306, e.g., a CPU, executes the routines 3218 and uses the data/information 3320 in memory 3310 to control the operation of the base station 3300 and implement the methods of the present invention. I/O interface 3308 couples the base station 3300 to other network node, e.g., other base stations, AAA nodes, routers, home agent nodes, etc. and/or the Internet.

Routines 3318 include communications routines 3322 and base station control routine 3324. The communications routine 3322 performs various communications operations and implements various communications protocols used by the base station. Base station control routine 3324 includes a transmission control module 3326, a receiver control module 3328 and an I/O interface control module 3330. The transmission control module 3326 controls at least one of the baseband signal generation module 3317, the baseband to passband conversion module 3319, and the multi-tone block passband signal output transmitter amplification module 3321 to introduce a first null on a corresponding tone in a first tone block of the multi-tone block passband signal for a first predetermined interval including at least one OFDM symbol transmission time period which repeats within a predetermined downlink transmission timing structure and the corresponding tone corresponds to a baseband DC tone in the baseband OFDM symbol. In some embodiments, each first predetermined interval within the downlink timing structure may be one or a few, e.g., two, three, or four, successive OFDM symbol transmission time periods in duration. In some embodiments, the first tone block is a center tone block in the multi-tone block passband signal.

Consider that transmitter 3304 is a three tone block OFDM transmitter. In some such embodiments, transmission control module 3326 controls at least one of the baseband signal generation module 3317, the baseband to passband conversion module 3319, and the multi-tone block passband signal output transmitter module to introduce a second null on a second tone in a second tone block of the multi-tone block passband signal for a second predetermined interval including at least one OFDM symbol transmission time period, which repeats within the predetermined downlink transmission timing structure, where the second tone is a center tone in the second tone block. In addition, the transmission control module 3326 controls at least one of the baseband signal generation module 3317, the baseband to passband conversion module 3319, and the multi-tone block passband signal output transmitter module to introduce a third null on a third tone in a third tone block of the multi-tone block passband signal for a predetermined third interval including at least one OFDM symbol transmission time period, which repeats within the predetermined downlink transmission timing structure, where the third tone is a center tone in the third tone block. The receiver control module 3328 controls operations of receiver 3302, while I/O interface control module 3330 controls operations of I/O interface 3308.

Dashed lines 3323 indicates that the transmission control module 3326 controls at least one of baseband signal generation module 3317, baseband to passband conversion module 3319 and multi-tone block passband signal output transmitter amplifications module to perform tone nulling, in accordance with the present invention. For example, in some embodiments, a modulation symbol value may be set to zero in a baseband signal. In another embodiment, a tone to be nulled may be controlled to be zero as part of the passband signal generation operations. As another example, the passband signal may be filtered to null the desired tone. As still another example, the power associated with the desired tone to be nulled may be controlled to be zeroed in the power amplifer. In some embodiments, various functions implemented in the receiver 3304 and/or base station control routine 3324 are implemented in different locations or are implemented in a distributed manner.

Data/information 3320 includes wireless terminal data/information 3332, system data/information 3334, and downlink signal information 3336. WT data/information 3332 includes a plurality of sets of WT information (WT 1 data/information 3338, WT N data/information 3340) corresponding to WTs, e.g., corresponding to WTs that a currently using BS 3300 as their point of network attachment. WT 1 data information 3338 includes user data 3342, WT identification information 3344, device/session/resource information 3246, and tone block information 3345. User data 3342 includes, e.g., data/information representing voice, audio, video, text, files, etc. corresponding to data being communicated between WT 1 and another WT in a communications session with WT 1. WT ID information 3344 includes, e.g., a base station assigned identifier or identifiers, e.g., an active user identifier. Device/session/resource information 3346 includes, e.g., information associated with WT1, information associated with a peer node in a communications session with WT1 such as an address, session information, routing information, and/or air link resource information such as uplink and/or downlink traffic channel segments assigned to WT1. Tone block information 3345 identifies the downlink tone block, e.g., from a plurality of tone blocks, e.g., three, being used simultaneously by BS 3300, that is currently associated with WT1 downlink signaling.

System data/information 3334 includes stored information 3335. The stored information 3335 includes downlink timing structure information 3348 including tone null timing information and downlink tone information 3250 including DC tone related information.

The downlink timing structure information 3348 indicates the time intervals during which a non-zero signal is allowed to be transmitted on the corresponding tone and time intervals associated with tone nulling of corresponding tone. In some embodiments, there are at least 10 times as many OFDM symbol transmission time periods in the downlink timing structure in which a non-zero signal is allowed to be transmitted on the corresponding tone than there are OFDM symbol transmission time periods in which the corresponding tone is intentionally nulled in accordance with the downlink timing structure. The downlink timing structure information 3348 also indicates the time intervals during which a non-zero signal is allowed to be transmitted on the second tone and time intervals associated with tone nulling of the second tone. In some embodiments, there are at least 10 times as many OFDM symbol transmission time periods in the downlink timing structure in which a non-zero signal is transmitted on the second tone than there are second time interval OFDM symbol transmission time periods in which the second tone is intentionally nulled in accordance with the downlink timing structure. The downlink timing structure information 3348 also indicates the time intervals during which a non-zero signal is allowed to be transmitted on the third tone and time intervals associated with tone nulling of the third tone. In some embodiments, there are at least 10 times as many OFDM symbol transmission time periods in the downlink timing structure in which a non-zero signal is allowed to be transmitted on the third tone than there are OFDM symbol transmission time periods in which the third tone is intentionally nulled in accordance with the downlink timing structure. In some embodiments, the time intervals during which the corresponding tone, second tone and third tone are intentionally nulled in accordance with downlink timing structure are the same. In some embodiments, the time intervals during which the corresponding tone, second tone and third tone are intentionally nulled in accordance with downlink timing structure are different.

Downlink tone information 3350 identifies the corresponding tone, the first tone and the second tone in the passband. In some embodiments, the corresponding tone is a center tone in a downlink tone block including the additional tones and the corresponding tones. In some embodiments, the second and third tones are center tones in their respective tone blocks. In various embodiments, each tone block includes at least 100 tones. For example, in one exemplary 3 tone-block embodiment, wherein the three tone blocks are contiguous in the passband, each tone block includes 113 tones for a composite passband of 339 tones. Information identifying tones of each tone block is included in information 3350.

Data/information 3320 also includes downlink signal information 3336, e.g., information relating to baseband downlink signals and information relating to passband downlink signals. Downlink signal information 3336, in some embodiments, includes intermediate information being used and/or generated by transmitter 3304 pertaining to generated and/or transmitted downlink signals.

Figure 34:
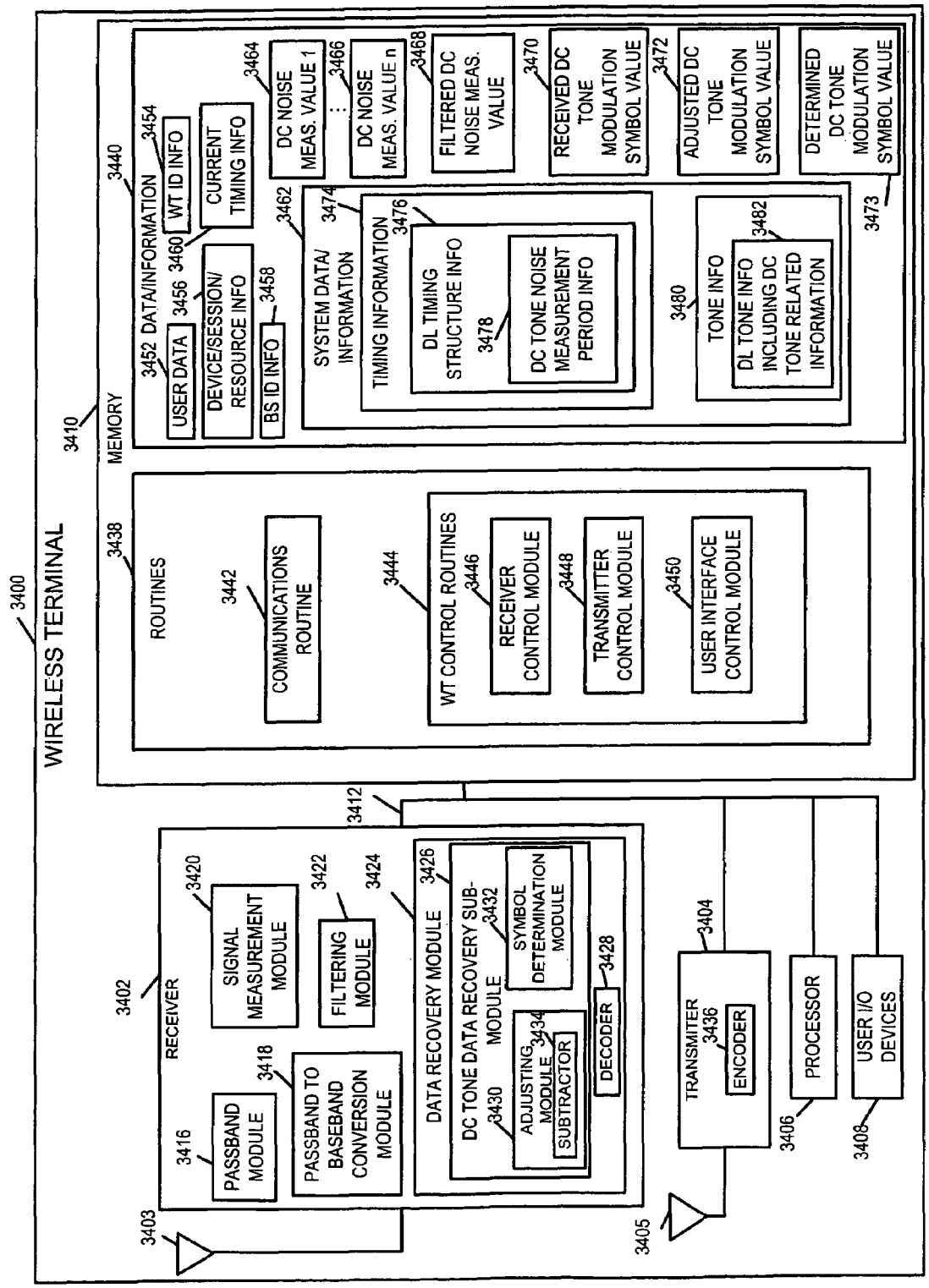
FIG. 34 is a drawing of an exemplary wireless terminal, e.g., mobile node, implemented in accordance with the present invention and using methods of the present invention.

FIG. 34 is a drawing of an exemplary wireless terminal 3400, e.g., mobile node, implemented in accordance with the present invention and using methods of the present invention. Exemplary wireless terminal 3400 is for use in a frequency division multiplexed system, e.g., an OFDM wireless communications system, where signals are transmitted in a passband by a base station. Exemplary wireless terminal 3400 includes a receiver 3402, a transmitter 3404, a processor 3406, user I/O devices 3408, and memory 3410 coupled together via bus 3412 over which the various elements may interchange data and information.

Receiver 3402 includes a passband module 3416, a passband to baseband conversion module 3418, a signal measurement module 3420, a filtering module 3422, and a data recovery module 3424. Data recovery module 3424 includes a DC tone data recovery sub-module 3426 and a decoder 3428. DC tone data recovery sub-module 3426 includes an adjusting module 3430 and a symbol determination module 3432. The adjusting module 3430 includes a subtractor 3434.

Receiver 3402 is coupled to receive antenna 3403 via which the wireless terminal 3400 receives downlink signals from a base station, e.g., BS 3200 of FIG. 32 or BS 3300 of FIG. 33. Receiver 3402 receives downlink passband signals using passband module 3416, e.g., an RF module tuned to a carrier frequency corresponding to a passband tone block being used by the base station transmitter. Passband to baseband signal conversion module converts the received passband signals to baseband signals. A DC tone exists in the baseband signals, the DC tone corresponds to a corresponding tone in the passband signals, the baseband signals include additional baseband tones corresponding to additional passband tones. The signal measurement module 3420 performs a signal measurement on the DC tone during a DC tone noise measurement period to generate a DC tone noise measurement value, e.g., value DC noise measurement value 1 3464. The data recovery module 3424 recovers data from the received passband signals. During the DC noise measurement period, the data recovery module 3424 recovers data from the additional baseband tones. Filter module 3422 filters a plurality of DC noise measurement values corresponding to different noise measurement periods to generate a noise measurement value, e.g., filter module 3422 filters DC noise measurement value 1, . . . , DC noise measurement value n 3466 to generate filtered DC noise measurement value 3468. In some embodiments, filter module 3422 is a weighted averaging filter and the filtered DC noise measurement value is a weighted average DC noise measurement value.

DC tone data recovery sub-module 3426 recovers data transmitted on the DC tone, corresponding to a data period during which the receiver has received data simultaneously on the DC tone and the additional baseband tone in accordance with the downlink timing structure. Adjusting module 3430 adjusts, during the data period, a symbol value received on DC tone as a function of the filtered DC noise measurement value, e.g., processing received DC tone modulation symbol value to obtain adjusted DC tone modulation symbol value 3472. The adjusting module 3430 includes subtractor 3434 which subtracts the filtered DC tone noise measurement value 3470 from the received symbol value on DC tone, e.g., received DC tone modulation symbol value 3470.

Decoder 3428 performs decoding operations of received downlink signals. For example, for a downlink traffic channel segment, coded bits corresponding to recovered modulation symbol values are decoded to recover the data/information bits which had been encoded by the base station. At some times, in accordance with the downlink timing structure some of the recovered modulation symbol values correspond to the DC tone.

Transmitter 3404 includes an encoder 3436 for encoding data/information to be communicated via uplink signals to a base station. Transmitter 3404 is coupled to transmit antenna 3405 via which uplink signals are transmitted. In some embodiments, the same antenna is used for both the transmitter 3404 and receiver 3402.

Memory 3410 includes routines 3438 and data/information 3440. The processor 3406, e.g., a CPU, executes the routines 3438 and uses the data/information 3440 in memory 3410 to control the operation of the wireless terminal 3400 and implement the methods of the present invention. User I/O devices 3408, e.g., microphone, speaker, display, keypad, keyboard, touch-screen, switches, camera, etc., allow the user of WT 3400 to input data/information, output data/information, select operational modes and perform functions, e.g., initiate a communications session.

Routines 3438 include a communications routine 3442 and wireless terminal control routines 3444. The communications routine 3442 performs various communications operations and implements the various communications protocols used by the wireless terminal 3400. WT control routines 3444 include a receiver control module 3446, a transmitter control module 3448, and a user interface control module 3450. The receiver control module 3444 controls the operations of receiver 3402. The transmitter control module 3448 controls the operation of transmitter 3404. User interface control module 3450 controls the operation of user I/O devices 3408.

Data/information 3440 includes user data 3452, wireless terminal identification information 3454, device/session/resource information 3456, base station identification information 3458, current timing information 3460, and system data/information 3462. User data 3452 includes, e.g., data/information representing voice, audio, video, text, files, etc., pertaining to a communications session between WT 3400 and a peer node. Wireless terminal identification information 3454 includes, e.g., base station assigned wireless terminal identifiers such as an active user identifier. Device/session/resource information 3456 includes device information pertaining to WT 3400, information pertaining to a peer node in a communications session with WT 3400, address information, routing information and/or air link resource information such as downlink and/or uplink traffic channel segment assignments pertaining to WT 3400. Base station identification information 3458 includes information identifying the base station being used as the point of network attachment in the communications system, e.g., a base station identifier, a sector identifier, and/or a tone block identifier.

Data/information 3440 also includes system data/information 3462. System data/information 3462 includes timing information 3474 and tone information 3480. Timing information 3474 includes uplink and downlink timing structure information, while tone information 3480 includes uplink and downlink tone information. In some embodiments, system data/information 3462 includes multiple sets of timing information 3474 and/or tone information 3480, e.g., corresponding to different base stations and/or different alternative points of network attachment at the same base station, e.g., as a function of cell, sector and/or tone block. The timing information 3474 includes downlink timing structure information 3476 which includes DC tone noise measurement period information 3478. The DC noise measurement period information 3476 identifies intervals in the downlink timing structure being used where the WT is to perform a measurement of the DC tone to obtain a DC noise measurement value. In some embodiments, the corresponding tone does not carry any transmitted power during the noise measurement period as the base station is controlled to not transmit on the corresponding tone during the DC tone noise measurement period. The downlink timing structure information 3476 also includes information identifying data periods in which the corresponding tone is allowed to carry data, e.g., via modulation symbols at non-zero power levels. In some embodiments, the data period is at least 10 times longer than the DC noise measurement period, with at least 10 modulation symbols being recovered during the data period on the DC tone.

The tone information 3480 includes downlink tone information 3484 including DC tone related information. Downlink tone information 3484 includes information identifying, tones in the passband tone block, tones in the baseband tone block, the DC tone in the baseband, the corresponding tone in the passband, additional baseband tones, and additional passband tones. In some embodiments, therens at least 100 additional baseband tones in addition to the DC tone. For example, one exemplary downlink baseband OFDM tone block comprises 113 contiguous tones, where the center tone is the DC tone and the other 112 tones are additional baseband tones; a corresponding exemplary passband OFDM tone block comprises 113 contiguous tones, where the center tone is the corresponding tone and the other 112 tones are additional passband tones, and the passband is associated with an uplink tone block carrier frequency to which the receiver 3402 is tuned.

Data/information 3440 also includes DC noise measurement values (DC noise measurement value 1 3462, . . . , DC noise measurement value n 3466, a filtered DC noise measurement value 3468, received DC tone modulation symbol value 3470, adjusted DC tone modulation symbol value 3472, and determined DC tone modulation symbol value 3473.

Figure 35:
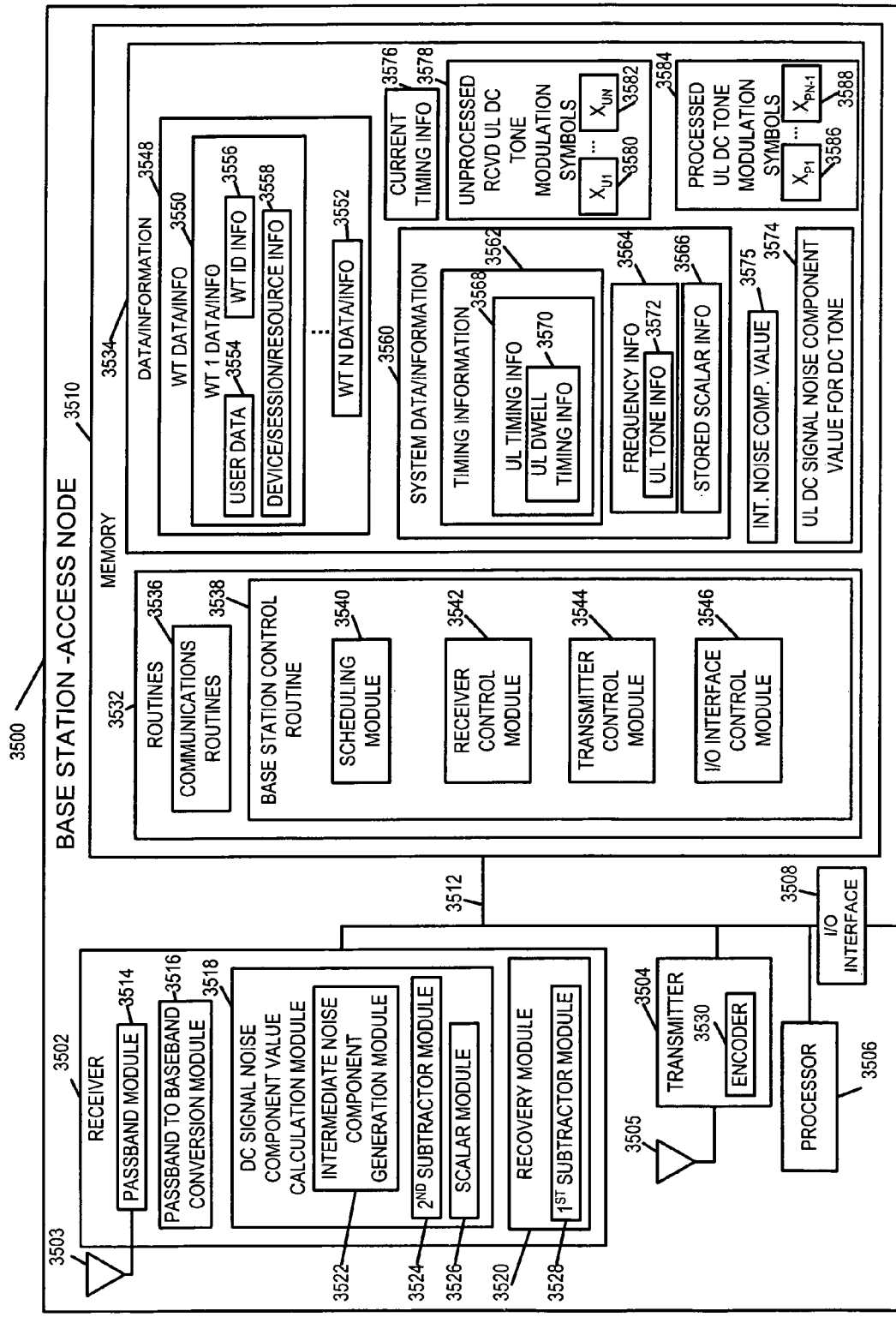
FIG. 35 is a drawing of an exemplary base station implemented in accordance with the present invention and using methods of the present invention.

FIG. 35 is a drawing of an exemplary base station 3500 implemented in accordance with the present invention and using methods of the present invention. Exemplary base station 3500 is, e.g., an OFDM base station operating in a spread spectrum multiple access wireless communications system. Exemplary base station 3500 includes a receiver 3502, a transmitter 3504, a processor 3506, an I/O interface 3508, and a memory 3510 coupled together via a bus 3512 over which the various elements can interchange data and information.

Receiver 3502 is coupled to a receive antenna 3503 via which the base station can receive uplink signals from wireless terminals. Reception operations of receiver 3502 includes receiving a sequence of N modulation symbol values on a corresponding passband tone which corresponds to the a baseband DC tone, one of the N modulation symbol values being received during each one of N symbol transmission time periods, where N is a positive integer greater than one. The received symbol values are represented by modulation symbols $X_{U1}$ 3580, . . . , $X_{UN}$ 3582. In some embodiments N=7. Receiver 3502 includes a passband module 3514, a passband to baseband module 3516, a DC signal noise component value calculation module 3518, and a recovery module 3520. DC signal component value calculation module 3518 includes a $2^{nd}$ subtractor module 3524 and a scalar module 3526. Recovery module 3520 includes a $1^{st}$ subtractor module 3528.

The passband module 3514, e.g., an RF module, is coupled to the receive antenna 3503, and receives passband signals, a received passband signal corresponding to an OFDM symbol transmission time period may be a composite from uplink signals transmitted from a plurality of wireless terminals which have been timing synchronized with respect to signal arrival at the base station, e.g., to within an OFDM symbol cyclic prefix. At different times, e.g., for different dwell different wireless terminals may be using a different subset of uplink tones from the uplink tone block in accordance with base station assignments, the uplink timing/frequency structure and/or the uplink tone hopping sequence. The corresponding tone in the passband corresponding to the uplink baseband DC tone in the tone block is, e.g., the center tone in the passband tone block. The wireless terminal associated with the corresponding tone may change from dwell to dwell. Passband to baseband conversion module 3516 converts the received passband signals to baseband signals.

DC signal noise component value calculation module 3518 includes an intermediate noise component generation module 3522, a $2^{nd}$ subtractor module 3524 and a scalar module 3526. DC signal noise component value calculation module 3518 calculates a DC signal noise component value 3574 from the set of N received symbol values ($X_{U1}$ 3580, . . . , $X_{UN}$ 3582). A predetermined one of the received N−1 symbol values communicates a DC noise value, the predetermined one of the received N symbol values occurs in a predetermined location in the sequence of N values, the remaining N−1 received symbol values communicating information values. For example, in some embodiments using a sequential set of 7 received modulation symbol values, the last value is the predetermined location for the DC noise value, while the first six locations are for communicating information values.

Intermediate noise component generation module 3522 generates an intermediate noise component value 3575 from the N−1 received symbol values corresponding to information values and a predetermined function. In some embodiments, the predetermined function used to generate the intermediate noise value 3575 is the negative of the weighted sum of the N−1 received values associated with information. The function is in some embodiments, coded in module 3522; in other embodiments, information representing the function is stored in memory and used by module 3522.

Second subtractor module 3524 subtracts the intermediate noise component value 3575 from the predetermined one of the N received symbol values (3580, . . . , 3582) which communicates the DC noise value. Scalar module 3526 scales the result of the subtraction of module 3524 to produce the calculated DC signal noise component value 3574. In some embodiments, the scalar module 3526 scales the result of the subtraction by dividing the result of the subtraction by a predetermined fixed value, e.g., N, which may be included in stored scalar information 3566.

Recovery module 3520 recovers N−1 individual modulation symbol values ($XP_1, \ldots XP_{N-1}$) from the N received modulation symbol values ($X_{U1}$ 3580, ..., $X_{UN}$ 3582), for each set to be processed. The recovery module 3520 includes a first subtractor module 3528 which generates the N−1 individual symbol values ($X_{P1}$ 3586, ..., $X_{PN}$-1 3588) by subtracting the DC signal noise component value 3574 from each of N−1 of the N received symbol values (3580, 3582).

Transmitter 3504 is coupled to a transmit antenna 3505 via which the base station 3500 can transmit downlink signals to wireless terminals. Transmitter 3504 includes an encoder 3530 for encoding data/information in downlink signals, e.g., performing block encoding of a downlink traffic channel segment.

I/O interface 3508 couples the base station 3500 to other network nodes, e.g., other base stations, routers, AAA nodes, home agent nodes, etc, and/or the Internet. Memory 3510 includes routines 3532 and data/information 3534. The processor 3506, e.g., a CPU, executes the routines 3532 and uses the data/information 3534 in memory 3510 to control the operation of the base station and implement methods of the present invention.

Routines 3532 include communications routines 3536 and a base station control routine 3538. The communications routines 3536 performs various communications functions and implements various communications protocols used by the base station. Base station control routine 3538 includes a scheduling module 3540, a receiver control module 3542, a transmitter control module 3544, and an I/O interface control module 3546. The scheduling module 3540, e.g., a scheduler, schedules uplink and downlink segments to wireless terminals using the base station 3500 as their point of network attachment. As a result of scheduling different wireless terminals at different times may be assigned to an uplink segment which corresponds to the uplink baseband DC tone. Also, in some embodiments, as a function of the uplink tone hopping structure, at different times, e.g., for different dwells, a different wireless terminal may be assigned to an uplink segment which corresponds to the uplink baseband DC tone. Receiver control module 3542 controls the operation of receiver 3502, while transmitter control module 3544 controls the operation of transmitter 3504. The I/O interface control module 3546 controls the operation of I/O interface 3508.

Data/information 3534 include wireless terminal data/information 3548, system data information 3560, measured uplink DC component for the DC tone 3574, current timing information 3576, unprocessed received uplink DC tone modulation symbols 3578, and processed uplink DC tone modulation symbols 3584. WT data/information 3548 includes a plurality of sets of WT data/information (WT 1 data/information 3550, ..., WT N data/information 3552), e.g., each set corresponding to a WT currently registered with the base station 3500 and using the base station 3500 as its point of network attachment. WT 1 data/info 3550 includes user data 3554, wireless terminal identification information 3556, and device/session/resource information 3558. User data 3554 is, e.g., data/information representing voice, audio, video, text, files, etc., corresponding pertaining to a communications session between WT 1 and a peer node. WT ID information 3556 includes base station assigned identifiers currently associated with WT 1, e.g., an active user identifier.

Device/session/resource information 3558 includes WT 1 device information, information corresponding to a peer node of WT 1 in a communications session with WT 1, address information, routing information, session information, and/or air link resource information, e.g., information identifying uplink and downlink segments assigned to WT 1. At some times, some of the uplink segments assigned to WT 1 may correspond to the uplink DC tone, which receives special treatment in accordance with the present invention.

System data/information 3560 includes timing information 3562, frequency information 3564 and stored scalar information 3566. The timing information 3562 includes uplink and downlink timing structure information. The uplink timing information 3568 includes uplink timing information 3570. The uplink timing information 3568 includes information identifying the uplink timing structure being used by the base station and wireless terminals using the base station as their point of network attachment. Uplink timing information 3568 includes uplink dwell timing information 3570, e.g., identifying the dwell structure used. Uplink tone hopping occurs on dwell boundaries, and therefore the uplink DC tone can change between different wireless terminals for different dwells. Frequency information 3564 includes uplink tone information 3572 and downlink tone information. The uplink tone information 3572 identifies the uplink tones in the passband, e.g., for an uplink tone block, the uplink tones in the baseband, tones corresponding to the uplink DC tone. Uplink tone information 3572 also includes tone hopping information, e.g., information mapping logical tones in segments to physical tones.

Current timing information 3576 includes information identifying the current timing, e.g. current OFDM symbol transmission time period, current half-slot, etc., within the uplink timing structure, e.g., a repetitive uplink timing structure. Unprocessed received uplink DC tone modulation symbols 3578 includes a set of modulation symbols ($X_{U1}$ 3580, ..., $X_{UN}$) 3582 which is a set of received modulation symbols associated with a dwell of a fixed number (N) of successive OFDM symbol transmission time periods, in which the same wireless terminal transmitted uses that tone. In some embodiments N=7. Processed uplink DC tone modulation symbols 3584 includes a set of modulation symbols ($X_{P1}$ 3586, ... $XP_{N-1}$ 3588) corresponding to the unprocessed set 3584, the set including one less modulation symbol in the processed set then in the unprocessed set.

Figure 36:
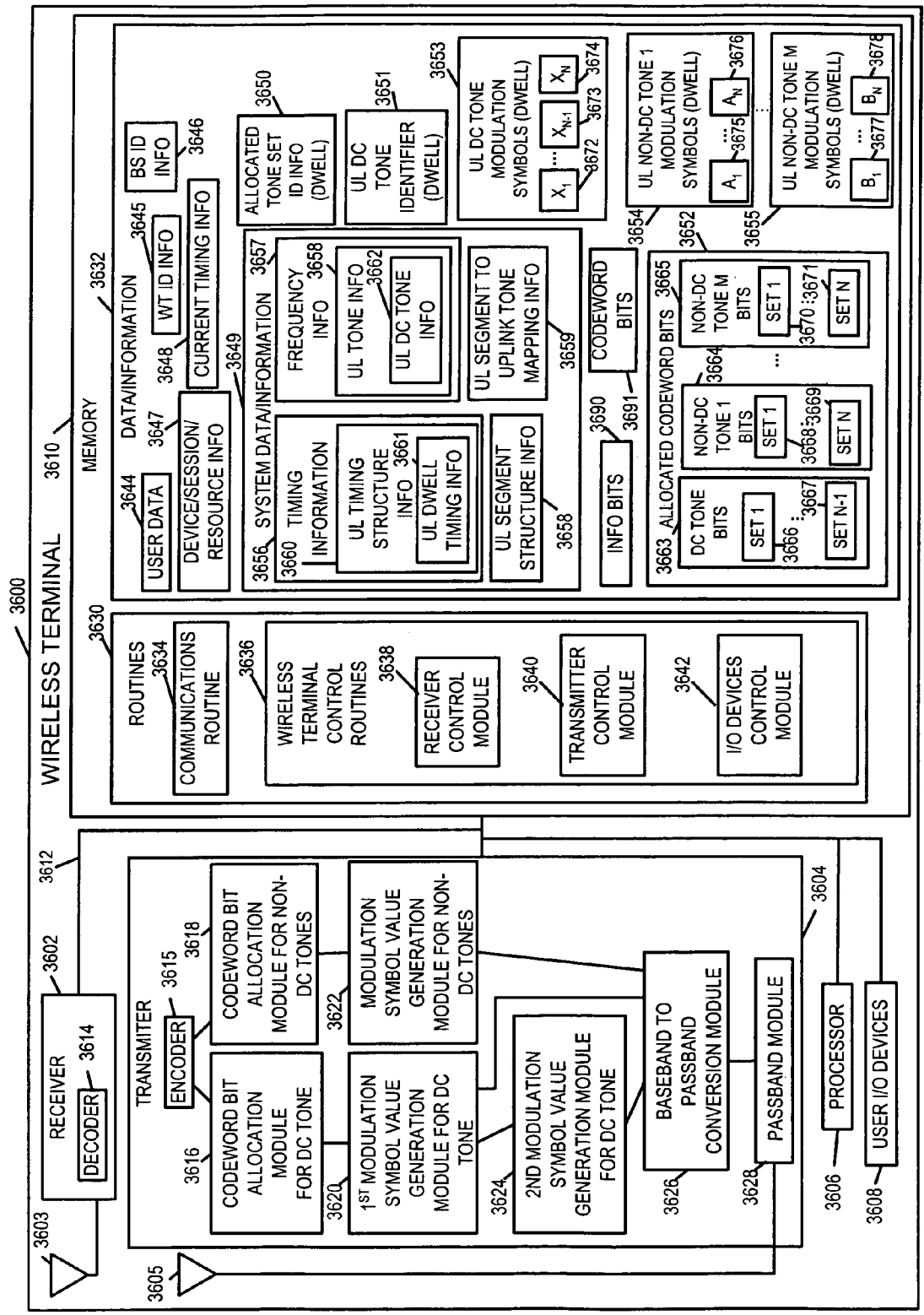
FIG. 36 is a drawing of an exemplary wireless terminal, e.g., mobile node, implemented in accordance with the present invention and using methods of the present invention.

FIG. 36 is a drawing of an exemplary wireless terminal 3600, e.g., mobile node, implemented in accordance with the present invention and using methods of the present invention. Exemplary wireless terminal 3600 is, e.g., a wireless terminal in a spread spectrum multiple access wireless OFDM communications system, including a plurality of wireless terminals and one or more base stations, e.g., one or more base stations 3500 of FIG. 35.

Exemplary wireless terminal 3600 includes a receiver 3602, a transmitter 3604, a processor 3606, user I/O devices 3608 and memory 3610 coupled together via a bus 3612 over which the various elements may interchange data and information. Receiver 3602 is coupled to receive antenna 3603 via which the wireless terminal 3600 can receive downlink signals from a base station. The downlink signals may include uplink traffic channel segment assignments, and some of the assigned segments may correspond to segments which use the uplink DC tone. Receiver 3602 includes a decoder 3614 for decoding received downlink signals.

Transmitter 3604 is coupled to a transmit antenna 3605 via which the wireless terminal transmits uplink signals, e.g., including uplink traffic channel segment signals, to a base station. In some embodiments, the same antenna is used for receiver 3602 and transmitter 3604. Transmitter 3604 includes an encoder 3615, a codeword bit allocation module for DC tone 3616, a codeword bit allocation module for non-DC tones 3618, a $1^{st}$ modulation symbol value generation module for the DC tone 3620, a modulation symbol value generation module for non-DC tones 3622, a $2^{nd}$ modulation symbol value generation module for the DC tone 3624, a baseband to passband conversion module 3626, and a passband module 3628.

Encoder 3615 encodes information bits 3690 or frames of information bits into codeword bits 3691. For example, information bits including user data are coded by encoder 3615 to be communicated in an uplink traffic channel segment or portion of an uplink traffic channel segment.

The codeword bit allocation module 3616 allocates N−1 different sets of codeword bits (3666, . . . 3667) from a portion of a codeword to be transmitted during each of N−1 symbol transmission time periods using the DC tone. For example, the wireless terminal 3600 may have been allocated a set of M+1 tones for use during a dwell corresponding to a portion of an uplink traffic channel segment, and the set of tones includes the DC tone. In some such examples, a codeword is to be communicated during uplink traffic channel segment, and a portion of the codeword is to be communicated during the dwell using the set of allocated tones.

The $1^{st}$ modulation symbol value generation module for the DC tone 3620 generates N−1 symbol values ($X_1$ 3672, . . . $X_{N-1}$ 3673) to be transmitted, each of the N−1 symbol values ($X_1$ 3672, . . . , $X_{N-1}$ 3673) being generated from a corresponding one of the N−1 sets of codeword bits (3666, . . . , 3667). The $2^{nd}$ modulation symbol generation module for the DC tone 3624 generates an Nth symbol value ($X_N$ 3674) to be transmitted in a predetermined manner as a function of the N−1 symbol values ($X_1$ 3672, . . . , $X_{N-1}$ 3673) to be transmitted. In some embodiments, N=7. In some embodiments, the generated N symbols values ($X_1$ 3672, . . . , $X_{N-1}$ 3673, $X_N$ 3674) sum to zero.

In some embodiments, the Nth generated symbol $X_N$ 3674 is transmitted in a predetermined one of the N symbol transmission time periods using the DC tone, e.g., the last OFDM symbol transmission time period in the dwell.

Codeword bit allocation module for non-DC tones 3618, for each set of M non-DC tones from a set of tones allocated to the wireless terminal allocates N additional different sets of codeword bits from the portion of the codeword to be transmitted during each one of the N symbol transmission time periods using a non-DC tone from the set of allocated tones. For example, codeword bit allocation module for non-DC tones 3618 allocates N additional sets of codeword bits (3668, . . . , 3669) for non-DC tone 1 in the set of allocated tones, and codeword bit allocation module for non-DC tones 3618 allocates N additional sets of codeword bits (3670, . . . , 3671) for non-DC tone M in the set of allocated tones.

Modulation symbol value generation module for non-DC tones 3622, for each of the M non-DC tones in the set of allocated tones, generates N additional symbol values from a corresponding one of the N additional different sets of codeword bits. For example, modulation symbol value generation module for non-DC tones 3622 generates N additional modulation symbol values ($A_1$ 3675, . . . , $A_N$ 3676) from corresponding additional codeword bit sets (3668, . . . , 3669), and modulation symbol value generation module for non-DC tones 3622 generates N additional modulation symbol values ($B_1$ 3677, . . . , $B_N$ 3678) from corresponding additional codeword bit sets (3670, . . . , 3671).

The outputs from modules 3620, 3622, and 3624 are used in forming baseband signals, e.g., a sequence of N OFDM baseband symbols for the dwell, each of the OFDM baseband symbols including modulation symbol values corresponding to the assigned tone set for the dwell, e.g., the DC tone and the M non-DC tones.

Baseband to passband conversion module 3626 converts a baseband signal into a passband signal, e.g., modulating the baseband signal using a selected uplink carrier. The passband module 3628, e.g., a filter and power amplifier stage, transmits the generated passband signal via antenna 3605.

Transmitter 3504 is operated to transmit each of the N−1 modulation symbols and the Nth modulation symbol using the DC tone during a different one of the N symbol transmission time periods, e.g., during dwells in which the wireless terminal has been allocated the DC tone. Transmitter 3504 is also operated, for each of the M non-DC tones, to transmit each of the N additional symbols using the non-DC tone during a different one of the N symbol transmission time periods. For example, during the first symbol transmission time period of the dwell, corresponding to the tone set allocation, the transmitter 3504 transmits a passband OFDM signal which includes signals corresponding to modulation symbols values ($X_1$ 3672, $A_1$ 3675, . . . , $B_1$ 3677); during the Nth symbol transmission time period of the dwell, corresponding to the tone set allocation, the transmitter 3504 transmits a passband OFDM signal corresponding to modulation symbols values ($X_N$ 3674, $A_N$ 3676, . . . , $B_N$ 3678).

In some embodiments, the DC tone can be used by different wireless terminals from one allocation period, e.g., dwell, to the next. For example WT 3600 may be assigned to use the DC tone for a first allocation period and may be assigned not to use the DC tone for a subsequent allocation period which immediately follows the first allocation period, e.g., as a function of segment assignment and/or tone hopping used in the uplink timing/frequency structure. If for uplink signaling for a given tone allocation period, e.g., a given dwell, the DC tone and additional tones are allocated to WT 3600, modules (3616, 3618, 3620, 3622, and 3624) are used, while if for uplink signaling for a given tone allocation period only non-DC tones are allocated to WT 3600, then modules (3618 and 3622) are used while modules (3616, 3620, and 3624) are not used.

User I/O devices 3608 includes, e.g., microphone, speaker, display, camera, keyboard, keypad, switches, etc. User I/O devices 3608 allow a user of WT 3600 to input data, output data, and perform control operations, e.g., initiate a communications session.

Memory 3610 includes routines 3630 and data/information 3632. The processor 3606, e.g., a CPU, executes the routines 3630 and uses the data/information 3632 in memory 3610 to control the operation of the wireless terminal 3600 and implement methods of the present invention.

Routines 3630 includes communications routine 3634 and wireless terminal control routines 3636. The communications routine 3634 performs various communications functions and implements the various communications protocols used by the wireless terminal. Wireless terminal control routines 3636 include a receiver control module 3638, a transmitter control module 3640, and an I/O devices control module 3642. Receiver control module controls operation of receiver 3602; while transmitter control module 3640 controls operation of transmitter 3604. The I/O devices control module 3642 controls operation of user I/O devices 3608.

Data/information 3632 includes user data 3644, wireless terminal identifier information 3645, base station identification information 3646, device/session/resource/information 3647, current timing information 3648, system data/information 3649, allocated tone set identification information 3650, uplink DC tone identifier 3651, information bits 3690, codeword bits 3692, uplink DC tone modulation symbols 3653, uplink non-DC tone 1 modulation symbols 3654, ..., uplink non-DC tone M modulation symbols 3655.

User data 3644 includes, e.g., information representing voice, video, audio, text, files, etc, pertaining to data/information being communicated in a communications session between WT 3600 and a peer node. WT ID information 3645 includes base station assigned wireless terminal identifiers, e.g., an active user identifier. Base station identification information 3646 includes information identifying the base station point of network attachment being currently used by the WT 3600, e.g., in terms of cell, sector and/or associated carrier frequencies. Device/session/resource information 3647 includes information associated with WT 3600, information associated with the peer node in a communications session with WT 3600, session information, addressing information, routing information, and air link resource information, e.g., uplink and downlink segment assigned to WT 3600. Current timing information 3648 includes information identifying the current time, e.g., in terms of indexed OFDM symbol transmission time periods within a repetitive timing structure being used by the base station point of network attachment.

System data/information 3649 includes timing information 3656, frequency information 3657, uplink segment structure information 3658, and uplink segment to uplink tone mapping information 3659. WT 3600 includes, in various embodiments, a plurality of sets of system data/information, each set corresponding to a different base station and/or base station point of network attachment. Timing information includes downlink timing structure information and uplink timing structure information 3660. The uplink timing structure information 3660 includes uplink dwell timing information 3661, e.g., identifying the number of successive OFDM symbol transmission time periods in a dwell, e.g., 7, identifying indexed OFDM symbol transmission time intervals with indexed dwells in the uplink timing structure, etc.

Frequency information 3657 includes uplink and downlink frequency information such as uplink carrier frequency, uplink tone block information, the number of tones in the uplink tone block, e.g., 113, uplink tone hopping sequence information, downlink carrier frequency, downlink tone block information, the number of tones in the downlink tone block, downlink tone block hopping sequence information, etc. Frequency information 3657 includes uplink tone information 3658 which includes uplink DC tone information 3662. Uplink DC tone information 3662 includes information identifying the DC tone in the uplink tone block. Uplink segment structure information 3658 includes information identifying uplink segments including uplink traffic channel segments. At different times different uplink segments are associated with the DC tone, e.g., as a function of the uplink segment structure and uplink tone hopping information. Uplink segment to uplink tone mapping information 3659 includes information used to map an assigned segment, e.g., an assigned uplink traffic channel segment to a set of tones or to multiple sets of tones corresponding to different dwells within the segment. An allocated set of tones may or may not include the uplink DC tone.

Allocated tone set identification information 3650 includes information identifying a set of tones allocated to WT 3600, e.g., a set of tones allocated for a dwell to WT 3600 corresponding to a portion of an uplink traffic channel segment. Uplink DC tone identifier 3651, e.g., a one bit flag, includes information identifying whether or not the allocated tone set 3650 includes the uplink DC tone. Modules 3616, 3620 and 3624 being used when the uplink DC tone identifier 3651 for the given dwell indicates that the DC tone is included in the allocated tone set 3650.

Information bits 3690 are an input to encoder 3615. Codeword bits 3691, an output of the encoder 3615 are allocated by modules (3616, 3618) into allocated sets included in allocated codeword bits 3652. DC tone bits 3663 includes N−1 sets (set 1 3666, ..., set N−1 3667), allocated by codeword bit allocation module for the DC tone 3616. Non-DC tone bits 3664 includes N sets (set 1 3668, ..., set N 3669) allocated by codeword bit allocation module for non-DC tones 3618 for non-DC tone 1. Non-DC tone bits 3665 includes N sets (set 1 3670, ..., set N 3671) allocated by codeword bit allocation module for non-DC tones 3618 for non-DC tone M.

Uplink DC tone modulation symbols 3653, corresponding to a dwell, include modulation symbol values ($X_1$ 3672, ..., $X_{N-1}$ 3673) output from $1^{st}$ modulation symbol value generation module for DC tone 3620 and modulation symbol value $X_N$ 3674 output from $2^{nd}$ modulation symbol value generation module for DC tone 3624.

Uplink non-DC tone 1 modulation symbols 3654, corresponding to a dwell, include modulation symbol values ($A_1$ 3675, ..., $A_N$ 3676) output from modulation symbol value generation module for non-DC tones 3622. Uplink non-DC tone M modulation symbols 3655, corresponding to a dwell, include modulation symbol values ($B_1$ 3677, ..., $B_N$ 3678) output from modulation symbol value generation module for non-DC tones 3622.

While described in the context of an OFDM system, the methods and apparatus of the present invention, are applicable to a wide range of communications systems including many non-OFDM and/or non-cellular systems, e.g., other frequency division multiplexing systems.

In various embodiments nodes described herein are implemented using one or more modules to perform the steps corresponding to one or more methods of the present invention, for example, generate a special uplink DC tone modulation symbol as a function of the other DC tone modulation symbols in a dwell, process a received set of uplink DC tone modulation symbols corresponding to a dwell, suspend transmission of signaling on the downlink DC tone at predetermined times in a downlink timing sequence, or estimate a receiver's DC tone self-interference characteristic based on measurements made when a downlink DC tone is not transmitted. In some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with orthogonal frequency division multiplexing (OFDM), and/or various other types of communications techniques, e.g., other frequency division multiplexing techniques (FDM), which may be used to provide wireless communications links between access nodes and mobile nodes in which special treatment of the uplink and/or DC tone, in accordance with the present invention, can be beneficial. In some embodiments the access nodes are implemented as base stations which establish communications links with mobile nodes using OFDM, FDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A method of operating a wireless terminal in a frequency division multiplexed system wherein signals are transmitted in a passband by a base station, the method comprising:
receiving a passband signal;
converting said received passband signal to a baseband signal, a DC tone existing in said baseband, the DC tone corresponding to a corresponding tone in said passband signal, the baseband signal including additional baseband tones corresponding to additional passband tones; and
performing a signal measurement on said DC tone during a DC tone noise measurement period to generate a DC noise measurement value.

2. The method of claim 1, further comprising:
recovering data during said DC tone noise measurement period from said additional baseband tones.

3. The method of claim 2, further comprising:
filtering a plurality of DC noise measurement values corresponding to different DC tone noise measurement periods to generate a filtered DC noise measurement value.

4. The method of claim 3 wherein said filtering is a weighted averaging operation and wherein said filtered DC noise measurement value is a weighted average DC noise measurement value.

5. The method of claim 3, further comprising:
during a data period, simultaneously receiving data on said DC tone and said additional baseband tones; and
recovering data received on said DC tone, said step of recovering data received on said DC tone including:
adjusting, during said data period, a symbol value received on said DC tone as a function of the filtered DC noise measurement value; and
determining from the result of said adjustment a transmitted symbol value.

6. The method of claim 5 wherein said adjusting includes subtracting said filtered DC noise measurement value from said received symbol value on said DC tone.

7. The method of claim 5, wherein during said noise measurement period, said corresponding tone does not carry any transmitted power.

8. The method of claim 7, wherein said data period is at least 10 times longer than said DC tone noise measurement period, at least 10 symbols being recovered during said data period on said DC tone.

9. The method of claim 8, wherein the system is an orthogonal frequency division multiplexing (OFDM) system and there are at least 100 additional baseband tones.

10. A wireless terminal for use in a frequency division multiplexed system wherein signals are transmitted in a passband by a base station, the wireless terminal comprising:
a receiver for receiving passband signals;
a passband to baseband signal conversion module for converting said received passband signals to baseband signals, a DC tone existing in said baseband signals, the DC tone corresponding to a corresponding tone in said passband signals, the baseband signals including additional baseband tones corresponding to additional passband tones; and
a signal measurement module for performing a signal measurement on said DC tone during a DC tone noise measurement period to generate a DC noise measurement value.

11. The wireless terminal of claim 10, further comprising:
a data recovery module for recovering data from said received passband signals, during said DC tone noise measurement period, from said additional baseband tones.

12. The wireless terminal of claim 11, further comprising:
a filter module for filtering a plurality of DC noise measurement values corresponding to different DC tone noise measurement periods to generate a filtered DC noise measurement value.

13. The wireless terminal of claim 12, wherein said filter module is a weighted averaging filter; and
wherein said filtered DC noise measurement value is a weighted average DC noise measurement value.

14. The wireless terminal of claim 12, wherein during a data period, said receiver receives data simultaneously on said DC tone and said additional baseband tones; and
wherein said data recovery module includes a DC tone data recovery sub-module for recovering data transmitted on said DC tone, said DC tone data recovery sub-module including:
an adjusting module for adjusting, during said data period, a symbol value received on said DC tone as a function of the filtered DC noise measurement value; and
a symbol determination module for determining from the result of said adjustment a transmitted symbol value.

15. The wireless terminal of claim 14, wherein said adjusting module includes a subtractor for subtracting said filtered DC noise measurement value from said received symbol value on said DC tone.

16. The wireless terminal of claim 14, wherein during said noise measurement period, said corresponding tone does not carry any transmitted power.

17. The wireless terminal of claim 16, wherein said data period is at least 10 times longer than said DC tone noise measurement period, at least 10 symbols being recovered during said data period on said DC tone.

18. The wireless terminal of claim 17, wherein the system is an orthogonal frequency division multiplexing (OFDM) system and there are at least 100 additional baseband tones.

19. A wireless terminal for use in a frequency division multiplexed system wherein signals are transmitted in a passband by a base station, the wireless terminal comprising:
receiver means for receiving passband signals;
signal conversion means for converting said received passband signals to baseband signals, a DC tone existing in said baseband signals, the DC tone corresponding to a corresponding tone in said passband signals, the baseband signals including additional baseband tones corresponding to additional passband tones; and
signal measurement means for performing a signal measurement on said DC tone during a DC tone noise measurement period to generate a DC noise measurement value.

20. The wireless terminal of claim 19, further comprising:
data recovery means for recovering data from said received passband signals, during said DC tone noise measurement period, from said additional baseband tones.

21. The wireless terminal of claim 20, further comprising:
filtering means for filtering a plurality of DC noise measurement values corresponding to different DC tone noise measurement periods to generate a filtered DC noise measurement value.

22. The wireless terminal of claim 21, wherein said filtering means is a weighted averaging filter; and
wherein said filtered DC noise measurement value is a weighted average DC noise measurement value.

23. The wireless terminal of claim 21, wherein during a data period, said receiver means receives data simultaneously on said DC tone and said additional baseband tones; and
wherein said data recovery means includes DC tone data recovery means for recovering data transmitted on said DC tone, said DC tone data recovery means including:
adjusting means for adjusting, during said data period, a symbol value received on said DC tone as a function of the filtered DC noise measurement value; and
symbol determination means for determining from the result of said adjustment, a transmitted symbol value.

24. The wireless terminal of claim 23, wherein said adjusting means includes subtractor means for subtracting said filtered DC noise measurement value from said received symbol value on said DC tone.

25. The wireless terminal of claim 23, wherein during said noise measurement period, said corresponding tone does not carry any transmitted power.

26. A computer readable medium including machine executable instructions, for use in a wireless terminal in a frequency division multiplexed system wherein signals are transmitted in a passband by a base station, said computer readable medium comprising:
instructions for causing the wireless terminal to receive passband signals;
instructions for causing the wireless terminal to convert said received passband signals to baseband signals, a DC tone existing in said baseband signals, the DC tone corresponding to a corresponding tone in said passband signals, the baseband signals including additional baseband tones corresponding to additional passband tones; and
instructions for causing the wireless terminal to perform a signal measurement on said DC tone during a DC tone noise measurement period to generate a DC noise measurement value.

27. The computer readable medium of claim 26, further comprising:
instructions for causing the wireless terminal to recover data from said received passband signals, during said DC tone noise measurement period, from said additional baseband tones.

28. The computer readable medium of claim 27, further comprising:
instructions for causing the wireless terminal to filter a plurality of DC noise measurement values corresponding to different DC tone noise measurement periods to generate a filtered DC noise measurement value.

29. The computer readable medium of claim 28, wherein said wireless terminal uses a weighted averaging filter for filtering said plurality of DC noise measurement values; and
wherein said filtered DC noise measurement value is a weighted average DC noise measurement value.

30. The computer readable medium of claim 28, further comprising:
instructions for causing the wireless terminal to receive data simultaneously on said DC tone and said additional baseband tones, during a data period; and
instructions for causing the wireless terminal to recover data transmitted on said DC tone.

31. The computer readable medium of claim 30, wherein said data period is at least 10 times longer than said DC tone noise measurement period, at least 10 symbols being recovered during said data period on said DC tone.

* * * * *